United States Patent
Ueda et al.

(10) Patent No.: US 10,713,336 B2
(45) Date of Patent: Jul. 14, 2020

(54) INFORMATION PROCESSING DEVICE AND INFORMATION PROCESSING METHOD

(71) Applicant: SONY CORPORATION, Tokyo (JP)

(72) Inventors: Kenjiro Ueda, Kanagawa (JP); Tateo Oishi, Saitama (JP)

(73) Assignee: SONY CORPORATION, Tokyo (JP)

(*) Notice: Subject to any disclaimer, the term of this patent is extended or adjusted under 35 U.S.C. 154(b) by 109 days.

(21) Appl. No.: 15/751,996

(22) PCT Filed: Aug. 19, 2016

(86) PCT No.: PCT/JP2016/074204
§ 371 (c)(1),
(2) Date: Feb. 12, 2018

(87) PCT Pub. No.: WO2017/038492
PCT Pub. Date: Mar. 9, 2017

(65) Prior Publication Data
US 2018/0239879 A1    Aug. 23, 2018

(30) Foreign Application Priority Data
Sep. 1, 2015  (JP) ................. 2015-171929

(51) Int. Cl.
*G06F 21/10*  (2013.01)
*H04N 5/765*  (2006.01)
(Continued)

(52) U.S. Cl.
CPC .......... *G06F 21/10* (2013.01); *G11B 20/0021* (2013.01); *G11B 20/00086* (2013.01);
(Continued)

(58) Field of Classification Search
CPC ...... G06F 21/10; H04L 9/0836; H04L 9/0861
(Continued)

(56) References Cited

U.S. PATENT DOCUMENTS 6,654,820 B1   11/2003  Ishibashi et al.
2006/0112284 A1  5/2006  Kato et al.
(Continued)

FOREIGN PATENT DOCUMENTS

CN    1271898 A   11/2000
CN    1783318 A    6/2006
(Continued)

OTHER PUBLICATIONS

Intel, Advanced Access Content System (AACS), Jan. 12, 2010, Intel Corporation, pp. 13-41, 123-128 (Year: 2010).*
(Continued)

*Primary Examiner* — Alexander Lagor
*Assistant Examiner* — Gregory A Lane
(74) *Attorney, Agent, or Firm* — Chip Law Group

(57) ABSTRACT

A configuration in which usage control that is substantially similar to content usage control in a copy source medium can be performed in a content copy destination is implemented. A data processing unit that performs a copy process of recording data recorded on a first medium on a second medium records encrypted content in the first medium on the second medium, without decrypting the encrypted content. In addition, the data processing unit converts a CPS unit key file recorded on the first medium to generate a converted CPS unit key file and records the converted CPS unit key file on the second medium. Further, the data processing unit acquires an MKB not requiring KCD, which is capable of directly calculating a media key using only a device key, without using key conversion data (KCD) recorded on the first medium, from a server and records the MKB not requiring KCD on the second medium.

20 Claims, 30 Drawing Sheets

(51) Int. Cl.
    *G11B 20/00*     (2006.01)
    *H04L 9/08*     (2006.01)
    *H04N 5/913*     (2006.01)
    *G11B 20/10*     (2006.01)

(52) U.S. Cl.
    CPC .. *G11B 20/00362* (2013.01); *G11B 20/00427* (2013.01); *G11B 20/00492* (2013.01); *G11B 20/00862* (2013.01); *G11B 20/10* (2013.01); *H04L 9/0836* (2013.01); *H04L 9/0861* (2013.01); *H04N 5/765* (2013.01); *H04N 5/913* (2013.01); *G06F 2221/0704* (2013.01); *H04L 2209/60* (2013.01); *H04N 2005/91364* (2013.01)

(58) Field of Classification Search
    USPC .......................................................... 726/26
    See application file for complete search history.

(56) References Cited

U.S. PATENT DOCUMENTS

| | | | | |
|---|---|---|---|---|
| 2006/0227975 | A1* | 10/2006 | Ueda | G06F 21/10 380/281 |
| 2008/0063200 | A1* | 3/2008 | Takashima | G11B 20/00086 380/201 |
| 2009/0022324 | A1 | 1/2009 | Inokuchi et al. | |
| 2009/0094321 | A1* | 4/2009 | Ueda | G11B 20/00086 709/203 |
| 2010/0118675 | A1* | 5/2010 | Nakano | G11B 20/00086 369/53.21 |
| 2015/0143135 | A1 | 5/2015 | Ueda et al. | |

FOREIGN PATENT DOCUMENTS

| | | |
|---|---|---|
| CN | 101350819 A | 1/2009 |
| CN | 105900174 A | 8/2016 |
| EP | 1659584 A1 | 5/2006 |
| EP | 2854060 A1 | 4/2015 |
| JP | 2000-311114 A | 11/2000 |
| JP | 2006-146683 A | 6/2006 |
| JP | 2008-098765 A | 4/2008 |
| JP | 2009-027232 A | 2/2009 |
| JP | 5935883 B2 | 6/2016 |
| KR | 10-2006-0056852 A | 5/2006 |
| TW | 470889 B | 1/2002 |
| TW | 277870 B | 4/2007 |
| WO | 2013/175850 A1 | 11/2013 |
| WO | 2015/107782 A1 | 7/2015 |

OTHER PUBLICATIONS

International Preliminary Report on Patentability of PCT Application No. PCT/JP2016/074204, dated Mar. 15, 2018, 09 pages of English Translation and 04 pages of IPRP.

International Search Report and Written Opinion of PCT Application No. PCT/JP2016/074204, dated Nov. 22, 2016, 08 pages of translation and 07 pages of ISRWO.

\* cited by examiner

FIG. 2

| INDEX | CONTENT MANAGEMENT UNIT (CPS) | UNIT KEY (CPS UNIT KEY) |
|---|---|---|
| TITLE 1 | CPS1 | Ku1 |
| TITLE 2 | CPS2 | Ku2 |
| TITLE 3 | CPS3 | Ku3 |
| ⋮ | ⋮ | ⋮ |
| TITLE n | CPSn | Kun |

FIG. 6

MCMF (Managed Copy Manifest File)

| ELEMENT (Element) | | | NOTE (Note) |
|---|---|---|---|
| MANAGEMENT SERVER URL (URL of MCS) | | | URL OF ACCESS DESTINATION MANAGEMENT SERVER |
| COPY DATA INFORMATION (File name to be copied) | PLAYLIST FILE NAME (PlayList file name) | | PLAYLIST FILE NAME OF COPY TARGET (CLIP CAN BE SPECIFIED ON BASIS OF PLAYLIST) |
| | CPS UNIT KEY INFORMATION (Index to identify the CPS Unit Key) | | ENCRYPTION KEY APPLIED TO DECRYPTION PROCESS |
| | COPY UNIT IDENTIFIER (MCUi) | | INFORMATION FOR IDENTIFYING COPY UNIT AS UNIT OF EXECUTION OF MC (Managed Copy) |
| CONTENT ID (Content ID) | | | CONTENT IDENTIFIER |

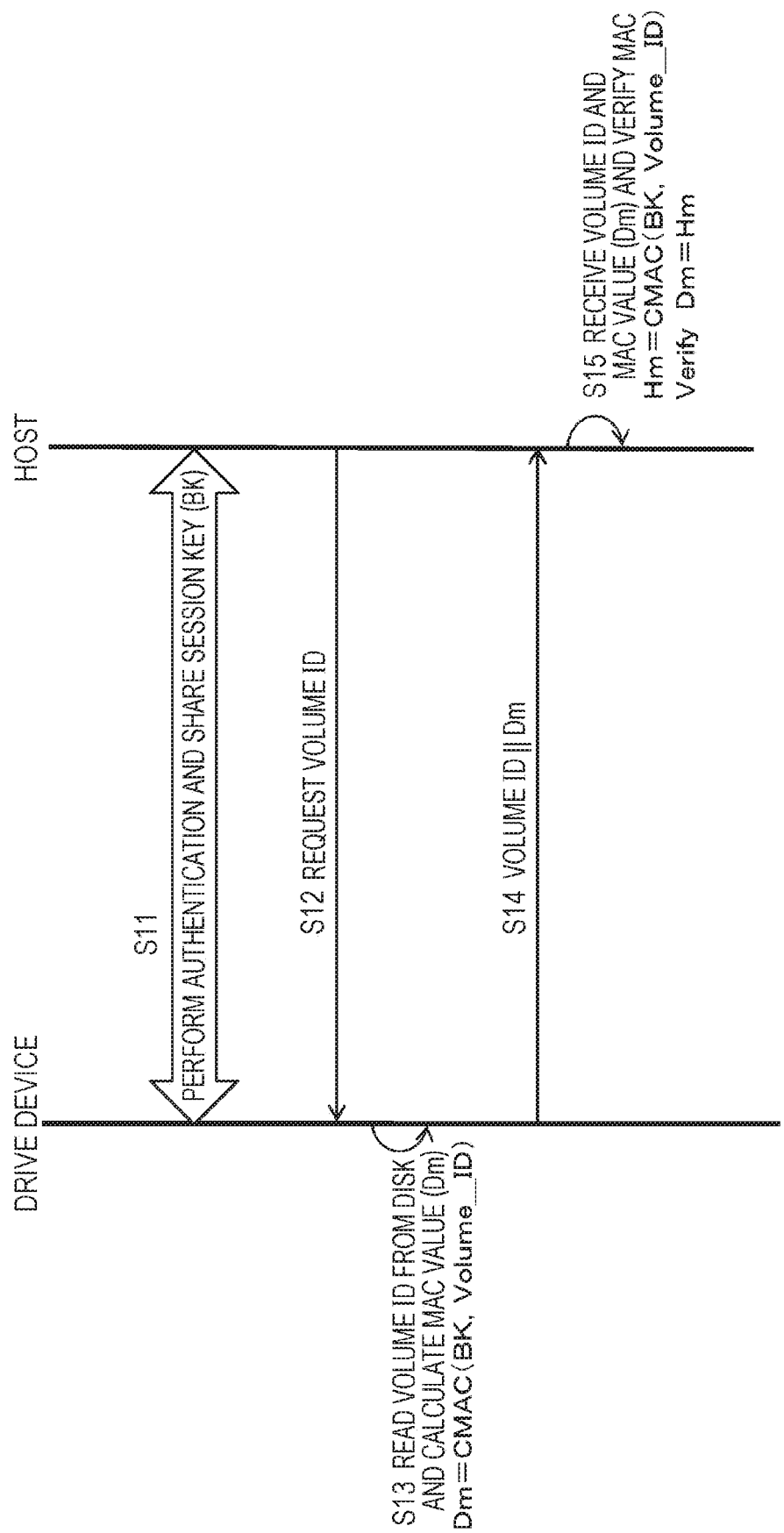

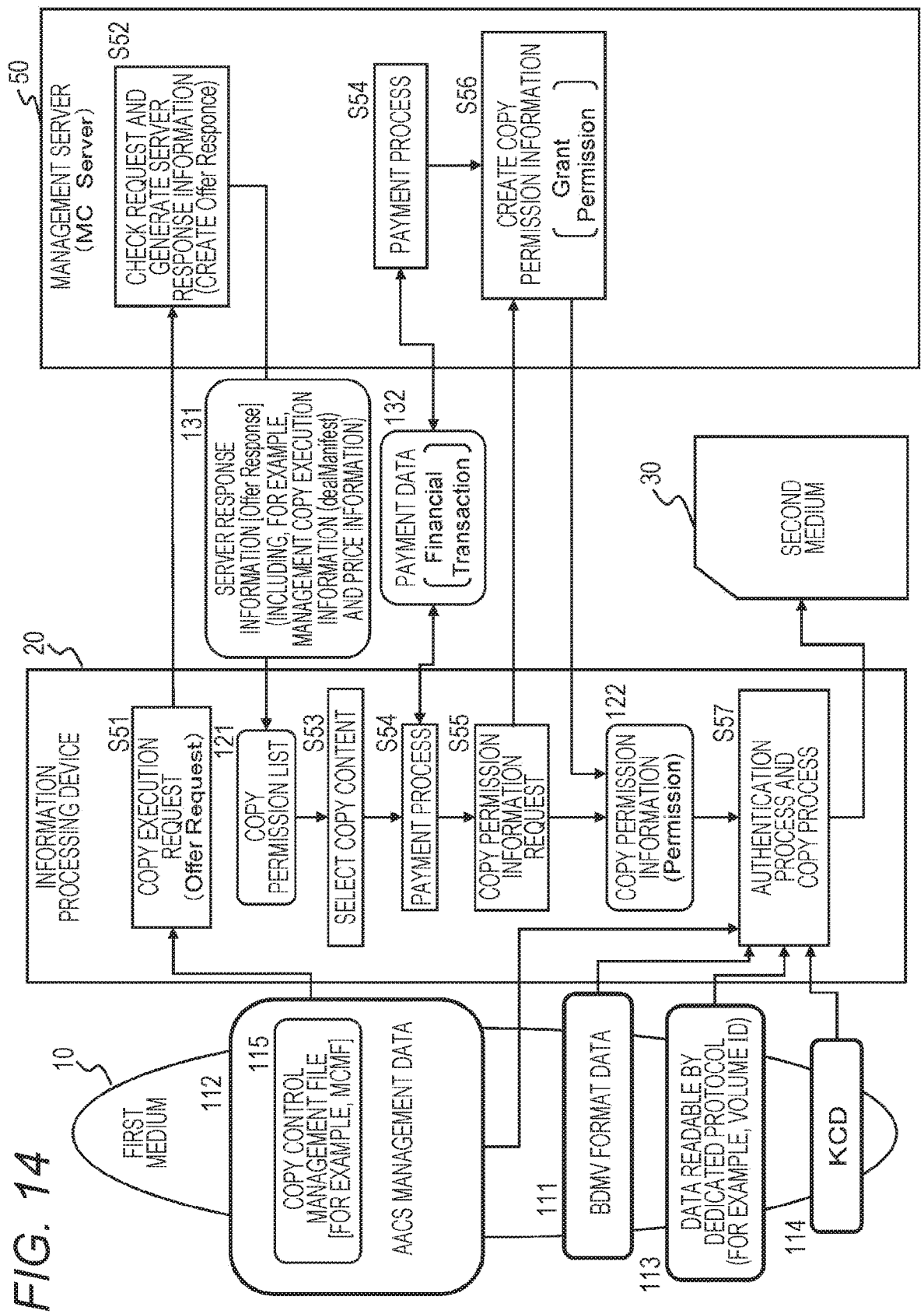

FIG. 15

COPY EXECUTION REQUEST (Offer Request)

| ELEMENT (Element) | NOTE (Note) |
|---|---|
| CONTENT ID (Content ID) | CONTENT IDENTIFIER |
| CONTENT CERTIFICATE ID (Content Certificate ID) | IDENTIFIER OF CONTENT CERTIFICATE |
| MEDIA IDENTIFIER (Pre-recorded Media Serial Number) | MEDIA UNIQUE IDENTIFIER |
| RANDOM NUMBER (mcmNonce) | DATA FOR VERIFYING DATA VALIDITY |
| LANGUAGE CODE (Language Code) | USED TO DETERMINE, FOR EXAMPLE, DISPLAY LANGUAGE OF PRICE LIST |

FIG. 16  BASIC INFORMATION OF SERVER RESPONSE INFORMATION (Offer Response)

| ELEMENT (Element) | | | NOTE (Note) |
|---|---|---|---|
| DETAILED OFFER INFORMATION (offer) | TITLE/ABSTRACT/DESCRIPTION (title / abstract / description) | | IDENTIFICATION INFORMATION OF CONTENT PERMITTED TO BE COPIED (To identify content by MCS) |
| | COPY UNIT IDENTIFIER (MCUi) | | IDENTIFICATION INFORMATION OF COPY UNIT AS UNIT OF COPY (To identify Managed Copy Unit (item for sale)) |
| | PRICE INFORMATION/PRICE AUXILIARY INFORMATION (price / priceInfo) | | COPY PRICE INFORMATION (priceInfo is a additional information regarding price (e.g. remaining copy count)) |
| | SERIAL NUMBER (serialNumberRequired) | | SERIAL NUMBER SET BY SERVER (To indicate if sticker code input is required or not) |
| | PAYMENT SERVER URL (financialHTMLURL) | | ACCESS INFORMATION OF PAYMENT SERVER (URL of financial server (may be different from MCS)) |
| | COPY DESTINATION INFORMATION (mcotInfo) | | INFORMATION OF COPY DESTINATION DEVICE OR MEDIUM (Information regarding copy destination) |
| RANDOM NUMBER (mcmNonce) | | | DATA FOR VERIFYING DATA VALIDITY (To compare with mcmNonce which MCM sent) |
| COPY DATA INFORMATION [File name to be copied(dealManifest)] | PLAYLIST FILE NAME (PlayList file name) | | SPECIFICATION INFORMATION OF FILE TO BE COPIED (To identify Clip AV stream(s) and Clip Information) |
| | CPS UNIT KEY INFORMATION (Index to identify the CPS Unit Key) | | INFORMATION OF KEY FOR DECRYPTING CONTENT (To decrypt Clip AV stream(s)) |
| | COPY UNIT IDENTIFIER (MCUi) | | IDENTIFICATION INFORMATION OF COPY UNIT AS UNIT OF COPY (To identify Managed Copy Unit (item for sale)) |
| SERVER PUBLIC KEY CERTIFICATE (MCScert) | | | PUBLIC KEY CERTIFICATE STORING PUBLIC KEY OF MANAGEMENT SERVER (Including MCS public key) |
| SIGNATURE (signature) | | | DATA FOR VERIFYING DATA VALIDITY (To verify integrity of offer) |

INFORMATION PROCESSING DEVICE AND INFORMATION PROCESSING METHOD

CROSS REFERENCE TO RELATED APPLICATIONS

This application is a U.S. National Phase of International Patent Application No. PCT/JP2016/074204 filed on Aug. 19, 2016, which claims priority benefit of Japanese Patent Application No. JP 2015-171929 filed in the Japan Patent Office on Sep. 1, 2015. Each of the above-referenced applications is hereby incorporated herein by reference in its entirety.

TECHNICAL FIELD

The present disclosure relates to an information processing device, and an information processing method, and a program. More particularly, the present disclosure relates to an information processing device, and an information processing method, and a program that copy content recorded on a first medium (information recording medium), such as a disk, to a second medium and enable the execution of content usage control for the content copied to the second medium.

BACKGROUND ART

Various types of information recording media, such as a digital versatile disc (DVD), a Blu-ray (registered trademark) disc (BD), a flash memory, have been used as information recording media (media) on which various types of content, such as a movie and music, are recorded. In general, for example, the creator or the distributor of content, such as music data or image data, recorded on the information recording media has a copyright or a distribution right to the content. Therefore, the user who has purchased the disk also has limits in the use of content recorded on the disk. For example, the unrestricted copy of the content recorded on the disk to other media is not permitted.

As a copy management configuration for the content stored in a medium, there is a configuration in which copy is permitted on condition that copy management information is received from a management server.

Specifically, for example, a process is performed in the following sequence.

A user inserts a first medium which is a copy source, such as a content-stored disk, into a user device, such as a PC or a recording/reproducing device, and the user device is connected to the management server through a network. Then, the user device transmits predetermined information, such as a disk identifier (ID) of the first medium, to the server.

The server checks, for example, the validity of the received information and transmits copy management information in which, for example, copy permission data has been recorded to the user device. The user device can check the copy permission data recorded in the copy management information transmitted from the server, read out the copy permission data from the first medium, and copy the copy permission data to the second medium which is a copy destination.

The copy management configuration is referred to as managed copy (MC) and has been described in detail in, for example, Patent Document 1 (Japanese Patent Application Laid-Open No. 2008-98765).

In a case where the user device copies content stored in a medium, such as a Blu-ray (registered trademark) disc (BD) storing, for example, a movie which is a copyright management target, to another medium, such as a flash memory, or another medium, such as another disk, the user device needs to perform a process according to the managed copy (MC). That is, copy is permitted on condition that copy management information is received from the management server.

In general, much of content, such as a movie, recorded on a general content-recorded disk, such as a Blu-ray (registered trademark) disc (BD), is encrypted and recorded in order to prevent illegal use such as an illegal copy.

Content encrypted according to an advanced access content system (AACS) standard which is a standard related to a content copyright protection technique is recorded as encrypted data which is divided into units and in which different encryption keys are applied to the units. The configuration in which each unit is encrypted makes it possible to perform usage control for each unit and various kinds of content usage control are strictly implemented.

However, the current AACS standard is mainly a standard for usage control for content that has been recorded on a Blu-ray (registered trademark) disc (BD) in advance and has the problem that copy content usage control needs to be improved in a case where content recorded on the BD is copied to another medium and is then used.

CITATION LIST

Patent Document

Patent Document 1: Japanese Patent Application Laid-Open No. 2008-98765

SUMMARY OF THE INVENTION

Problems to be Solved by the Invention

The present disclosure has been made in view of, for example, the above-mentioned problems and an object of the present disclosure is to provide an information processing device, and an information processing method, and a program that enable the execution of content usage control which is substantially similar to content usage control in a copy source medium in a case where content is copied and copied content is used.

Solutions to Problems

A first aspect of the present disclosure lies in
an information processing device including:
a data processing unit that performs a copy process of recording data recorded on a first medium on a second medium,
in which the data processing unit records encrypted content included in the data recorded on the first medium on the second medium as encrypted data, without decrypting the encrypted content,
the data processing unit converts a CPS unit key file recorded on the first medium as a file storing a decryption key for the encrypted content, and
the data processing unit generates a converted CPS unit key file that is capable of acquiring the decryption key, without applying key conversion data (KCD) recorded on the first medium, and records the converted CPS unit key file on the second medium.

Furthermore, a second aspect of the present disclosure lies in an information processing device including:

a data processing unit that performs a copy process of recording data recorded on a first medium on a second medium, in which the data processing unit records encrypted content included in the data recorded on the first medium on the second medium as encrypted data, without decrypting the encrypted content, the data processing unit transmits a CPS unit key file recorded on the first medium as a file storing a decryption key for the encrypted content to a sever, and the data processing unit acquires a converted CPS unit key file that is capable of acquiring the decryption key, without applying key conversion data (KCD) recorded on the first medium, from the server and records the converted CPS unit key file on the second medium.

Furthermore, a third aspect of the present disclosure lies in an information processing device functioning as a server, including:

a communication unit that receives data from a copy execution device which performs a copy process of recording data recorded on a first medium on a second medium; and a data processing unit that performs data processing using the data received from the copy execution device, in which the communication unit receives a CPS unit key file recorded on the first medium as a file storing a decryption key for encrypted content recorded on the first medium, and the data processing unit generates a converted CPS unit key file that is capable of acquiring the decryption key, without applying key conversion data (KCD) recorded on the first medium, and transmits the converted CPS unit key file as data to be recorded on the second medium to the copy execution device.

Furthermore, a fourth aspect of the present disclosure lies in an information processing method performed in an information processing device, in which the information processing device includes a data processing unit that performs a copy process of recording data recorded on a first medium on a second medium, the data processing unit records encrypted content included in the data recorded on the first medium on the second medium as encrypted data, without decrypting the encrypted content, the data processing unit converts a CPS unit key file recorded on the first medium as a file storing a decryption key for the encrypted content, and the data processing unit generates a converted CPS unit key file that is capable of acquiring the decryption key, without applying key conversion data (KCD) recorded on the first medium, and records the converted CPS unit key file on the second medium.

Furthermore, a fifth aspect of the present disclosure lies in an information processing method performed in an information processing device, in which the information processing device includes a data processing unit that performs a copy process of recording data recorded on a first medium on a second medium, the data processing unit records encrypted content included in the data recorded on the first medium on the second medium as encrypted data, without decrypting the encrypted content, the data processing unit transmits a CPS unit key file recorded on the first medium as a file storing a decryption key for the encrypted content to a sever, and the data processing unit acquires a converted CPS unit key file that is capable of acquiring the decryption key, without applying key conversion data (KCD) recorded on the first medium, from the server and records the converted CPS unit key file on the second medium.

Furthermore, a sixth aspect of the present disclosure lies in a program that causes an information processing device to process information, in which the information processing device includes a data processing unit that performs a copy process of recording data recorded on a first medium on a second medium, and the program causes the data processing unit to perform:

a process of recording encrypted content included in the data recorded on the first medium on the second medium as encrypted data, without decrypting the encrypted content;

a process of converting a CPS unit key file recorded on the first medium as a file storing a decryption key for the encrypted content; and a process of generating a converted CPS unit key file that is capable of acquiring the decryption key, without applying key conversion data (KCD) recorded on the first medium, and recording the converted CPS unit key file on the second medium.

Furthermore, a seventh aspect of the present disclosure lies in a program that causes an information processing device to process information, in which the information processing device includes a data processing unit that performs a copy process of recording data recorded on a first medium on a second medium, and the program causes the data processing unit to perform:

a process of recording encrypted content included in the data recorded on the first medium on the second medium as encrypted data, without decrypting the encrypted content;

a process of transmitting a CPS unit key file recorded on the first medium as a file storing a decryption key for the encrypted content to a sever; and a process of acquiring a converted CPS unit key file that is capable of acquiring the decryption key, without applying key conversion data (KCD) recorded on the first medium, from the server and recording the converted CPS unit key file on the second medium.

In addition, for example, the program according to the present disclosure can be provided to an information processing device or a computer system that can execute various program codes by a computer-readable storage medium or communication medium. The program is provided in a computer-readable form to implement a process corresponding to the program in the information processing device or the computer system.

Other objects, features, and advantages of the present disclosure will become apparent from the detailed description based on the following embodiments of the present disclosure or the accompanying drawings. In addition, in the specification, a system is a logical set of a plurality of devices and is not limited to a structure in which devices with each configuration are provided in the same housing.

Effects of the Invention

According to an embodiment of the present disclosure, a configuration in which usage control that is substantially similar to content usage control in a copy source medium can be performed in a content copy destination is implemented.

Specifically, a data processing unit that performs a copy process of recording data recorded on a first medium on a second medium records encrypted content in the first medium on the second medium, without decrypting the encrypted content. In addition, the data processing unit converts a CPS unit key file recorded on the first medium to generate a converted CPS unit key file and records the converted CPS unit key file on the second medium. Further, the data processing unit acquires an MKB not requiring KCD, which is capable of directly calculating a media key using only a device key, without using key conversion data (KCD) recorded on the first medium, from a server and records the MKB not requiring KCD on the second medium.

The configuration in which usage control that is substantially similar to content usage control in a copy source medium can be performed in a content copy destination is implemented by the above-mentioned configuration.

In addition, the effects described in the specification are illustrative and are not limited to the above. Furthermore, additional effects may be obtained.

BRIEF DESCRIPTION OF DRAWINGS

FIG. 2 is a diagram illustrating the configuration of a content management unit (CPS unit) and a unit key management table.

FIG. 6 is a diagram illustrating data forming a copy control management file (managed copy manifest file (MCMF)) which is information recorded on the first medium.

FIG. 7 is a diagram illustrating the sequence of a volume ID reading protocol (Protocol for Transferring Volume_ID) according to an AACS regulation.

FIG. 14 is a diagram illustrating a copy process sequence between media.

FIG. 15 is a diagram illustrating an example of data included in a copy execution request.

FIG. 16 is a diagram illustrating basic information included in server response information (Offer Response) 131.

MODE FOR CARRYING OUT THE INVENTION

Figure 1:
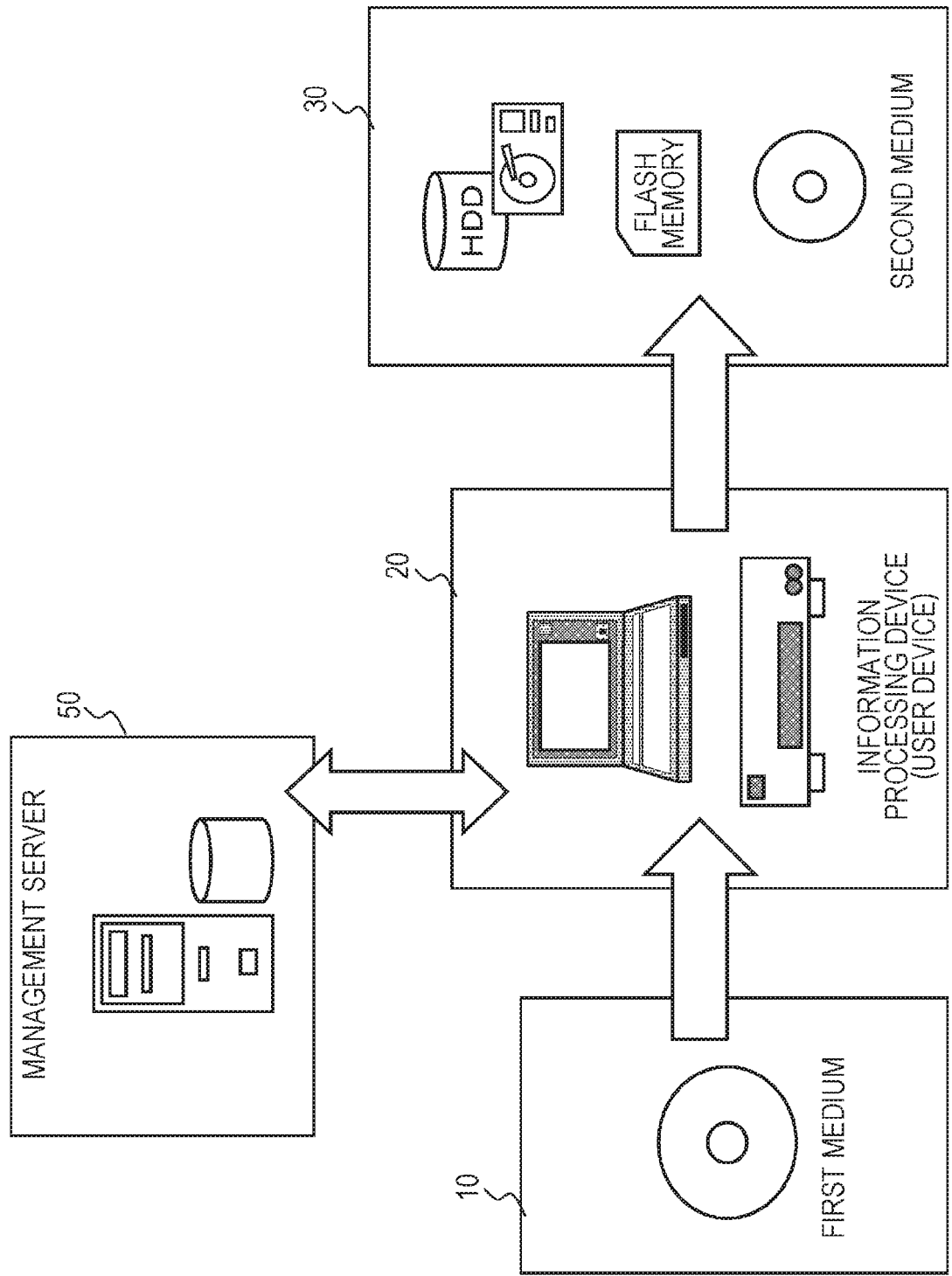
FIG. 1 is a diagram illustrating the outline of a managed copy (MC) system.

Hereinafter, an information processing device, and an information processing method, and a program according to the present disclosure will be described in detail with reference to the drawings. In addition, the description will be made in the order of the following items.

1. Outline of Content Copy Control Process Based on Server Management

2. For Outline of Usage Control Configuration According to Advanced Access Content System (AACS) Regulation 3. For Process for Reading Volume ID 4. For Specific Configuration of Media Key Block (MKB) and Data Reproduction Sequence in Information Processing Device 5. For Outline of Process for Copying Data Between Media Performed under Control of Server 6. For Process for Copying Data Between Media to Implement Content Usage Control for Copy Destination Medium, without Recording KCD on Copy Destination Medium 7. For Specific Sequence of Copy Process Between Media 7-1. Copy Process Sequence by Device (for Example, CE Device) Capable of Reading KCD 7-2. Copy Process Sequence by Device (for Example, PC) Incapable of Reading KCD 8. Embodiment in Which CPS Unit Key File Conversion Process Is Performed in Server 8-1. Copy Process Sequence by Device (for Example, CE Device) Capable of Reading KCD 8-2. Copy Process Sequence by Device (for Example, PC) Incapable of Reading KCD 9. Example of Hardware Configuration of Each Device 10. Summary of Configuration of Present Disclosure

[1. Outline of Content Copy Control Process Based on Server Management]

First, the outline of a content copy control process based on server management will be described with reference to FIG. 1.

For example, in general, much of content, such as a movie recorded on a Blu-ray (registered trademark) disc (BD), is allowed to be used according to a predetermined copyright law. Therefore, the user who has purchased a disk has predetermined limits in the use of content recorded on a disk. For example, an operation of copying the content recorded on the disk to a medium, such as another disk or a flash memory, without any restriction, is not allowed.

As the copy management configuration for the content stored in a medium, a copy permission process configuration has been known in which copy is permitted on condition that copy permission information is received from a management server. FIG. 1 is a diagram illustrating the outline of a managed copy (MC) system which is an example of the copy permission process configuration.

An information processing device 20 is, for example, a PC or a recorder (recording/reproducing device) of a user, can be provided with a first medium 10 on which, for example, a movie which is copyright management target content has been recorded, and can reproduce the content on the first medium 10.

The information processing device 20 can perform a process of copying the content recorded on the first medium 10 to a second medium 30 which is another medium. The second medium 30 is a medium on which data can be recorded by the information processing device 20 and is, for example, a hard disk (HDD), a flash memory, or a data-recordable disk (for example, a BD or a DVD).

However, when the user freely performs a copy process, a large number of copies of the content are generated, which results in the illegal use or distribution of the content. In order to prevent the illegal use or distribution, for example, the following method is used. In a case where the information processing device 20 which is a user device copies content, the information processing device 20 is connected to a management server 50 and receives copy permission information from the management server 50. It is necessary to perform, for example, a process of verifying the validity of the first medium of the user, a process of inputting an authentication code, and a process of paying a predetermined fee in order to receive the copy permission information.

The information processing device 20 which is a user device performs the predetermined procedure to receive the copy permission information from the management server 50 and can copy content on condition that the copy permission information is received. This is the outline of the managed copy (MC).

[For Outline of Usage Control Configuration According to Advanced Access Content System (AACS) Regulation]

Next, an example of the configuration of data recorded on a medium (the first medium 10 illustrated in FIG. 1) on which the content which is a copyright management target to be subjected to the managed copy (MC) has been recorded will be described.

In general, much of content, such as a movie recorded on a general content recorded disk, for example, a Blu-ray (registered trademark) disc (BD), is encrypted and recorded in order to prevent illegal use such as an illegal copy.

As described above, encrypted content based on an advanced access content system (AACS) standard which is a standard related to a content copyright protection technique is recorded as encrypted data which has been divided into units and in which different encryption keys have been applied to the units. The encryption configuration for each unit makes it possible to control the use of each unit and to implement strict and various types of content usage control.

The unit which is a division unit of content is referred to as a content management unit or a CPS unit and the encryption key corresponding to each CPS unit is referred to as a CPS unit key, a unit key, or a title key. FIG. 2 illustrates an example of the correspondence relationship between the division of the content recorded on the disk into units and the encryption keys (unit keys).

FIG. 2 illustrates an example of a unit key management table indicating the correspondence relationship between units (CPS units) forming content recorded on a certain medium, for example, a disk and CPS unit keys which are encryption keys. The unit key management table is recorded on a medium (for example, a BD) along with encrypted content.

As illustrated in FIG. 2, the CPS units which are data forming the content are classified into CPS units 1 to n. CPS unit keys which are unique encryption keys are associated with the CPS units 1 to n.

For example, in a case where the CPS unit 1 (CPS1) is reproduced, the CPS unit key 1 (Ku1) is used to perform decryption. In a case where the CPS unit 2 (CPS2) is reproduced, the CPS unit key 2 (Ku2) needs to be applied to perform decryption. For example, "title" is used as an index corresponding to each CPS unit and each CPS unit key. The "title" is an index that is set in correspondence with each CPS unit. The title is specified to specify the CPS unit and the CPS unit key.

Figure 3:
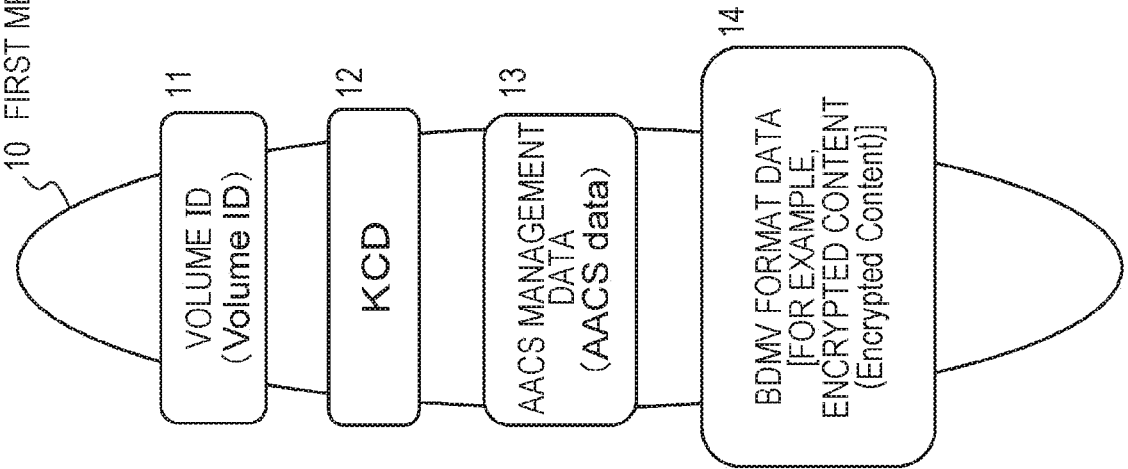
FIG. 3 is a diagram illustrating data recorded on a first medium which is a copy source medium.

FIG. 3 is a diagram illustrating an example of data recorded on the first medium 10 in a case where the first medium 10 is a ROM-type Blu-ray (registered trademark) disc.

The following data is recorded on the first medium:
(A) A Volume ID 11;
(B) Key conversion data (KCD) 12;
(C) AACS management data 13; and
(D) Blu-ray (registered trademark) disc movie (BDMV) format data 14.

(A) The volume ID 11 is, for example, an identifier that is recorded on the disk storing content with the same tile.

In addition, (A) the volume ID 11 is different from other normal recorded data and can be read only in a case where a reading process is performed using a specific dedicated protocol.

For example, the data can be read only in a case where a dedicated reading process program stored only in an information processing device based on the AACS regulation is executed.

(B) The key conversion data (KCD) 12 is applied to generate (convert) the encryption key during the reproduction of content.

In addition, in some cases, the KCD is not stored depending on media.

(C) The AACS management data 13 includes, for example, various types of management data, such as key data applied to decrypt encrypted content and a content certificate for certifying the validity of content.

(D) The BDMV format data 14 includes reproduction target data or control information applied to a reproduction process, such as encrypted content which is reproduction target data, a reproduction control program, or a playlist, and a control program.

The AACS management data 13 and the BDMV format data 14 will be described in detail with reference to FIGS. 4 and 5.

Figure 4:
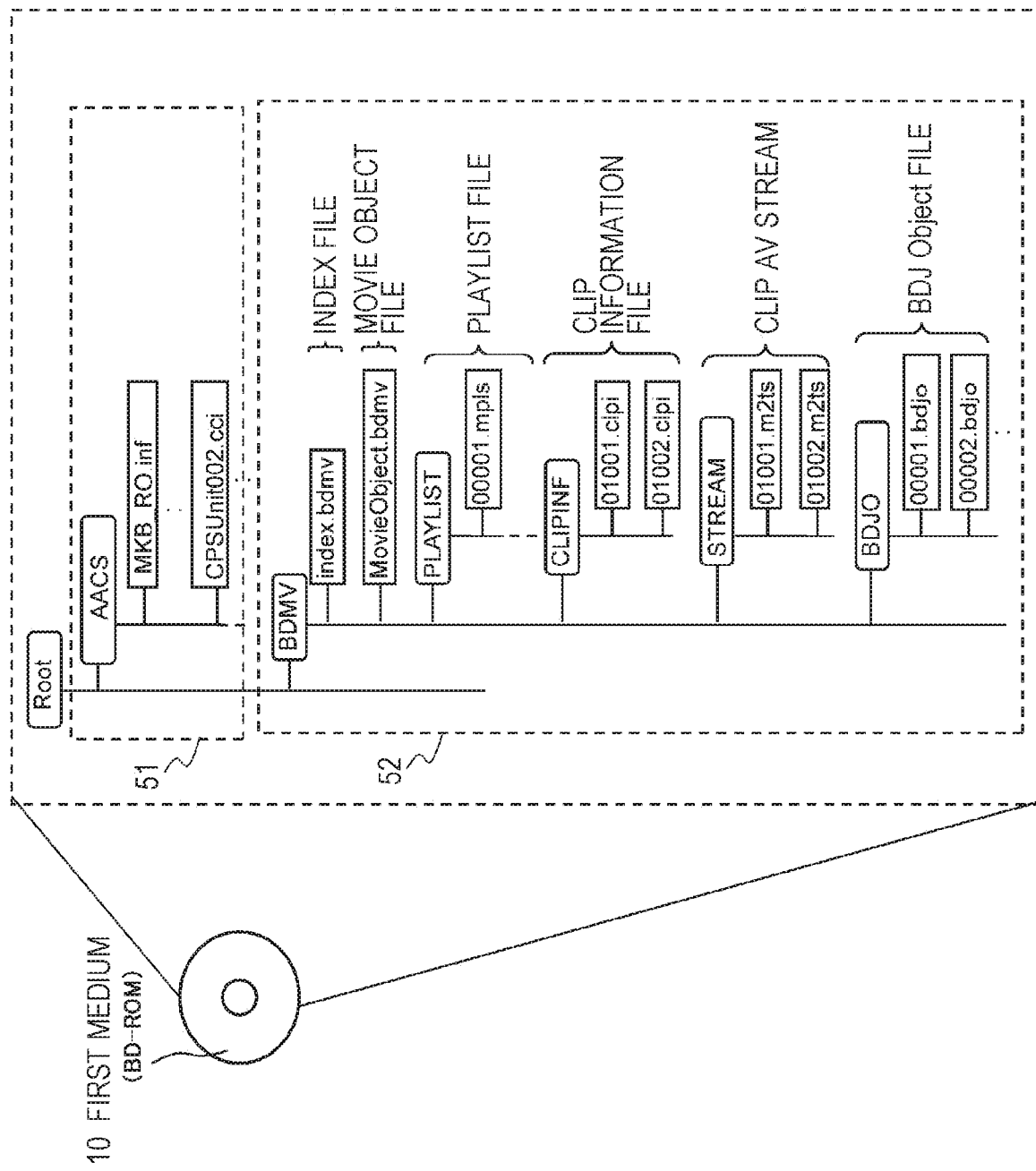
FIG. 4 is a diagram illustrating an example of the configuration of a directory in a medium and data stored in a data portion.
Figure 5:
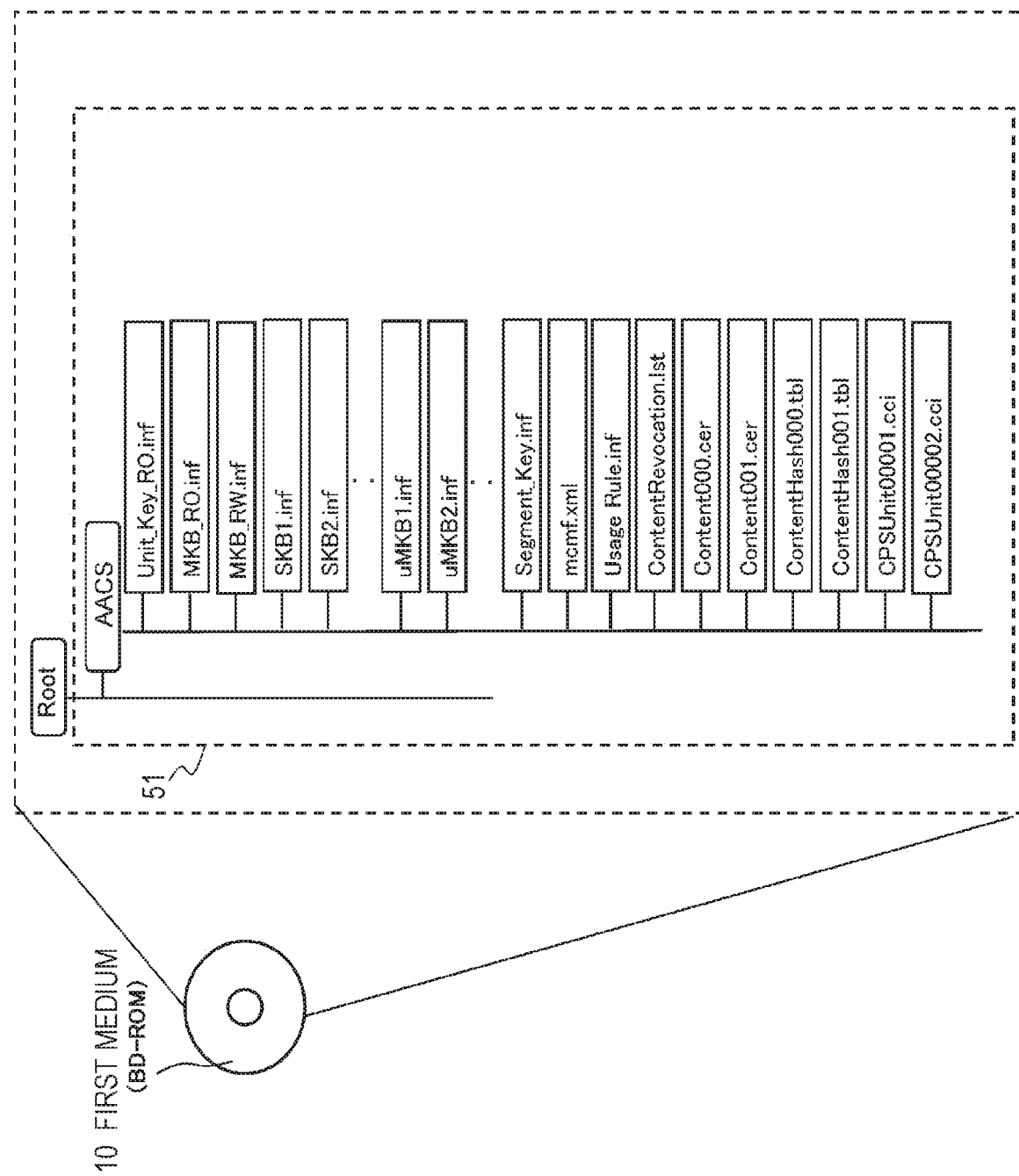
FIG. 5 is a diagram illustrating AACS management data recorded on a medium.

FIG. 4 illustrates the configuration of a directory corresponding to data recorded on a Blu-ray (registered trademark) disc (BD) in a case where the first medium 10 is a ROM-type Blu-ray (registered trademark) disc.

As illustrated in FIG. 4, the directory is divided into a management information setting portion 51 (AACS directory) and a data portion 52 (BDMV directory).

The management information setting portion 51 (AACS directory) is a directory in which the AACS management data 13 illustrated in FIG. 3 is recorded and the data portion 52 is a directory in which the BDMV format data 14 illustrated in FIG. 3 is recorded.

First, the data recorded in the data portion 52 will be described in detail with reference to FIG. 4.

Management information recorded in the management information setting portion 51 (AACS directory) will be described in detail below with reference to FIG. 5.

For example, an index file, a playlist file, a clip information file, a clip AV stream file, and a BDJO file are recorded in a BDMV directory in the data portion 52.

Title information which is index information applied to a reproduction process is stored in the index file. The title is similar to the title registered in the unit key management table which has been described with reference to FIG. 2 and is data associated with the CPS unit.

The playlist file is a file that defines, for example, the reproduction order of content according to program information of a reproduction program designated by the title and has designation information for clip information having reproduction position information.

The clip information file is a file designated by the playlist file and has, for example, reproduction position information of a clip AV stream file.

The clip AV stream file is a file that stores AV stream data to be reproduced.

The BDJO file is a file that stores execution control information of a file storing, for example, a JAVA (registered trademark) program and commands.

The sequence in which the information processing device reproduces content recorded on an information recording medium is as follows.

First, a specific title is designated from an index file by a reproduction application.

A reproduction program associated with the designated title is selected.

A playlist in which, for example, the reproduction order of content is defined is selected according to program information of the selected reproduction program.

A command or an AV stream as content data is read by clip information defined in the selected playlist and the AV stream is reproduced or the command is executed.

In the content reproduction process, it is possible to determine the units and the unit keys which have been described with reference to FIG. 2 according to the selected title. A unit key corresponding to the unit to be reproduced is acquired and a decryption process is performed for each unit. In a case where the copy process described with reference to FIG. 1 is performed, copy target data is specified with reference to information received from the management server 50 and the copy process is performed.

Next, the management information recorded in the management information setting portion 51 (AACS directory) will be described in detail with reference to FIG. 5.

Various types of management data (AACS management data), such as usage control information and key information applied to decrypt the encrypted content recorded in the data portion 52, are recorded in the management information setting portion 51 (AACS directory). Specifically, for example, the following data are recorded.

(a) A media key block (MKB)
For example, MKB_RO.inf
(b) A sequence key block (SKB)
For example, SKB1.inf
(c) A unified media key block (Unified MKB)
For example, uMKB1.inf
(d) A segment key
For example, Segment_Key.inf
(e) A copy control management file [a managed copy manifest file (MCMF)]
mcmf.xml
(f) Usage control information (Usage Rule)
UsageRule.inf
(g) A content revocation list (CRL)
ContentRevocation.1st
(h) A content certificate
For example, Content000.cer
(i) A content hash table
For example, ContentHash000.tbl
(j) A CPS unit key
For example, CPS unit00001.cci These data are, for example, management data defined by an advanced access content system (AACS) which is a standard management system related to a content copyright protection technique.

Among the above-mentioned AACS management data, each of the following data is key data applied to decrypt encrypted content:
(a) A media key block (MKB);
(b) A sequence key block (SKB);
(c) A unified media key block (Unified MKB);
(d) A segment key; and
(j) A CPS unit key.

The media key block (MKB) will be described in brief. The MKB is an encryption key block that is generated on the basis of a tree-structure key delivery system which has been known as an aspect of a broadcast encryption system. The MKB is a key information block that enables the acquisition of a media key [Km] which is a key required to decrypt content, only using a process (decryption) based on a device key [Kd] stored in the information processing device of the user having a valid license. An information delivery system according to a so-called hierarchical tree structure is applied to the MKB and the MKB enables the acquisition of the media key [Km] only in a case where the user device (information processing device) has a valid license. The MKB disables the acquisition of the media key [Km] in a revoked (revoking process) user device. A device key [Kd] is stored in a memory of the information processing device that reproduces content.

(e) A copy control management file [managed copy manifest file (MCMF)]
This is a file that is applied when the process of copying content recorded on a medium is performed and is, for example, XML description data including the data illustrated in FIG. 6.

The data configuration of a copy control management file (managed copy manifest file (MCMF)) 111 will be described with reference to FIG. 6.

The copy control management file (MCMF) includes, for example, the following data:

(1) A management server URL: access information of a management server providing copy permission information.

(2) Copy data information (dealManifest)

(2-1) A playlist file name: a file name of a playlist to be copied.

(2-2) CPS unit key Information: identification information of a CPS unit key applied to a decryption process for content to be copied.

(2-3) A copy unit identifier: unit identification information of a copy unit (MC unit) indicating the unit of copy in managed copy (MC).

(3) A content ID: an identifier of content to be copied.

For example, an international standard audiovisual number (ISAN) number is used as content code information.

For example, in general, a creator or a distributor has a copyright or a distribution right to much of content, such as music data or image data, recorded on the information recording medium. Therefore, the user who has purchased a disk has limits in the use of content recorded on the disk. For example, the unrestricted copy of the content recorded on the disk to other media is not permitted.

As the copy management configuration for the content stored in a medium, there is a configuration in which copy is permitted on condition that copy management information is received from a management server, that is, managed copy (MC).

Specifically, for example, a process is performed in the following sequence.

The user inserts the first medium which is a copy source, such as a content-stored disk, into a user device, such as a PC or a recording/reproducing device, and the user device is connected to the management server through a network. Then, the user device transmits predetermined information, such as a disk identifier (ID) of the first medium, to the server.

The server verifies, for example, the validity of the received information and transmits copy management information in which, for example, copy permitted data has been recorded to the user device. The user device can check the copy permission data recorded in the copy management information transmitted from the server, readout copy target data from the first medium, and copy the copy target data to the second medium which is a copy destination.

(e) The copy control management file [managed copy manifest file (MCMF)] is a file in which, for example, copy permission target data information or management server access information required for the managed copy (MC) process has been recorded.

(f) Usage control information (Usage Rule)

This is a file in which content usage permission information, for example, reproduction permission information or copy permission information has been recorded.

This is a file that is issued and signed by a predetermined content administrator and is prevented from being falsified.

A reproduction device can use the content in a permission range recorded in the usage control information.

(g) A content revocation list (CRL)

This is a list of illegal content that is not allowed to be used, for example, to be reproduced, such as illegally copied content.

This is a list that is issued by a predetermined content administrator, is signed by the content administrator, and is prevented from being falsified.

The reproduction device performs a reproduction process on the basis of the revocation list on condition that it is checked that the content scheduled to be reproduced is not illegal content.

(h) A content certificate

This is a certificate for certifying the validity of content and has, for example, an AACS signature issued by the AACS and is prevented from being falsified.

The reproduction device performs a reproduction process on the basis of the content certificate on condition that it is checked that the content scheduled to be reproduced is legal content.

(i) A content hash table

This is a table that stores a hash value of content. The hash value of the content hash table is included in the content certificate to prevent falsification.

The reproduction device compares the hash value recorded in the content hash table with a hash value generated from the content scheduled to be reproduced and performs a reproduction process on condition that it is checked that the content is not falsified and is legal.

[3. For Process for Reading Volume ID]

In FIG. 3, the volume ID 11 as data recorded on the first medium 10 is data that can be read only in a case where a reading process is performed using a specific dedicated protocol, unlike other normal recorded data, as described above with reference to FIG. 3.

For example, these data can be read only in a case where a dedicated reading process program stored only in the information processing device according to the AACS regulation is performed.

Specifically, a volume ID reading protocol (protocol for transferring a volume identifier) according to the AACS regulation can be applied to read the volume ID.

The sequence of the volume ID reading protocol (protocol for transferring a volume identifier) according to the AACS regulation will be described with reference to FIG. 7.

In FIG. 7, a drive device that performs a process of reading data from a BD-ROM disk which is the first medium 10 is illustrated on the left side and a host device that outputs a request to read data from a disk to the drive device and receives read data from the drive device is illustrated on the right side.

In addition, these devices are, for example, components of the information processing device 20 illustrated in FIG. 1.

Processes in each step illustrated in FIG. 7 will be described.

(Step S11)

First, in step S11, an authentication process and a session key (also referred to as a bus key (BK)) sharing process are performed between the host and the drive device.

The authentication process is performed as an authentication process based on, for example, a public key cryptosystem.

In a case where the authentication process is established and the reliability of both devices is confirmed, the processes in step S12 and the subsequent steps are performed.

In a case where authentication is not established, the processes in step S12 and the subsequent steps are stopped.

(Step S12)

When the authentication process is established in step S11, the host outputs a request to read the volume ID to the drive device in step S12.

(Step S13)

When the request to read the volume ID is input from the host, the drive device reads the volume ID from the disk and calculates the value (Dm) of a message authentication code (MAC) as a verification value based on the read volume ID in step S13. For example, the MAC value (Dm) is calculated by the following expression:

$$Dm = CMAC(BK, Volume\_ID).$$

(Step S14)

In step S14, the drive device outputs the volume ID read from the disk and the MAC value (Dm) calculated as the verification value based on the volume ID to the host.

(Step S15)

When receiving the volume ID and the MAC value (Dm) which is the verification value based on the volume ID from the drive device, the host performs a process for verifying the validity of the received volume ID in step S15.

First, the host calculates a new MAC value (Hm) based on the received volume ID, using the following expression:

$$Hm=CMAC(BK,\text{Volume\_ID}).$$

Then, the host checks whether the calculated MAC (Hm) is equal to the MAC value (Dm) received from the drive device.

$$\text{Verify } Dm=Hm$$

When the calculated MAC (Hm) is equal to the received MAC (Dm), the host determines that the received volume ID is valid data.

In a case where the MAC values are not equal to each other, the host determines that the received volume ID is not valid.

Only in a case where it is determined that the received volume ID is valid data, the host performs the next process, for example, a process of copying the data read from the first medium 10 to a memory card which is the second medium.

[4. For Specific Configuration of Media Key Block (MKB) and Data Reproduction Sequence in Information Processing Device]

Next, the specific configuration of the media key block (MKB) and the data reproduction sequence in the information processing device will be described.

As described above, the media key block (MKB) is an encryption key block that is generated on the basis of the tree-structure key delivery system which has been known as an aspect of the broadcast encryption system. The MKB is a key information block that enables the acquisition of a media key [Km] which is a key required to decrypt content, only using a process (decryption) based on a device key [Kd] stored in the information processing device of the user having a valid license. An information delivery system according to a so-called hierarchical tree structure is applied to the MKB and the MKB enables the acquisition of the media key [Km] only in a case where the user device (information processing device) has a valid license. The MKB disables the acquisition of the media key [Km] in a revoked (revoking process) user device. A device key [Kd] is stored in a memory of the information processing device that reproduces content.

Figure 8:
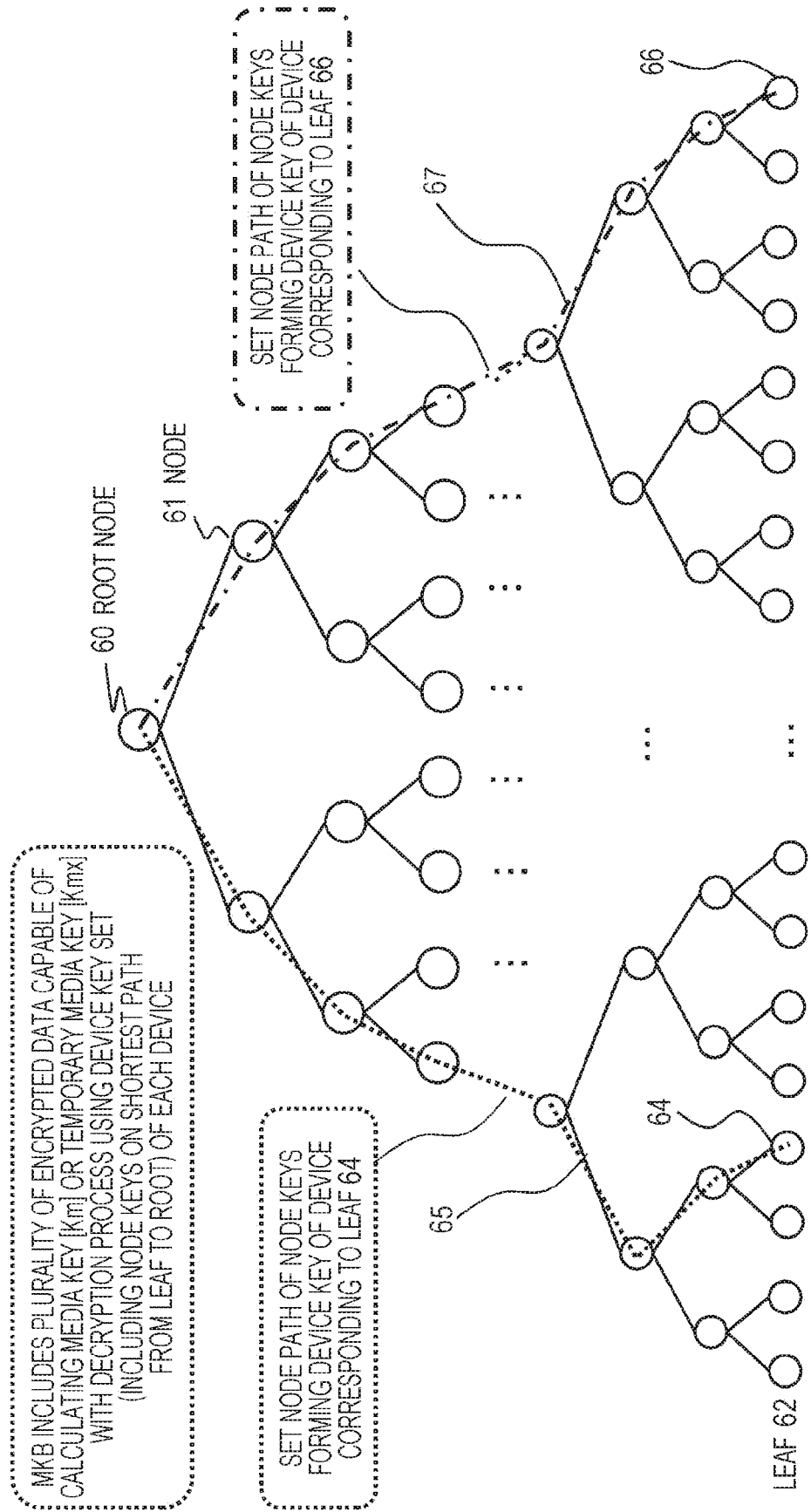
FIG. 8 is a diagram illustrating a media key block (MKB).

FIG. 8 is a diagram illustrating an example of the key delivery configuration with a tree structure used in the MKB.

Encryption key data to be decrypted by the device key stored in the user device (information processing device) is stored in the MKB.

A tree structure illustrated in FIG. 8 illustrates a two-branch tree structure in which a root node 60 is a vertex node and a leaf node 62 is the lowest node.

Each leaf 62 in the lowest layer is associated with an individual user device or a user device group.

Intermediate nodes, such as nodes 61, are set as a plurality of branch points between the root node and the leaf nodes. Different node keys are associated with all of the root node, the leaf nodes, and the intermediate nodes.

The device corresponding to the leaf in the lowest layer stores, as the device key, node keys corresponding to the nodes along the shortest path from the leaf to the root.

For example, for the user device associated with a leaf 64, a key set including a plurality of node keys of the nodes on the path represented by a dotted line 65 in FIG. 8 are stored as the device key in a storage unit of the device.

Similarly, for the user device associated with a leaf 66, a key set including a plurality of node keys of the nodes on the path represented by a one-dot chain line 67 in FIG. 8 are stored as the device key in a storage unit of the device.

The MKB includes a plurality of encryption key data that are capable of calculating a key (for example, a media key (Km)) required to calculate a title key (Kt) applied to an encrypted content decryption process, using a decryption process applying the device key (node key set) of the device corresponding to each leaf.

That is, the MKB stores a plurality of encryption key data each of which is capable of calculating the media key (Km) using the decryption process with one or more node keys corresponding to the tree structure illustrated in FIG. 8.

Each of the plurality of encryption key data stored in the MKB is capable of calculating the media key using a combination of different node keys.

For example, the user device associated with the leaf 64 selects one encryption key data item included in the MKB, applying one or more node keys of the nodes on the path represented by the dotted line 65, and performs the decryption process to acquire the media key (Km).

In addition, the user device associated with the leaf 66 selects one encryption key data item included in the MKB, applying one or more node keys of the nodes on the path represented by the dotted line 67, and performs the decryption process to acquire the media key (Km).

The devices corresponding to different leaves store different device keys and different encryption key data are selected as decryption targets from the MKB.

There is a process of excluding (revoking) an unauthorized device as a method for effectively using the MKB.

For example, in a case where it has been proved that copy content illegally copied from a device manufactured by a given manufacturer is spread through the network, a process is performed which upgrades the version of the MKB to generate an MKB that disables the calculation of the media key (Km) with the device key stored in the device determined to be an unauthorized device and stores the upgraded MKB in a new disk to be put on sale.

The revoke process will be described with reference to FIG. 9.

Figure 9:
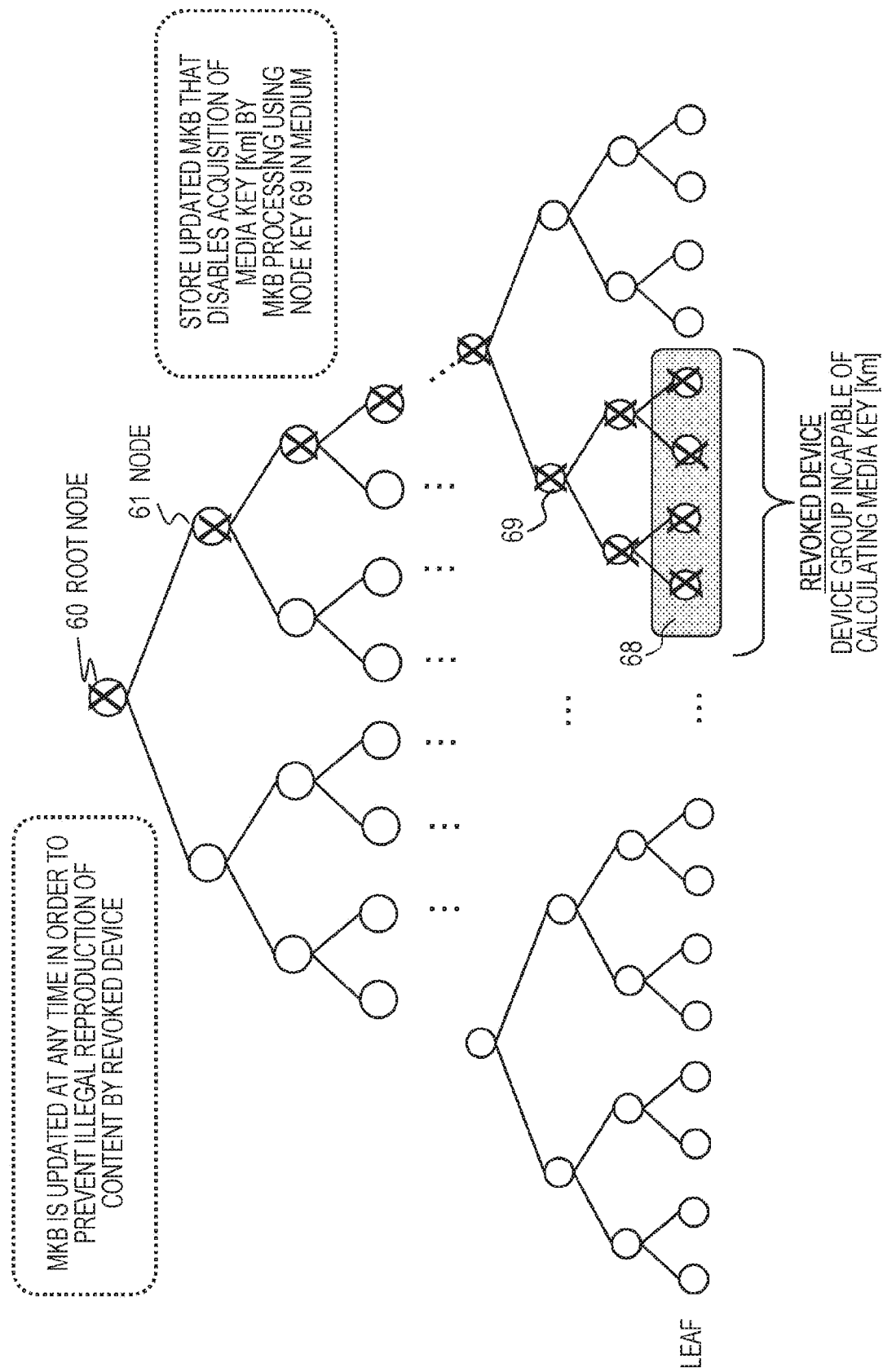
FIG. 9 is a diagram illustrating a revoke process applying the MKB.

For example, it is assumed that the user devices corresponding to a leaf group 68 illustrated in FIG. 9 are a group of reproduction devices manufactured by a given manufacturer and it has been proved that illegally copied content is distributed from these devices to the network.

In this case, a new MKB from which the encryption key data capable of calculating the media key (Km) using the device keys stored in the devices in the leaf group 68 has been removed is created. Then, the new MKB is stored in a new encrypted-content-stored disk to be put on sale and is then provided to the user.

The device keys stored in the devices in the leaf group 68 are node keys corresponding to nodes marked with a symbol (X) illustrated in FIG. 9.

The updated MKB stores only an encryption media key that is not capable of calculating the media key (Km) with only a combination of the node keys corresponding to the nodes marked with X.

The devices corresponding to the leaves other than the leaf group 68 illustrated in FIG. 9 have node keys corresponding to the nodes other than the nodes marked with X and any one of the encryption key data (encryption media key) stored in the updated MKB is decrypted by the decryption process using one or more combinations of the node keys corresponding to the nodes other than the nodes marked with X to acquire the media key (Km).

As such, one of the advantages of the MKB is that an unauthorized device is revoked (excluded) so as to be disabled to calculate the media key (Km) and to perform the encrypted content decryption process and the illegal use of the encrypted content is prevented.

Next, an example of the usage in which the key that can be acquired from the MKB is changed depending on the type (category) of user devices will be described as an example of the usage of the MKB with reference to FIG. 10.

Figure 10:
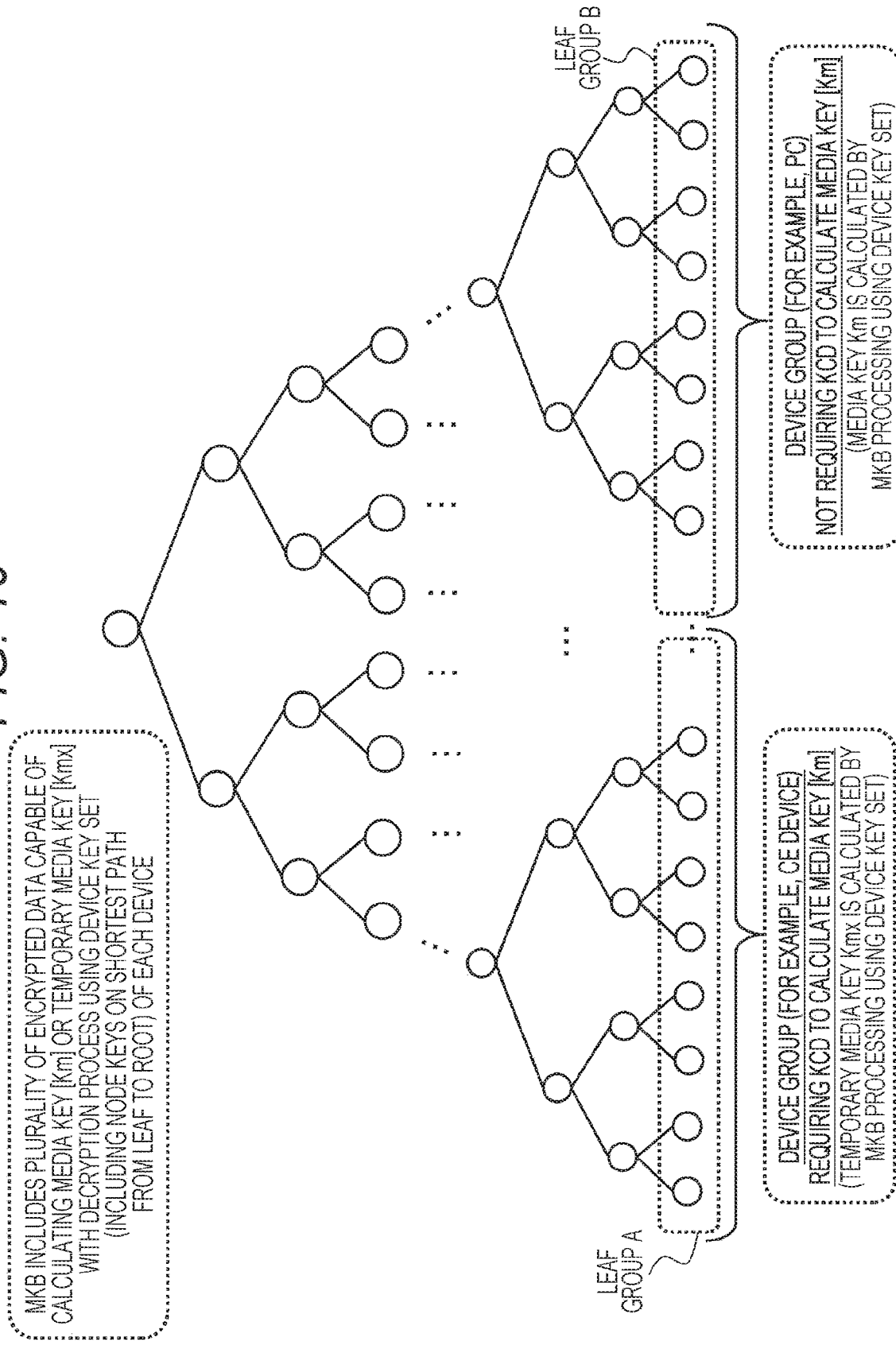
FIG. 10 is a diagram illustrating an example in which a key that can be acquired from the MKB is changed depending on the type (category) of user devices.

As illustrated in FIG. 10, the leaves are classified into two groups, that is, a leaf group A and a leaf group B.

The user device corresponding to the leaf in the leaf group B can calculate the media key (Km) from the MKB using the device key (node key set).

In contrast, the user device corresponding to the leaf in the leaf group A is not capable of calculating the media key (Km) from the MKB using the device key (node key set). The user device corresponding to the leaf in the leaf group A can calculate a temporary media key (Kmx) from the MKB using the device key (node key set).

That is, the MKB stores a plurality of encrypted data of the following two different keys:

(1) An encryption media key (encryption Km); and
(2) A temporary encryption media key (encryption Kmx).

"(1) The encryption media key" stored in the MKB is encryption key data that is capable of calculating the media key (Km) with the decryption process using the device key (node key set) stored in the user device corresponding to the leaf in the leaf group B.

In addition, "(2) the temporary encryption media key" stored in the MKB is encryption key data that is capable of calculating the temporary media key (Kmx) with the decryption process using the device key (node key set) stored in the user device corresponding to the leaf in the leaf group A.

This configuration makes it possible to classify the user devices into groups and to reproduce the same encrypted content stored in the same disk in different sequences for each group.

Specifically, there are the following configurations.

For example, it is assumed that the user devices belonging to the leaf group A are CE devices (devices for only recording and reproduction) and the user devices belonging to the leaf group B are, for example, PCs.

The user devices, such as PCs, belonging to the leaf group B can calculate the media key (Km) with the decryption process using the device keys (node key sets).

In contrast, the CE devices (devices for only recording and reproduction) belonging to the leaf group A can calculate the temporary media key (Kmx) with the decryption process using the device keys (node key sets).

In addition, the CE devices can perform an encryption process (for example, a one-way function (AES-G)) using key conversion data (KCD) stored in the disk for the temporary media key (Kmx) to calculate the media key (Km).

Figure 11:
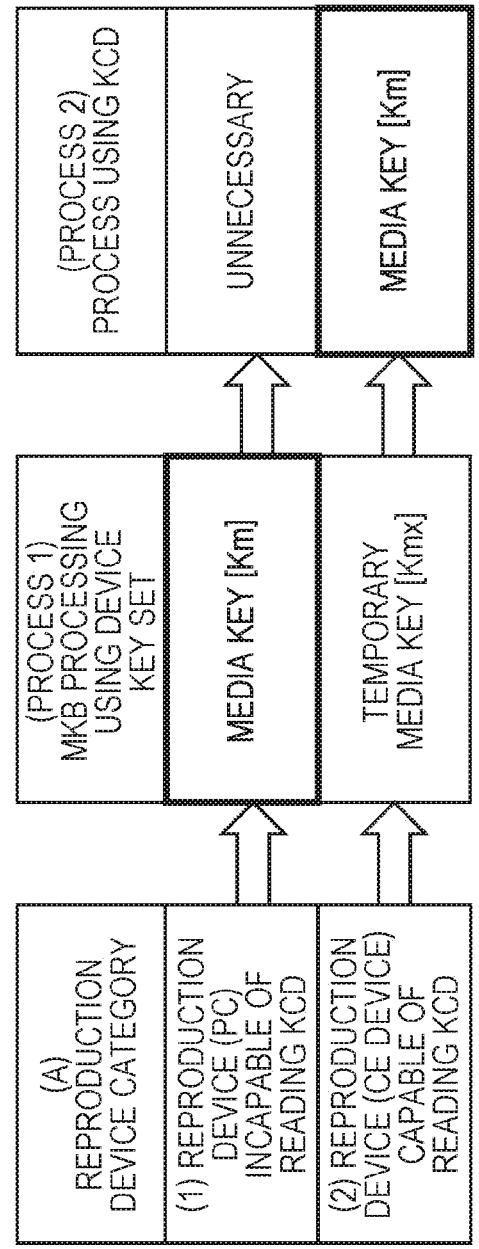
FIG. 11 is a diagram illustrating an example in which a key that can be acquired from the MKB is changed depending on the type (category) of user devices.

FIG. 11 is a diagram illustrating a media key (Km) acquisition sequence corresponding to each category of reproduction devices.

It is assumed that reproduction devices are classified into the following two categories:

(1) A reproduction device (for example, a PC) incapable of reading KCD; and
(2) A reproduction device (CE device) capable of reading KCD.

(1) The reproduction device (for example, a PC) incapable of reading KCD corresponds to the user group B illustrated in FIG. 10.

(2) The reproduction device (CE device) capable of reading KCD corresponds to the user group A illustrated in FIG. 10.

(1) The reproduction device (for example, a PC) incapable of reading KCD can directly calculate the media key (Km) with the decryption process using the device key (node key set) stored in the PC device.

(2) The reproduction device (CE device) capable of reading KCD is not capable of directly calculating the media key (Km) with the decryption process using the device key (node key set) stored in the CE device and can calculate the temporary media key (Kmx).

In addition, (2) the reproduction device (CE device) capable of reading KCD can perform an encryption process (for example, a one-way function (AES-G)) using key conversion data (KCD) stored in the disk for the temporary media key (Kmx) to calculate the media key (Km).

The content decryption and reproduction sequence of the devices belonging to the two categories will be described with reference to FIGS. 12 and 13.

Figure 12:
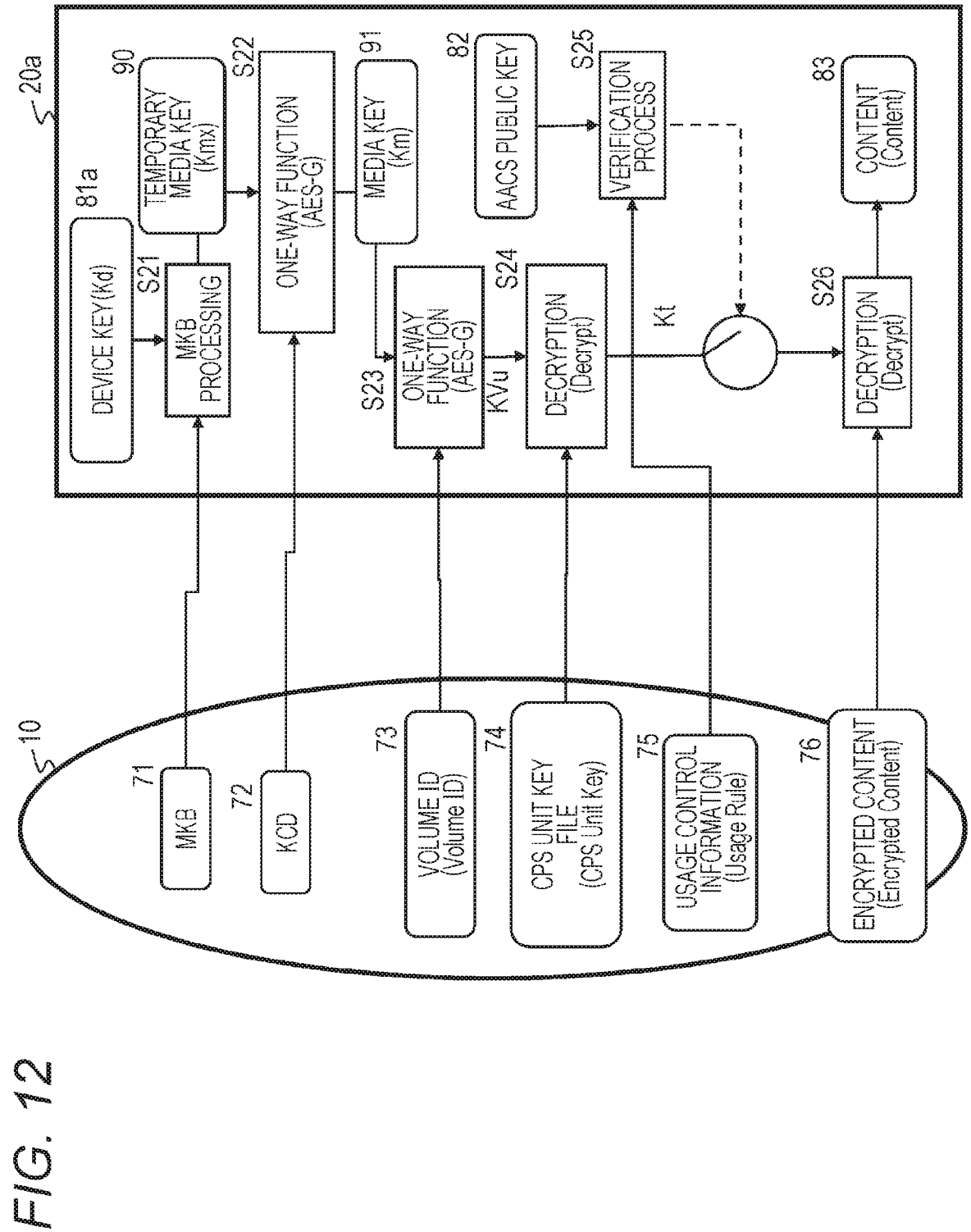
FIG. 12 is a diagram illustrating the sequence of a process of decrypting and reproducing data from a medium applying KCD.
Figure 13:
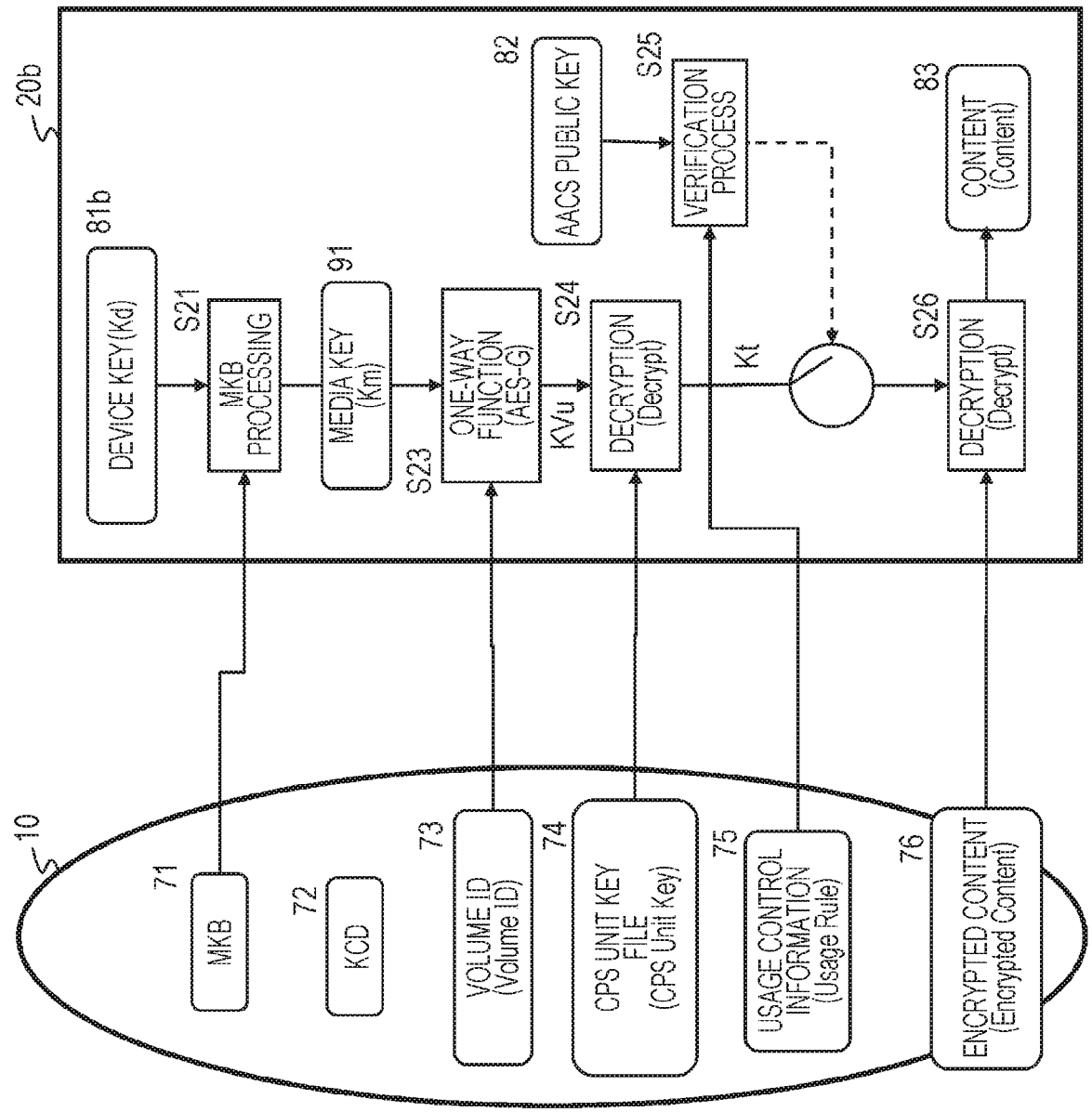
FIG. 13 is a diagram illustrating the sequence of a process of decrypting and reproducing data from a medium without applying KCD.

FIGS. 12 and 13 are diagrams illustrating a process sequence for reproducing content, such as a movie, of which the usage has been controlled in the devices belonging to the following two categories:

(A) FIG. 12: a content decryption and reproduction sequence in a device that needs to use the key conversion data (KCD), for example, a CE device; and (B) FIG. 13: a content decryption and reproduction sequence in a device that does not need to use the key conversion data (KCD), for example, a PC.

First, the content decryption and reproduction sequence in the device that needs to use the key conversion data (KCD), for example, the CE device during an encrypted content decryption and reproduction process will be described.

FIG. 12 is a diagram illustrating an example of a reproduction process applying the following data recorded on the first medium 10 such as a BD:

An MKB 71;
KCD 72;
A volume ID 73;
A CPS unit key file 74;
Usage control information 75; and
Encrypted content 76.

An example of the reproduction process applying each of these data will be described.

The first medium 10 is inserted into an information processing device 20a as the user device. Then, for example, a key generation process and a content decryption process are performed according to a predetermined sequence and content reproduction is performed. The information processing device 20a is, for example, a CE device (device for only recording and reproduction).

The processes performed by the information processing device 20a will be described.

The information processing device 20a is a device corresponding to AACS and has a device key [Kd] 81a stored in a memory.

Here, the device key [Kd] 81*a* is, for example, a set of node keys on the shortest path from one leaf node belonging to the leaf group A to the root node in the hierarchical tree structure described with reference to FIG. 10.

First, the information processing device 20*a* reads the MKB 71 stored in the first medium 10. In step S21, the information processing device 20*a* performs MKB processing applying the device key 81*a* stored in its memory to acquire a temporary media key [Kmx] 90.

The information processing device 20*a* is, for example, a CE device (device for only recording and reproduction) and belongs to the leaf group A illustrated in FIG. 10.

Therefore, the key obtained by performing the MKB processing applying the device key 81*a* is the temporary media key [Kmx] 90.

Then, the information processing device 20*a* reads the KCD 72 stored in the first medium 10. In step S22, the information processing device 20*a* performs an encryption process (AES-G) applying the KCD 72 for the temporary media key [Kmx] 90 which has been calculated from the MKB in step S21 to acquire a media key [Km] 91.

In addition, in step S23, the information processing device 20*a* reads the volume ID 73 stored in the first medium 10 and performs an encryption process (AES-G) applying the media key [Km] to generate a volume unique key [KVu].

Furthermore, in step S24, the information processing device 20*a* reads the CPS unit key file 74 stored in the first medium 10 and performs a decryption process applying the volume unique key [KVu] to generate a CPS unit key (title key) [Kt].

In addition, in step S25, the information processing device 20*a* reads the usage control information 75 stored in the first medium 10 and performs a verification process (for example, signature verification) for the usage control information 75 applying an AACS public key 82 stored in the memory to determine whether the usage control information 75 is valid usage control information. The use of the content is permitted according to the description of the usage control information determined to be valid.

Then, in step S26, the information processing device 20*a* decrypts the encrypted content 76 stored in the media 10 applying the CPS unit key (title key) [Kt] and reproduces content 83.

Next, the content decryption and reproduction sequence in the device that does not need to use the key conversion data (KCD), for example, a PC during the encrypted content decryption and reproduction process will be described with reference to FIG. 13.

Similarly to FIG. 12, FIG. 13 is a diagram illustrating an example of a reproduction process applying the following data recorded on the first medium 10 such as a BD:

An MKB 71;
KCD 72;
A volume ID 73;
A CPS unit key file 74;
Usage control information 75; and
Encrypted content 76.

An example of the reproduction process applying each of these data will be described.

The first medium 10 is inserted into an information processing device 20*b* as the user device. Then, for example, a key generation process and a content decryption process are performed according to a predetermined sequence and content reproduction is performed. The information processing device 20*b* is, for example, a PC.

The processes performed by the information processing device 20*b* will be described.

The information processing device 20*b* is a device corresponding to AACS and has a device key [Kd] 81*b* stored in a memory.

Here, the device key [Kd] 81*b* is, for example, a set of node keys on the shortest path from one leaf node belonging to the leaf group B to the root node in the hierarchical tree structure described with reference to FIG. 10.

First, the information processing device 20*b* reads the MKB 71 stored in the first medium 10. In step S21, the information processing device 20*b* performs MKB processing applying the device key 81*b* stored in its memory to acquire a media key [Km] 91.

The information processing device 20*b* is, for example, a PC and belongs to the leaf group B illustrated in FIG. 10.

Therefore, the key obtained by performing the MKB processing applying the device key 81*b* is the media key [Km] 91.

Then, the information processing device 20*a* performs a process in step S23.

That is, the information processing device 20*b* does not perform the above-mentioned process applying the KCD 72 in step S22 illustrated above in FIG. 12 and performs the process in step S23.

In step S23, the information processing device 20*b* reads the volume ID 73 stored in the first medium 10 and performs an encryption process (AES-G) applying the media key [Km] to generate a volume unique key [KVu].

Furthermore, in step S24, the information processing device 20*b* reads the CPS unit key file 74 stored in the first medium 10 and performs a decryption process applying the volume unique key [KVu] to generate a CPS unit key (title key) [Kt].

In addition, in step S25, the information processing device 20*a* reads the usage control information 75 stored in the first medium 10 and performs a verification process (for example, signature verification) for the usage control information 75 applying an AACS public key 82 stored in the memory to determine whether the usage control information 75 is valid usage control information. The use of the content is permitted according to the description of the usage control information determined to be valid.

Then, in step S26, the information processing device 20*b* decrypts the encrypted content 76 stored in the media 10 applying the CPS unit key (title key) [Kt] and reproduces content 83.

As described with reference to FIGS. 12 and 13, the devices are classified into the following two categories:

(A) A device that needs to use the key conversion data (KCD), for example, a CE device; and
(B) A device that does not need to use the key conversion data (KCD), for example, a PC.

[5. For Outline of Process for Copying Data Between Media Performed under Control of Server]

Next, the outline of a process for copying data between media performed under the control of the server will be described.

FIG. 14 is a diagram illustrating the sequence of managed copy (MC) which is a content copy process under the control of the server.

FIG. 14 sequentially illustrates the first medium 10, such as a ROM disk on which content, such as a movie, has been recorded, the information processing device 20 that is a user device, reads data, such as content, from the first medium 10, and performs a copy process, the second medium 30 that is a content copy destination medium, and the management server (MC server) 50 that performs a process of providing, for example, content copy permission information from the left side.

The information processing device 20 is, for example, a PC or a recording/reproducing device and performs a process of receiving data read from the first medium 10 and records the data on the second medium 30 as a copy destination medium, that is, a content copy process.

The first medium 10 is, for example, a ROM-type Blu-ray (registered trademark) disc or a DVD disk. The second medium 30 is a medium such as a flash memory or a hard disk (HDD).

As illustrated in FIG. 14, the following data are recorded on the first medium 10 which is, for example, a ROM disk:
(A) BDMV format data 111;
(B) AACS management data 112;
(C) Data (for example, a volume ID) 113 readable by a dedicated protocol; and
(D) Key conversion data (KCD) 114.

The BDMV format data 111 includes encrypted content of which the usage is to be controlled.

As described above with reference to FIG. 2, the encrypted content has a configuration in which usage management is performed for each content management unit (CPS unit) and is obtained by an encryption process of applying different unit keys (CPS unit keys) to the CPS units. That is, units are encrypted by different keys (referred to as CPS unit keys, unit keys, or title keys) in order to implement different types of usage control for each unit of data.

The AACS management data 112 includes a copy control management file (for example, MCMF) 115.

The data (for example, a volume ID) 113 readable by a dedicated protocol can be read only in a case where a reading process is performed using a specific dedicated protocol, unlike other data.

For example, the data can be read only by executing a dedicated reading process program stored only in an information processing device according to the AACS regulation.

First, in step S51, the information processing device 20 transmits a copy execution request (Offer Request) to the management server 50, applying server information (for example, a URI) which is recorded on the copy control management file (MCMF) 113 recorded on the first medium 10.

At that time, for example, a content ID corresponding to the content to be copied is transmitted to the management server 50.

FIG. 15 illustrates an example of data included in the copy execution request. As illustrated in FIG. 15, the copy execution request includes, for example, the following data:
(a) A content ID: an identifier of content stored in the first medium;
(b) A content certificate ID: a certificate for verifying the validity of the content;
(c) A media identifier: an identifier of the first medium as a copy source;
(d) A random number: data for verifying data validity; and
(e) A language code: code information of a language used by the information processing device.

Among the above-mentioned information items, the information items (a) to (c) are read from the first medium 10. (d) The random number is generated in the information processing device 20. As (e) the language code, a language code that has been recorded on the memory of the information processing device 20 in advance is acquired and transmitted.

In addition, the language code is used to determine, for example, the language of detailed offer information included in a response provided by the management server 50.

Returning to FIG. 14, the content copy process sequence under the control of the server will be continuously described. In step S52, the management server 50 performs a process of verifying, for example, the validity of received information, such as the content ID received from the information processing device 20. In a case where it has been verified that there is no problem in the validity, the management server 50 generates server response information (Offer Response) 131 and transmits the server response information 131 to the information processing device 20.

Basic information included in the server response information (Offer Response) 131 provided from the management server 50 to the information processing device 20 will be described with reference to FIG. 16.

The basic information in the server response information (Offer Response) 131 includes, for example, the following information items:
(1) Detailed offer information;
(1a) Title/abstract/description: information about a title, an abstract, and description corresponding to copy permitted content;
(1b) A copy unit identifier (MCU): an identifier for identifying a copy unit as the unit of copy;
(1c) Price information (price): price information of copy;
(1d) Price auxiliary information (priceInfo): auxiliary information of a price;
(1e) A payment server URL (financialHTMLURL): access information of a server that performs a process of paying a copy fee; and
(1f) Copy destination information (mcotInfo): information indicating, for example, the type of medium permitted as a copy destination device. For example, the type of medium, such as an HDD or a flash memory, is recorded.
(2) A random number (mcmNonce): a random number for verifying data validity.
(3) Copy data information (a file name to be copied) (=dealManifest)
(3a) A playlist file name (PlayList file name): a file name in a playlist to be copied. In addition, a playlist is specified to specify a clip information file or a clip AV stream file.
(3b) CPS unit key information (an index to identify the CPS unit key): identification information of a key (CPS unit key) for decrypting copy content.
(3c) A copy unit identifier (MCUi): identification information of a copy unit (MCU) indicating the unit of copy.
(4) A server public key certificate (MCScert): a certificate storing a server public key used for, for example, encryption communication and signature verification.
(5) Signature: signature data for checking falsification for the entire data.

These information items are the basic information included in the server response information (Offer Response) 131 provided from the management server 50 to the information processing device 20. These information items are set to each copy unit (MCU) as the unit of a copy process.

For example, in the same content A, the copy unit is set according to a copy destination medium. That is, the copy unit is set as follows:

A copy unit 0001 of the content A is set for a hard disk; and

A copy unit 0002 of the content A is set for a flash memory.

In addition, the server response information (Offer Response) 131 illustrated in FIG. 16 includes similar information to that recorded in the copy control management file (MCMF) recorded on the first medium 10 which has been described with reference to FIG. 6. For example, the server response information (Offer Response) 131 includes (3) the copy data information (File name to be copied) (=dealManifest). For these information items, the information received from the management server 50 is preferentially copied. This is because the information received from the management server 50 is likely to be sequentially updated.

Returning to FIG. 14, the content copy process sequence under the control of the server will be described. In step S52, the management server 50 performs a process of verifying, for example, the validity of the received information, such as the content ID received from the information processing device 20. In a case where it has been verified that there is no problem in the validity, the management server 50 generates the server response information (Offer Response) 131 and transmits the server response information (Offer Response) 131 to the information processing device 20.

When receiving the server response information (Offer Response) 131, the information processing device 20 displays a copy permission content list (copy permission list 131) on a display unit of the information processing device 20, applying the response information (Offer Response) 131 received from the management server 50. For example, a price in a case where each content item is copied is set in the list.

In step S53, the user performs a content selection operation of selecting, for example, the content to be copied from the copy permission content list. In addition, in step S54, a payment process associated with the copy process is performed between the information processing device 20 and the management server 50. Specifically, for example, a process of transmitting payment data 132 is performed between the information processing device 20 and the management server 50. In addition, the server that performs the payment process may be a payment server different from the management server. In addition, in a case where content that is permitted to be copied for free is copied, the payment process is omitted.

After the payment process that is performed if necessary is completed, the information processing device 20 transmits a copy permission information request to the management server 50 in step S55. In step S56, the management server 50 checks that payment has been performed, generates copy permission information 122, and transmits the copy permission information 122 to the information processing device 20, in response to the copy permission information request.

In step S57, the information processing device 20 performs an authentication process and a copy process for the second medium 30 which is a copy destination on condition that the copy permission information 122 is received from the management server 50.

In addition, in the authentication process, the second medium 30 receives a host certificate from the information processing device (host) 20 and verifies the validity of the information processing device (host) 20.

The copy process starts on condition that the validity has been verified.

In addition, as illustrated in FIG. 14, the following data are recorded on the first medium 10:
(A) BDMV format data 111;
(B) AACS management data 112;
(C) Data (for example, a volume ID) 113 readable by a dedicated protocol; and
(D) KCD 114.

In a case where all of the data can be recorded on the second medium 30 by a copy process, an encrypted content decryption and reproduction process can be performed in a similar sequence to that described above with reference to FIGS. 12 and 13 when content is reproduced from the second medium 30.

That is, similar content usage control to that performed for the copy source medium can be performed for the copy destination medium.

However, the KCD 114 recorded on the first medium. 10 is recorded on the disk by a special and unique recording method, unlike other data files, and can be read by only a drive device having a special reading function corresponding to the KCD recording method.

As described with reference to FIGS. 12 and 13, the CE device (device for only recording and reproduction) that performs the content decryption and reproduction process according to the sequence illustrated in FIG. 12 needs to perform a process using the KCD. The CE device (device for only recording and reproduction) as an AACS-certified device has a special reading function for reading the KCD.

In addition, the detailed specifications of the reading process have not been open to the public.

In contrast, the device, such as a PC, that performs the content decryption and reproduction process according to the sequence illustrated in FIG. 13 does not need to perform the process using the KCD. The device, such as a PC, is configured such that it performs a data reading process using a general-purpose disk drive device and the drive device does not have a function of reading the KCD.

Therefore, for example, in a case where a PC is used to perform a data copy process, it is difficult to read the KCD from the copy source medium.

In addition, in a case where a CE device is used to perform a copy process, it is possible to read the KCD from the copy source medium, but it is difficult to record the KCD on the copy destination medium using a special recording method in which the KCD can be read by only a special method.

Furthermore, when the KCD is recorded on the copy destination medium by a similar method to that used for a normal data file, the KCD is freely read by PCs other than the CE device and the content usage control configuration is likely to be broken.

As a result, the conclusion is that the process of recording the KCD on the copy destination medium needs to be avoided.

However, as described above with reference to FIG. 12, the CE device (device for only recording and reproduction) needs to use the KCD in order to calculate the media key (Km) and to perform the encrypted content decryption process.

Therefore, the problem that it is difficult to decrypt and reproduce copy content from the copy destination medium arises.

Next, a new inter-media copy process for solving the problem will be described.

[6. For Process for Copying Data Between Media to Implement Content Usage Control for Copy Destination Medium, without Recording KCD on Copy Destination Medium]

Next, a process for copying data between media to implement content usage control for a copy destination medium, without recording the KCD on a copy destination medium, will be described.

Figure 17:
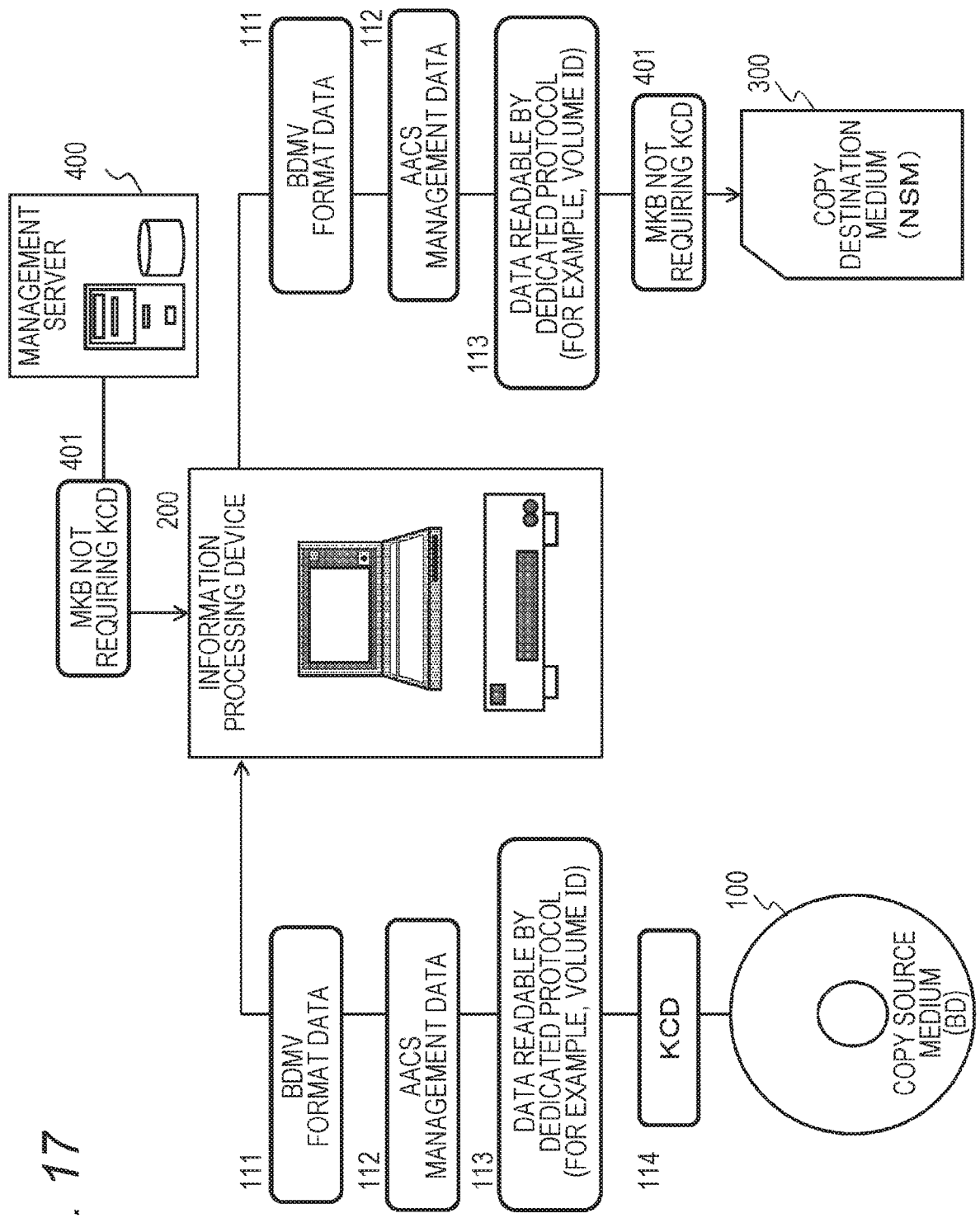
FIG. 17 is a diagram illustrating an example of a data copy process sequence according to the present disclosure.

In addition, in the following description, as illustrated in FIG. 17, a medium, such as a BD, on which data to be copied has been recorded is referred to as a copy source medium 100 and a medium to which data read from the copy source medium 100 is copied is referred to as a copy destination medium 300.

The information processing device 200 performs a copy process. For example, the information processing device 200 receives copy permission information from the management server 400 and performs the copy process according to the sequence that has been described with reference to FIG. 14.

The copy destination medium 300 is various types of media, such as a flash memory, a disk-type memory, and a hard disk. In addition, the copy destination medium implements substantially similar usage control to content usage control in the copy source medium and is referred to as a next generation secure memory (NSM).

As illustrated in FIG. 17, the information processing device 200 performing the copy process performs a process which reads data recorded on the copy source medium 100 and copies the data to the copy destination medium 300.

In addition, the copy source medium 100 is, for example, a BD and has the recorded data which has been described with reference to FIG. 3.

That is, the following data are recorded:
(A) BDMV format data 111;
(B) AACS management data 112;
(C) Data (for example, a volume ID) 113 that can be read by a dedicated protocol; and
(D) Key conversion data (KCD) 114.

The BDMV format data 111 includes, for example, encrypted content of which the usage is to be controlled.

The BDMV format data 111 is the data recorded in the BDMV directory which has been described with reference to FIG. 4.

As described above with reference to FIG. 2, the encrypted content has a configuration in which usage management is performed for each content management unit (CPS unit) and is obtained by an encryption process of applying different unit keys (CPS unit keys) to the CPS units. That is, units are encrypted by different keys (referred to as CPS unit keys, unit keys, or title keys) in order to implement different types of usage control for each unit of data.

The AACS management data 112 includes, for example, a copy control management file (for example, MCMF) 115. The AACS management data 112 is the data recorded in the AACS directory which has been described with reference to FIG. 5.

The data (for example, a volume ID) 113 readable by a dedicated protocol can be read by only a reading process using a specific dedicated protocol.

For example, the data can be read by executing a dedicated reading process program stored in an information processing device according to the AACS regulation.

Specifically, the volume ID can be read by applying a volume ID reading protocol (Protocol for Transferring Volume Identifier) based on the AACS regulation.

As described above with reference to FIG. 12, the key conversion data (KCD) 114 is applied to generate (convert) an encryption key for a specific device (CE device) when content is decrypted and reproduced.

The key conversion data (KCD) 114 is readable by an AACS-verified CE device, but is not readable by a device such as a PC.

The following two cases are assumed: a case where the information processing device 200 performing the copy process illustrated in FIG. 17 is a CE device; and a case where the information processing device 200 is a PC device.

The KCD 114 is not recorded on the copy destination medium 300 in both a case where the information processing device 200 performing the copy process illustrated in FIG. 17 is a CE device and a case where the information processing device 200 is a PC device.

In addition, the information processing device 200 performs a process which acquires an MKB 401 not requiring KCD from the management server 400 and records the MKB 401 to the copy destination medium 300.

The MKB not requiring KCD will be described with reference to FIG. 18.

Figure 18:
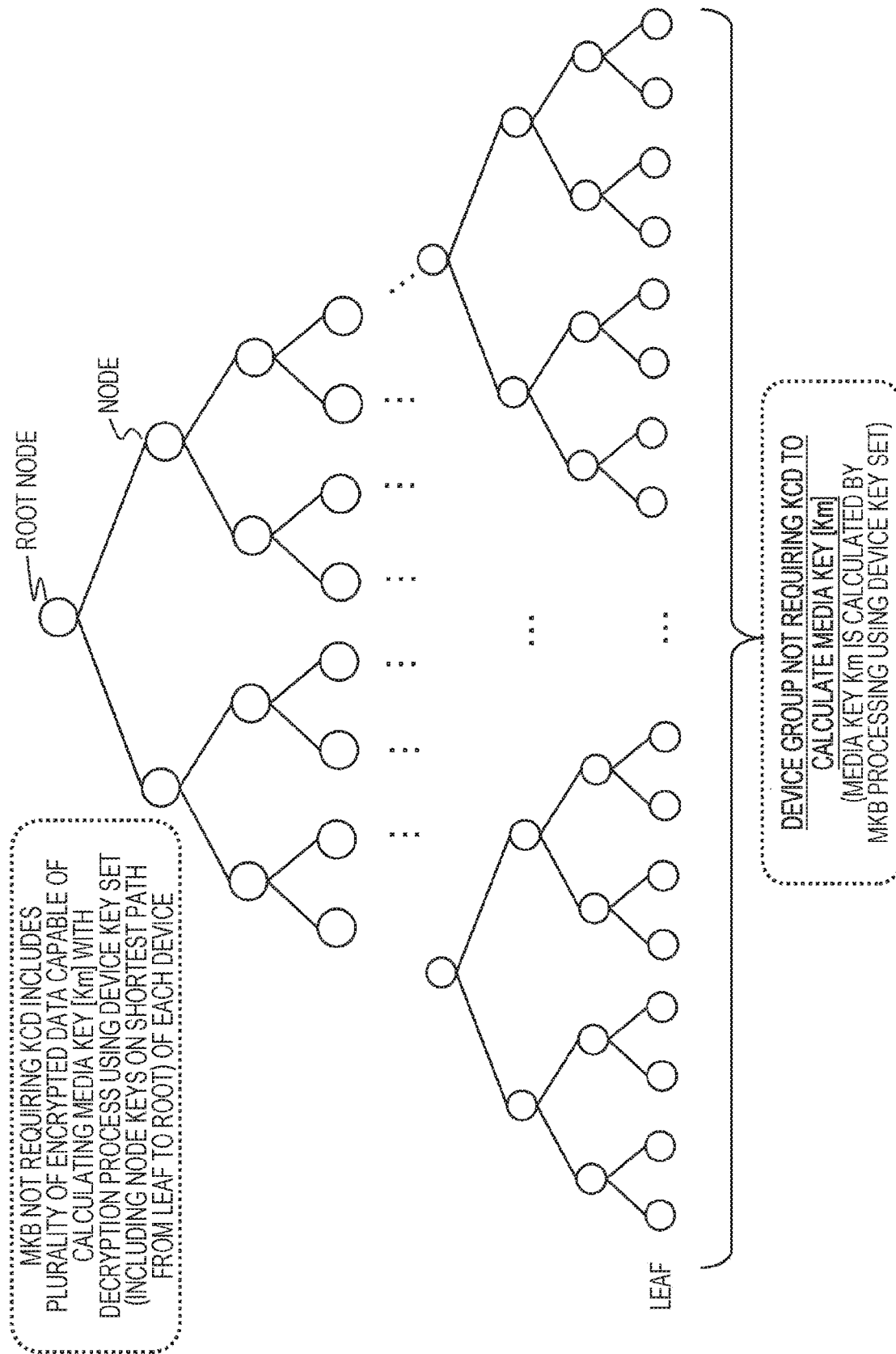
FIG. 18 is a diagram illustrating an MKB not requiring KCD.

FIG. 18 illustrates a hierarchical tree structure with a two-branch configuration from a root node to leaf nodes as described above with reference to FIGS. 8 to 10.

The hierarchical tree which has been described with reference to FIG. 10 is an example of the hierarchical tree in which a key that can be acquired from the MKB is changed depending on the type (category) of user devices, that is, an example of the configuration of the MKB.

In the hierarchical tree illustrated in FIG. 10, the leaves are classified into two groups, that is, a leaf group A and a leaf group B.

The user device corresponding to a leaf B in the leaf group B can calculate a media key (Km) from the MKB, using a device key (node key set).

In contrast, the user device corresponding to a leaf A in the leaf group A is not capable of calculating the media key (Km) from the MKB using the device key (node key set).

The user device corresponding to the leaf in the leaf group A can calculate the temporary media key (Kmx) from the MKB using the device key (node key set). In addition, the user device can calculate the media key (Km) using an encryption process which applies the KCD to the temporary media key (Kmx).

That is, the MKB corresponding to the hierarchical tree which has been described with reference to FIG. 10 stores a plurality of encrypted data of the following two different keys:
(1) An encryption media key; and
(2) A temporary encryption media key.

That is, "(1) the encryption media key" stored in the MKB is encryption key data that is capable of calculating the media key (Km) with a decryption process using the device key (node key set) stored in the user device corresponding to the leaf B in the leaf group B.

In addition, "(2) the temporary encryption media key" stored in the MKB is encryption key data that is capable of calculating the temporary media key (Kmx) with a decryption process using the device key (node key set) stored in the user device corresponding to the leaf A in the leaf group A.

The user device corresponding to the leaf A in the leaf group A can calculate the media key (Km) using an encryption process which applies the KCD to the temporary media key (Kmx) calculated from the MKB.

As such, the MKB which is required by some devices to calculate the media key (Km) using the KCD is referred to as "an MKB requiring KCD".

In contrast, all of the devices corresponding to the lowest leaves in the hierarchical tree illustrated in FIG. 18 can directly calculate the media key (Km) with MKB processing using the device keys (node key sets of the nodes on the shortest paths from the leaves to the root node) stored therein.

As such, the MKB which is not required by all devices to calculate the media key (Km) using the KCD is referred to as "an MKB not requiring KCD".

Figure 19:
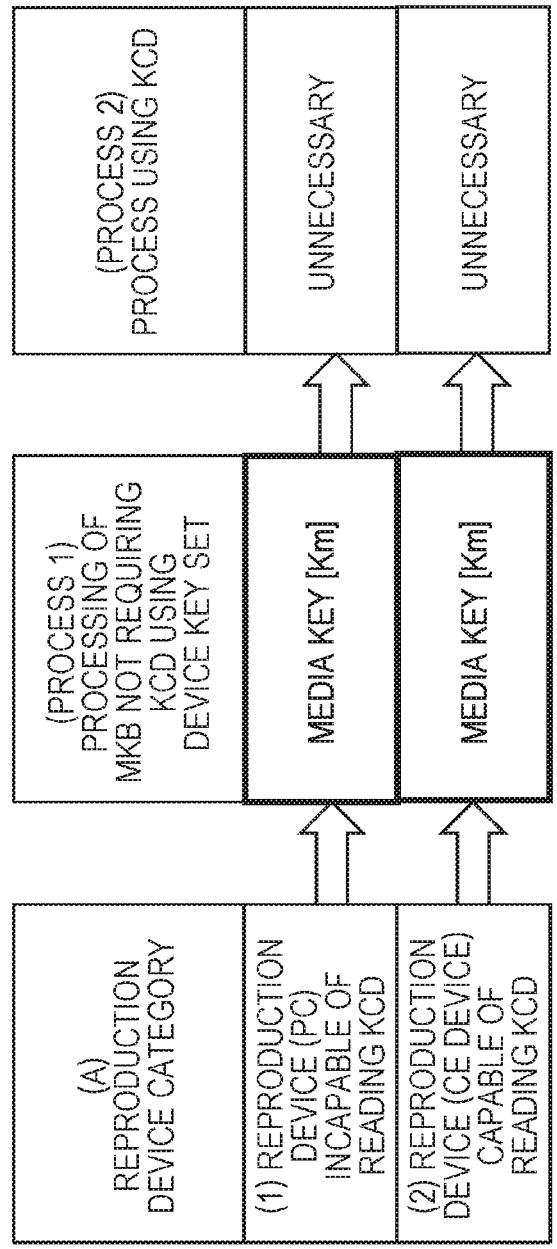
FIG. 19 is a diagram illustrating an example of a process using the MKB not requiring KCD.

FIG. 19 is a diagram illustrating media key (Km) acquisition sequences for each category of reproduction devices in a configuration using the MKB not requiring KCD.

It is assumed that reproduction devices are classified into the following two categories:

(1) A reproduction device (for example, a PC) incapable of reading KCD; and (2) A reproduction device (CE device) capable of reading KCD.

(1) The reproduction device (for example, a PC) incapable of reading KCD can directly calculate the media key (Km) with a decryption process using the device key (node key set) stored in a PC device.

(2) The reproduction device (CE device) capable of reading KCD can directly calculate the media key (Km) with a decryption process using the device key (node key set) stored in a CE device.

That is, the use of the MKB not requiring KCD makes it possible for both (1) the reproduction device (for example, a PC) incapable of reading KCD and (2) the reproduction device (CE device) capable of reading KCD to directly calculate the media key (Km) from the MKB with only MKB processing using the device keys stored in these devices, without using the key conversion data (KCD).

The KCD 114 is not recorded on the copy destination medium 300 in both a case where the information processing device 200 performing the copy process illustrated in FIG. 17 is a CE device and a case where the information processing device 200 is a PC device. However, the information processing device 200 acquires the MKB 401 not requiring KCD from the management server 400 and records the MKB 401 not requiring KCD on the copy destination medium 300.

Since the MKB 401 not requiring KCD is recorded on the copy destination medium 300, the device that reproduces content stored in the copy destination medium 300 can calculate the media key (Km) from the MKB 401 not requiring KCD, without using the KCD, regardless of whether the device is a PC or a CE device.

In addition, it is possible to generate a CPS unit key (title key) that is applied to decrypt the encrypted content copied and recorded on the copy destination medium 300, using the media key (Km). It is possible to perform a decryption and reproduction process for the encrypted content copied and recorded on the copy destination medium 300.

In addition, even in a case where the MKB 401 not requiring KCD is used, it is possible to perform the revoke process which has been described with reference to FIG. 9, to exclude (revoke) an unauthorized device, and to prevent the illegal use of content.

[7. For Specific Sequence of Copy Process Between Media]

Next, the specific sequence of the copy process between media performed by the information processing device 200 will be described with reference to FIG. 20 and subsequent drawings.

Figure 21:
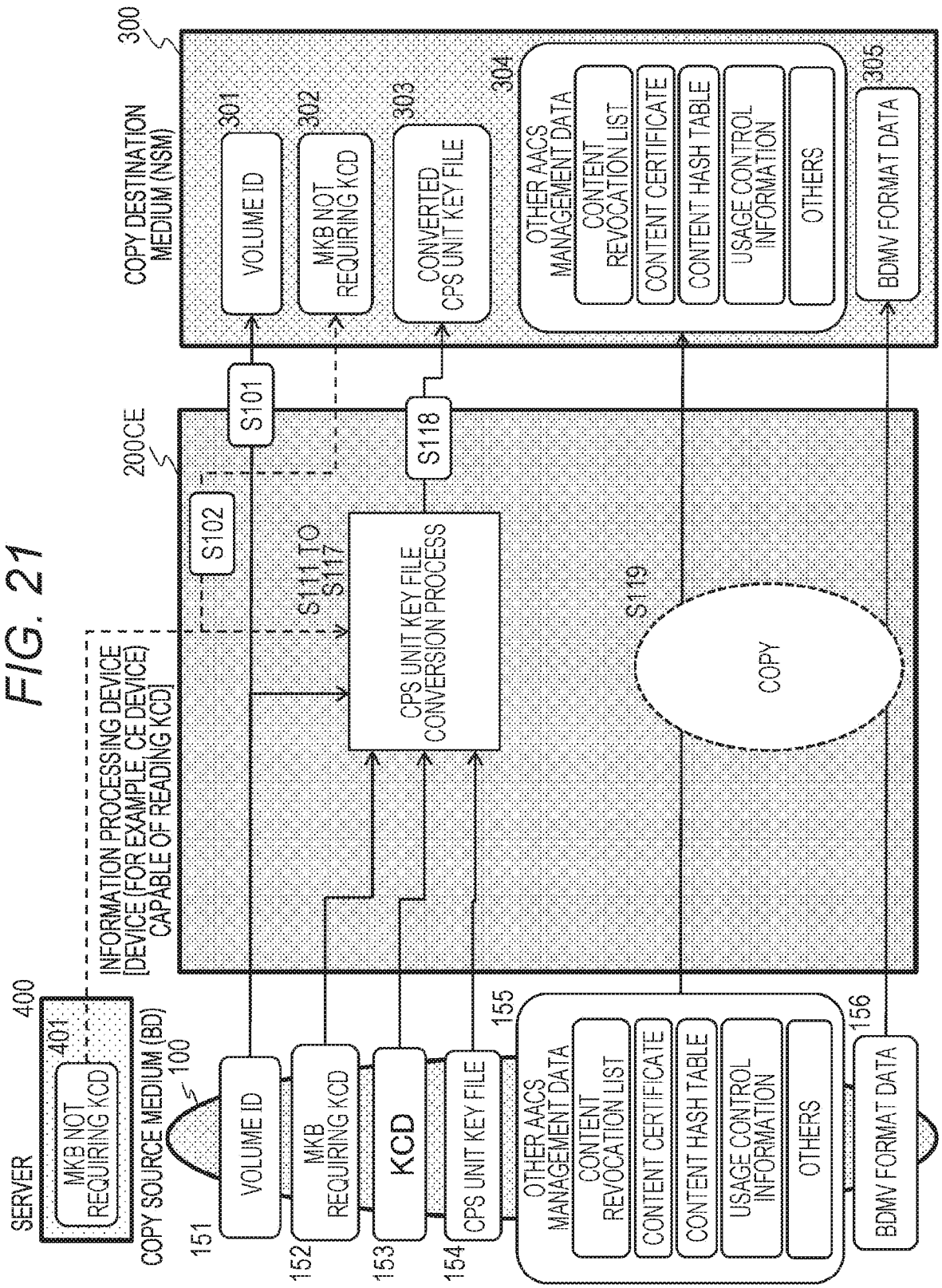
FIG. 21 is a diagram illustrating an example of the data copy process sequence according to the present disclosure.
Figure 22:
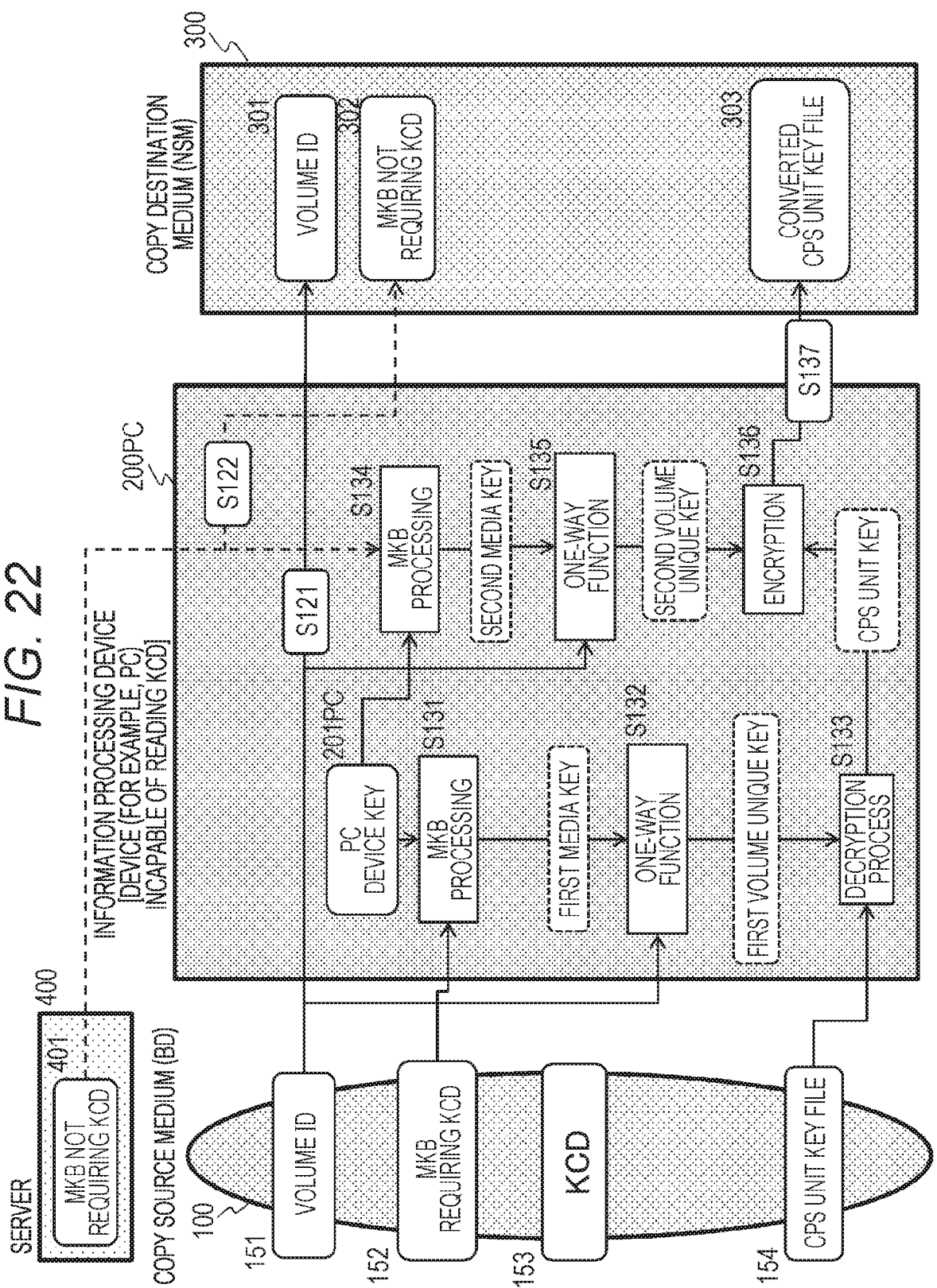
FIG. 22 is a diagram illustrating an example of the data copy process sequence according to the present disclosure.
Figure 23:
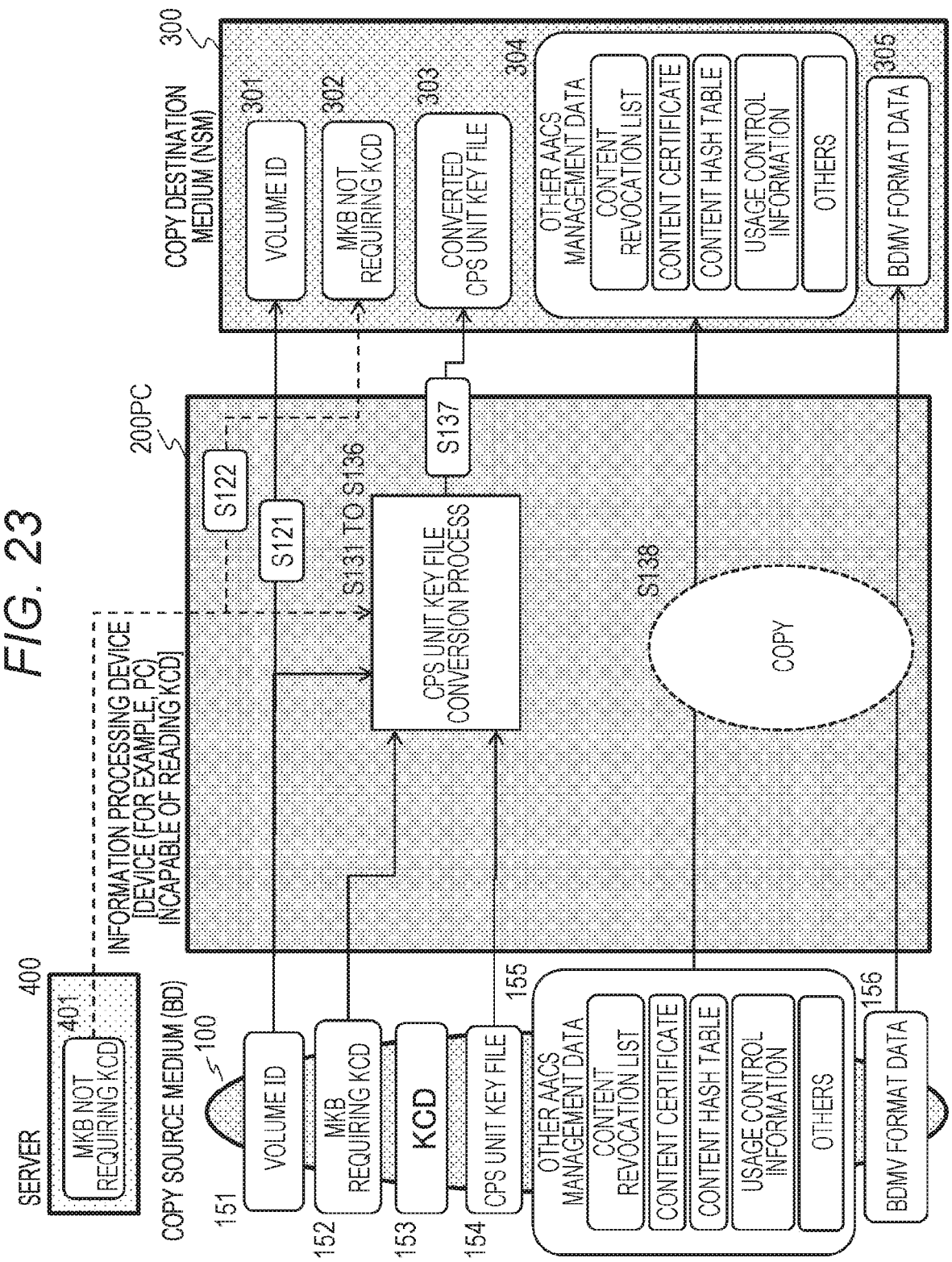
FIG. 23 is a diagram illustrating an example of the data copy process sequence according to the present disclosure.

The following two process examples will be sequentially described:

(1) A copy process sequence by the device (for example, a CE device) capable of reading KCD (FIGS. 20 and 21); and (2) A copy process sequence by the device (for example, a PC) incapable of reading KCD (FIGS. 22 and 23).

[7-1. Copy Process Sequence by Device (for Example, CE Device) Capable of Reading KCD]

First, the copy process sequence by the device (for example, a CE device) capable of reading KCD will be described with reference to FIGS. 20 and 21.

Figure 20:
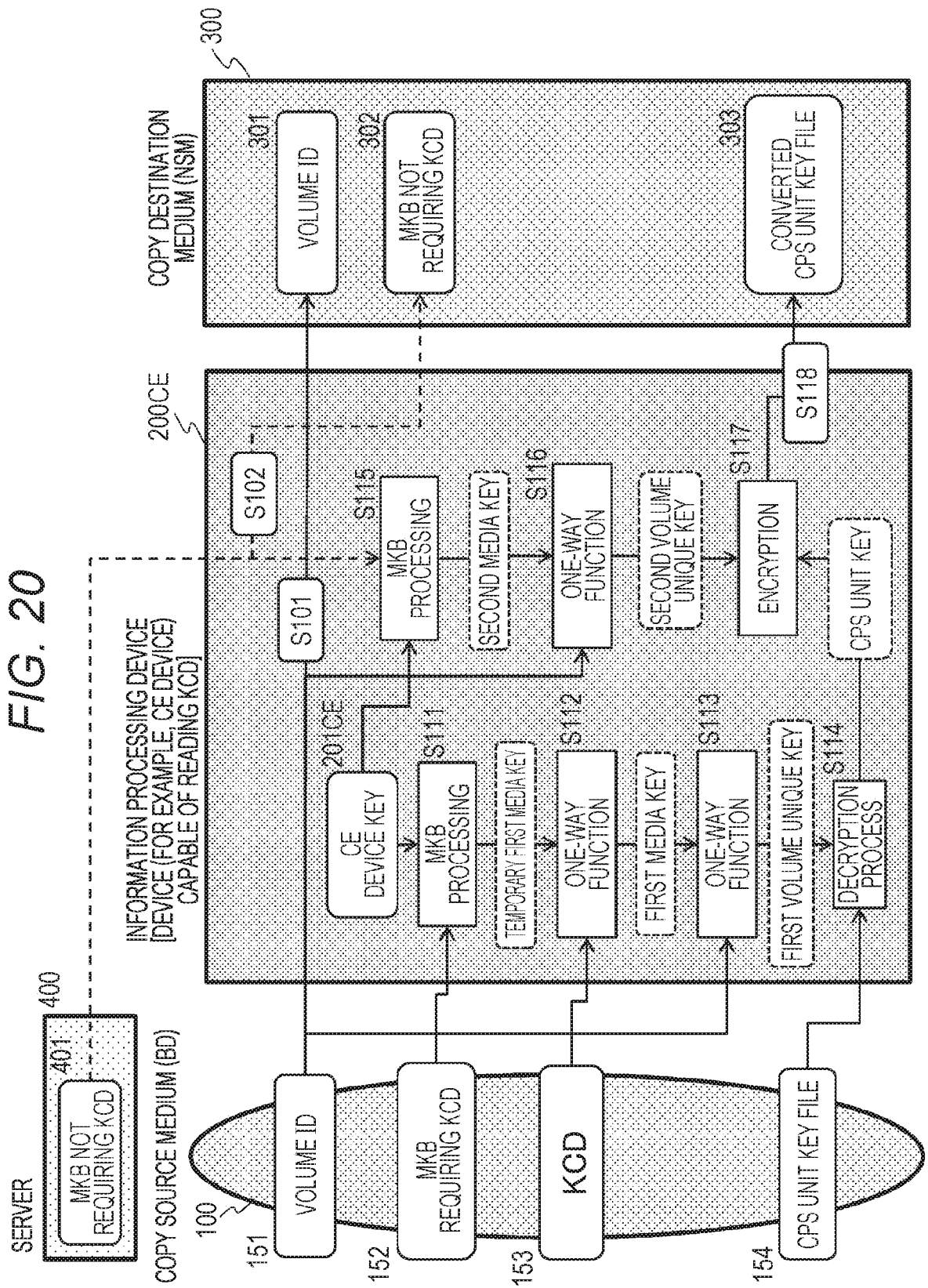
FIG. 20 is a diagram illustrating an example of data recorded in a protection region in the data copy process according to the present disclosure.

FIG. 20 is a diagram illustrating the reading of each of the following data recorded on the copy source medium 100 and the execution of the data by an information processing device 200CE which is the device (for example, a CE device) capable of reading KCD:

(a) A volume ID 151;
(b) An MKB 152 requiring KCD;
(c) KCD 153; and
(d) A CPS unit key file 154.

In addition, the information processing device 200CE performs a process of acquiring the following data from a server 400:

(e) An MKB 401 not requiring KCD.

The information processing device 200CE performs a process according to the sequence illustrated in FIG. 20 and finally records the following data on the copy destination medium 300:

(A) A volume ID 301 (=a volume ID 151);
(B) An MKB 302 not requiring KCD (=the MKB 401 not requiring KCD); and
(C) A converted CPS unit key file 303 (# the CPS unit key file 154).

The copy process sequence by the information processing device 200CE which is the device (for example, a CE device) capable of reading KCD will be described with reference to FIG. 20.

In addition, the process illustrated in FIG. 20 is performed by a data processing unit of the information processing device 200CE.

The data processing unit has a program execution function of, for example, a CPU, reads a processing program stored in a memory, and performs the process according to the sequence illustrated in FIG. 20.

Next, the processes in each step illustrated in FIG. 20 will be sequentially described.

(Step S101)

In step S101, the information processing device 200CE performs a process which reads the volume ID 151 from the copy source medium 100 and records the volume ID 151 on the copy destination medium 300.

In addition, the process of reading the volume ID 151 from the copy source medium 100 is performed according to a prescribed reading protocol.

That is, the process is performed according to a volume ID reading protocol (Protocol for Transferring Volume Identifier) based on the AACS regulation which has been described with reference to FIG. 7.

As illustrated in FIG. 20, the volume ID 301 is recorded on the copy destination medium 300 by the copy recording process in step S101.

In addition, in a case where the copy destination medium 301 has, for example, a secure memory region to which access can be limited, it is preferable that the volume ID 301 be recorded on the secure memory region.

(Step S102)

In step S102, the information processing device 200CE performs a process which acquires the MKB 401 not requiring KCD from the server 400 and records the MKB 401 not requiring KCD on the copy destination medium 300.

For example, the server 401 is a management server (MC Server) that performs copy management according to the managed copy which has been described with reference to FIG. 14.

In step S102, the information processing device 200CE acquires the MKB 401 not requiring KCD from the server 400.

The MKB 401 not requiring KCD is set such that all of the devices corresponding to the leaves can directly calculate the media key (Km) with MKB processing applying the device keys, without applying the KCD, as described above with reference to FIGS. 18 and 19.

Furthermore, the server 400 may provide the information processing device with the MKB that is set such that the information processing device 200CE performing at least a copy process can directly calculate the media key (Km) with MKB processing applying the device key as the MKB 401 not requiring KCD, instead of providing the information processing device 200CE with the MKB that is set such that all of the devices corresponding to the leaves can directly calculate the media key (Km) without applying the KCD.

As illustrated in FIG. 20, the MKB 302 not requiring KCD is recorded on the copy destination medium 300 by the copy recording process in step S102.

(Step S111)

A process from step S111 to step S118 converts the CPS unit key file stored in the copy source medium 100 to generate the converted CPS unit key file 303 to be recorded on the copy destination medium 300 and records the converted CPS unit key file 303.

This process generates the "converted CPS unit key file 303" capable of calculating the title key (Kt), which is a decryption key for encrypted content, using the media key (Km) obtained from the MKB not requiring KCD acquired from the server 400 and records the converted CPS unit key file 303.

First, in step S111, the information processing device 200CE performs MKB processing. That is, the information processing device 200CE performs MKB processing for the MKB 152 requiring KCD read from the copy source medium 100, applying a CE device key 2010E that is stored in a storage unit of the information processing device 200CE.

In addition, a process from step S111 to step S114 corresponds to the process from step S21 to step S24 in the content decryption and reproduction process of the CE device which has been described with reference to FIG. 12.

The MKB processing in step S111 is performed as a process of acquiring a "temporary first medium key" from the MKB applying the CE device key 2010E.

(Step S112)

Then, in step S112, the information processing device 200CE performs an encryption process (AES-G) for the "temporary first medium key" calculated from the MKB in step S111, applying the KCD 153 read from the copy source medium 100, to acquire a "first medium key".

(Step S113)

Then, in step S113, the information processing device 200CE performs a one-way function (AES-G) for the "first medium key" calculated in step S112, applying the volume ID 151 read from the copy source medium 100, to generate a "first volume unique key".

(Step S114)

Then, in step S114, the information processing device 200CE performs a decryption process for the CPS unit key file 154 read from the copy source medium 100, applying the "first volume unique key" calculated in step S113, to generate a "CPS unit key (=a title key)".

As described above, the process from step S111 to step S114 corresponds to the process from step S21 to step S24 in the content decryption and reproduction process of the CE device which has been described with reference to FIG. 12.

(Step S115)

Then, in step S115, the information processing device 200CE performs MKB processing for the MKB not requiring KCD acquired from the server 400, applying the CE device key 2010E stored in the storage unit of the information processing device 200CE.

The MKB processing in step S115 is performed as a process of acquiring a "second medium key" from the MKB not requiring KCD applying the CE device key 2010E.

As described above with reference to FIGS. 18 and 19, the MKB not requiring KCD enables all of the devices corresponding to the leaves to directly acquire the media key from the MKB.

(Step S116)

Then, in step S116, the information processing device 200CE performs a one-way function (AES-G) for the "second medium key" calculated from the MKB not requiring KCD in step S115, applying the volume ID 151 read from the copy source medium 100, to generate a "second volume unique key".

(Step S117)

Then, in step S117, the information processing device 200CE performs an encryption process for the "CPS unit key (=a title key)" calculated by the decryption process for the CPS unit key file 154 in step S114.

The "converted CPS unit key file 303" capable of calculating the "CPS unit key (=a title key)" with the decryption process applying the "second volume unique key" is generated by the encryption process.

(Step S118)

Then, in step S118, the information processing device 200CE records the "converted CPS unit key file 303" generated in step S117 on the copy destination medium 300.

The process from step S111 to step S118 converts the CPS unit key file stored in the copy source medium 100 to generate the converted CPS unit key file 303 to be recorded on the copy destination medium 300 and records the converted CPS unit key file 303.

In addition to these processes, the information processing device performs a process of copying other data in step S119 illustrated in FIG. 21.

(Step S119)

In step S119, the information processing device 200CE copies other AACS management data 155 and BDMV format data 156 and records the copied data on the copy destination medium 300 without any change.

The above-mentioned other AACS management data 155 include, for example, a content revocation list, a content certificate, a content hash table, usage control information, and others. The above-mentioned other AACS management data 155 include data forming the directory which has been described with reference to FIG. 5.

In addition, the BDMV format data 156 is data forming the directory which has been described with reference to FIG. 4 and includes, for example, encrypted content, a clip information file, and a playlist file.

As illustrated in FIG. 21, AACS management data 304 including a content revocation list, a content certificate, a content hash table, usage control information, and others and BDMV format data 305 are recorded on the copy destination medium 300.

The copy of data from the copy source medium 100 to the copy destination medium 300 by the information processing device 200CE is completed by the processes described above with reference to FIGS. 20 and 21.

As a result, the following data are recorded on the copy destination medium 300 as illustrated in FIG. 21:

(A) Data copied from the copy source medium 100 without any change, which includes:

(a1) The volume ID 301;

(a2) The above-mentioned other AACS management data 304; and (a3) The BDMV format data 305;

(B) Data acquired from the server 400, which includes:

(b1) The MKB 302 not requiring KCD; and (C) Data which has been read from the copy source medium 100 and then converted by the information processing device, which includes:

(c1) The converted CPS unit key file 303.

These data are recorded on the copy destination medium 300.

The MKB 302 not requiring KCD recorded on the copy destination medium 300 is capable of directly calculating the media key (Km) applying the CE device key 2010E of the information processing device 200CE.

That is, the MKB 302 not requiring KCD is the second medium key illustrated in FIG. 20.

In addition, the converted CPS unit key file 303 recorded on the copy destination medium 300 can be decrypted applying the media key (Km) acquired from the MKB 302 not requiring KCD and the volume unique key (=the second volume unique key illustrated in FIG. 20) calculated using the volume ID 301. The CPS unit key (title key) for decrypting the encrypted content included in the BDMV format data 305 can be acquired by the decryption process.

That is, the information processing device 200CE can perform a decryption and reproduction process for the encrypted content stored in the copy destination medium 300 using only data stored in the copy destination medium 300.

The content decryption and reproduction sequence is similar to the content decryption and reproduction sequence in the device that does not need to use the key conversion data (KCD) which has been described with reference to FIG. 13, for example, a PC.

That is, it is possible to direct the device that does not need to use the key conversion data (KCD) to perform the process based on content usage control according to the AACS regulation.

[7-2. Copy Process Sequence by Device (for Example, PC) Incapable of Reading KCD]

Next, a copy process sequence by the device (for example, a PC) incapable of reading KCD will be described with reference to FIGS. 22 and 23.

FIG. 22 is a diagram illustrating a process of reading the following data recorded on the copy source medium 100 and executing the data in an information processing device 200PC which is the device (for example, a PC) incapable of reading KCD:

(a) A volume ID 151;

(b) An MKB 152 requiring KCD;

(c) KCD 153; and (d) A CPS unit key file 154.

In addition, the information processing device 200PC performs a process of acquiring the following data from the server 400:

(e) An MKB 401 not requiring KCD.

The information processing device 200PC performs a process according to the sequence illustrated in FIG. 22 and finally records the following data on the copy destination medium 300:

(A) A volume ID 301 (=a volume ID 151);

(B) An MKB 302 not requiring KCD (=the MKB 401 not requiring KCD); and (C) A converted CPS unit key file 303 (# the CPS unit key file 154).

The copy process sequence by the information processing device 200PC which is the device (for example, a PC) incapable of reading KCD will be described with reference to FIG. 22.

In addition, the process illustrated in FIG. 22 is performed by a data processing unit of the information processing device 200PC.

The data processing unit has a program execution function of, for example, a CPU, reads a processing program stored in a memory, and performs the process according to the sequence illustrated in FIG. 22.

Next, the processes in each step illustrated in FIG. 22 will be sequentially described.

(Step S121)

In step S121, the information processing device 200PC performs a process which reads the volume ID 151 from the copy source medium 100 and records the volume ID 151 on the copy destination medium 300.

In addition, the process of reading the volume ID 151 from the copy source medium 100 is performed according to a prescribed reading protocol.

That is, the process is performed according to a volume ID reading protocol (Protocol for Transferring Volume Identifier) based on the AACS regulation which has been described with reference to FIG. 7.

As illustrated in FIG. 22, the volume ID 301 is recorded on the copy destination medium 300 by the copy recording process in step S121.

In addition, in a case where the copy destination medium 301 has, for example, a secure memory region to which access can be limited, it is preferable that the volume ID 301 be recorded on the secure memory region.

(Step S122)

In step S122, the information processing device 200PC performs a process which acquires the MKB 401 not requiring KCD from the server 400 and records the MKB 401 not requiring KCD on the copy destination medium 300.

For example, the server 401 is a management server (MC Server) that performs copy management according to the managed copy which has been described with reference to FIG. 14.

In step S122, the information processing device 200PC acquires the MKB 401 not requiring KCD from the server 400.

The MKB 401 not requiring KCD is set such that all of the devices corresponding to the leaves can directly calculate the media key (Km) with MKB processing applying the device keys, without applying the KCD, as described above with reference to FIGS. 18 and 19.

As illustrated in FIG. 22, the MKB 302 not requiring KCD is recorded on the copy destination medium 300 by the copy recording process in step S122.

(Step S131)

A process from step S131 to step S137 converts the CPS unit key file stored in the copy source medium 100 to generate the converted CPS unit key file 303 to be recorded on the copy destination medium 300 and records the converted CPS unit key file 303.

This process generates the "converted CPS unit key file 303" capable of calculating the title key (Kt), which is a decryption key for encrypted content, using the media key (Km) obtained from the MKB not requiring KCD acquired from the server 400, and records the converted CPS unit key file 303.

First, in step S131, the information processing device 200PC performs MKB processing. That is, the information processing device 200PC performs MKB processing for the MKB 152 requiring KCD read from the copy source medium 100, applying a PC device key 201PC that is stored in a storage unit of the information processing device 200PC.

In addition, a process from step S131 to step S133 corresponds to the process from step S21 to step S24 in the content decryption and reproduction process of the PC device which has been described with reference to FIG. 13.

The MKB processing in step S131 is performed as a process of acquiring a "first medium key" from the MKB applying the PC device key 201PC.

(Step S132)

Then, in step S132, the information processing device 200PC performs a one-way function (AES-G) for the "first medium key" calculated from the MKB in step S131, applying the volume ID 151 read from the copy source medium 100, to generate a "first volume unique key".

(Step S133)

Then, in step S134, the information processing device 200PC performs a decryption process for the CPS unit key file 154 read from the copy source medium 100, applying the "first volume unique key" calculated in step S132, to generate a "CPS unit key (=a title key)".

As described above, the process from step S131 to step S134 corresponds to the process from step S21 to step S24 in the content decryption and reproduction process of the PC device which has been described with reference to FIG. 13.

(Step S134)

Then, in step S134, the information processing device 200PC performs MKB processing for the MKB not requiring KCD acquired from the server 400, applying the PC device key 201PC stored in the storage unit of the information processing device 200PC.

The MKB processing in step S134 is performed as a process of acquiring a "second medium key" from the MKB not requiring KCD applying the PC device key 201PC.

As described above with reference to FIGS. 18 and 19, the MKB not requiring KCD enables all of the devices corresponding to the leaves to directly acquire the media key from the MKB.

(Step S135)

Then, in step S135, the information processing device 200PC performs a one-way function (AES-G) for the "second medium key" calculated from the MKB not requiring KCD in step S134, applying the volume ID 151 read from the copy source medium 100, to generate a "second volume unique key".

(Step S136)

Then, in step S136, the information processing device 200PC performs an encryption process for the "CPS unit key (=a title key)" calculated by the decryption process for the CPS unit key file 154 in step S133.

The "converted CPS unit key file 303" capable of calculating the "CPS unit key (=a title key)" with the decryption process applying the "second volume unique key" is generated by the encryption process.

(Step S137)

Then, in step S137, the information processing device 200PC records the "converted CPS unit key file 303" generated in step S136 on the copy destination medium 300.

The process from step S131 to step S137 converts the CPS unit key file stored in the copy source medium 100 to generate the converted CPS unit key file 303 to be recorded on the copy destination medium 300 and records the converted CPS unit key file 303.

In addition to these processes, the information processing device performs a process of copying other data in step S138 illustrated in FIG. 23.

(Step S138)

In step S138, the information processing device 200PC copies other AACS management data 155 and BDMV format data 156 and records the copied data on the copy destination medium 300 without any change.

The above-mentioned other AACS management data 155 include, for example, a content revocation list, a content certificate, a content hash table, usage control information, and others. The above-mentioned other AACS management data 155 include data forming the directory which has been described with reference to FIG. 5.

In addition, the BDMV format data 156 is data forming the directory which has been described with reference to FIG. 4 and includes, for example, encrypted content, a clip information file, and a playlist file.

As illustrated in FIG. 23, AACS management data 304 including a content revocation list, a content certificate, a content hash table, usage control information, and others and BDMV format data 305 are recorded on the copy destination medium 300.

The copy of data from the copy source medium 100 to the copy destination medium 300 by the information processing device 200PC is completed by the processes described above with reference to FIGS. 22 and 23.

As a result, the following data are recorded on the copy destination medium 300 as illustrated in FIG. 23:

(A) Data copied from the copy source medium 100 without any change, which includes:

(a1) The volume ID 301;

(a2) The above-mentioned other AACS management data 304; and (a3) The BDMV format data 305;

(B) Data acquired from the server 400, which includes:

(b1) The MKB 302 not requiring KCD; and (C) Data which has been read from the copy source medium 100 and then converted by the information processing device, which includes:

(c1) The converted CPS unit key file 303.

These data are recorded on the copy destination medium 300.

The MKB 302 not requiring KCD recorded on the copy destination medium 300 is capable of directly calculating the media key (Km) applying the PC device key 201PC of the information processing device 200PC.

That is, the MKB 302 not requiring KCD is the second medium key illustrated in FIG. 22.

In addition, the converted CPS unit key file 303 recorded on the copy destination medium 300 can be decrypted applying the media key (Km) acquired from the MKB 302 not requiring KCD and the volume unique key (=the second volume unique key illustrated in FIG. 22) calculated using the volume ID 301. The CPS unit key (title key) for decrypting the encrypted content included in the BDMV format data 305 can be acquired by the decryption process.

That is, the information processing device 200PC can perform a decryption and reproduction process for the encrypted content stored in the copy destination medium 300 using only data stored in the copy destination medium 300.

The content decryption and reproduction sequence is similar to the content decryption and reproduction sequence in the device that does not need to use the key conversion data (KCD) which has been described with reference to FIG. 13, for example, a PC.

That is, it is possible to direct the device that does not need to use the key conversion data (KCD) to perform the process based on content usage control according to the AACS regulation.

[8. Embodiment in which CPS Unit Key File Conversion Process is Performed in Server]

In the embodiment described with reference to FIGS. 20 to 23, the information processing device 200 performing the copy process performs the CPS unit key file conversion process to generate the converted CP unit key file and records the converted CP unit key file on the copy destination medium.

Next, an embodiment in which the CPS unit key file conversion process is not performed by the information processing device 200 performing the copy process, but is performed by the server 400 will be described.

Figure 26:
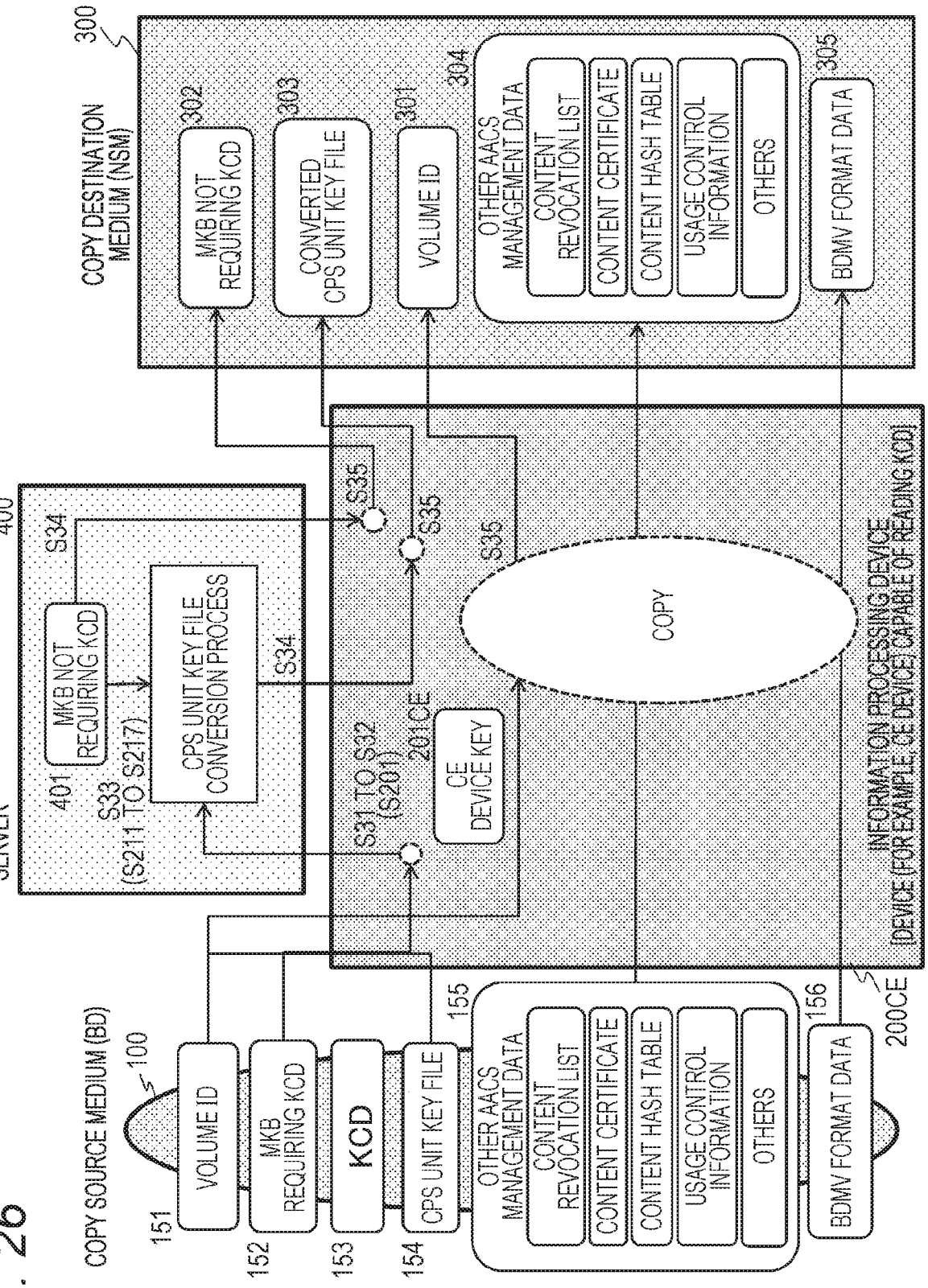
FIG. 26 is a diagram illustrating an example of the data copy process sequence according to the present disclosure.
Figure 27:
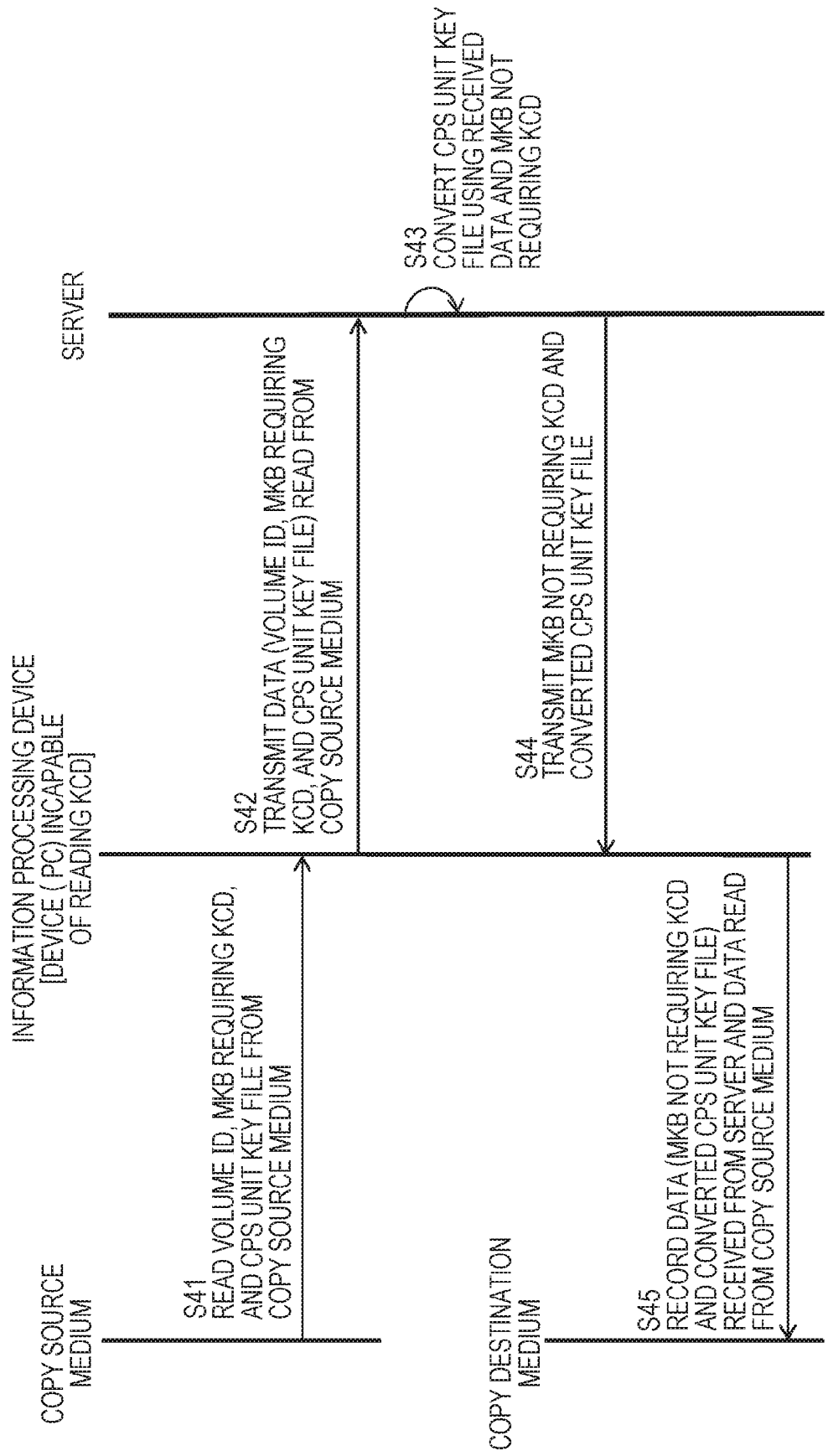
FIG. 27 is a diagram illustrating an example of the data copy process sequence according to the present disclosure.
Figure 28:
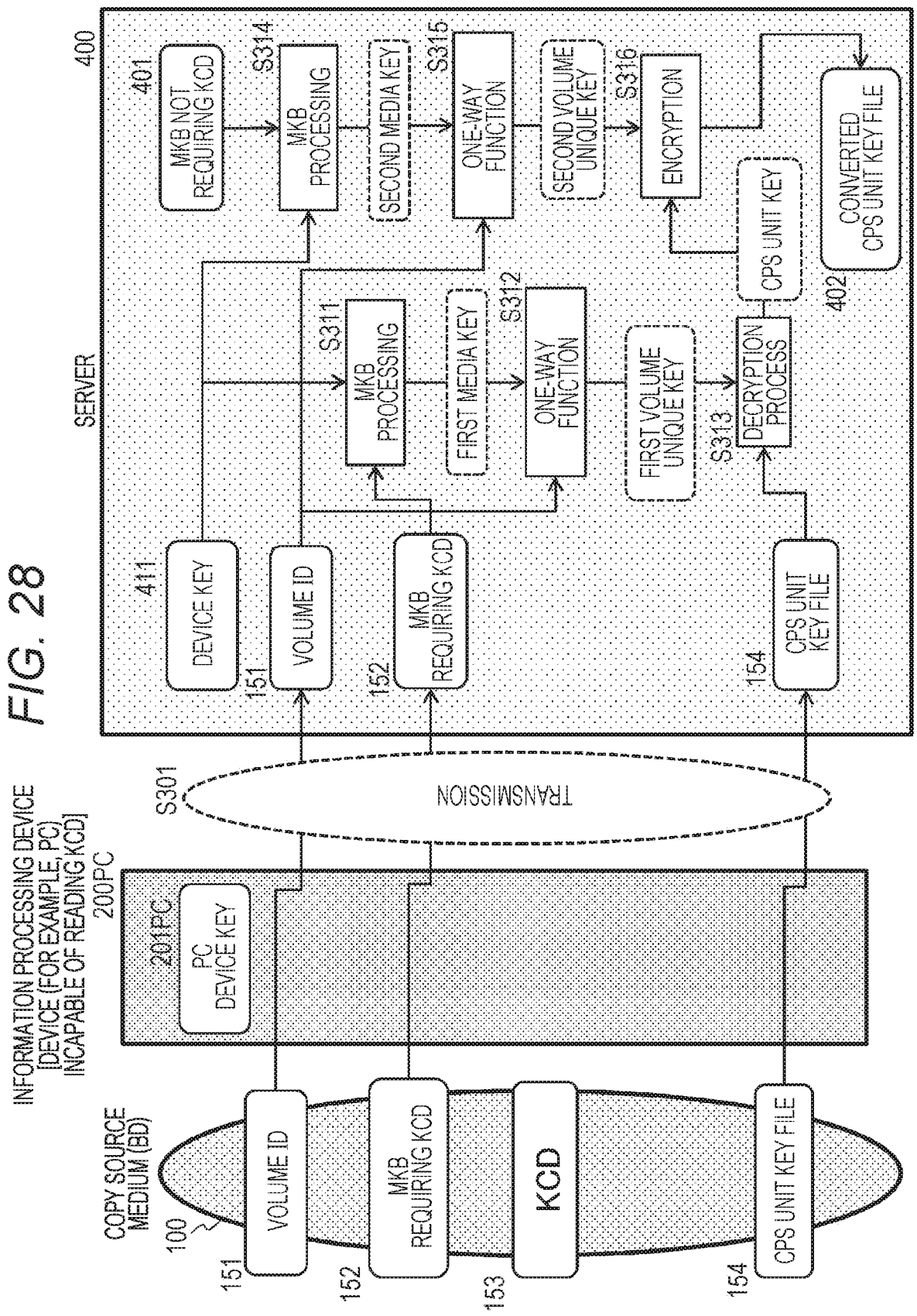
FIG. 28 is a diagram illustrating an example of the data copy process sequence according to the present disclosure.
Figure 29:
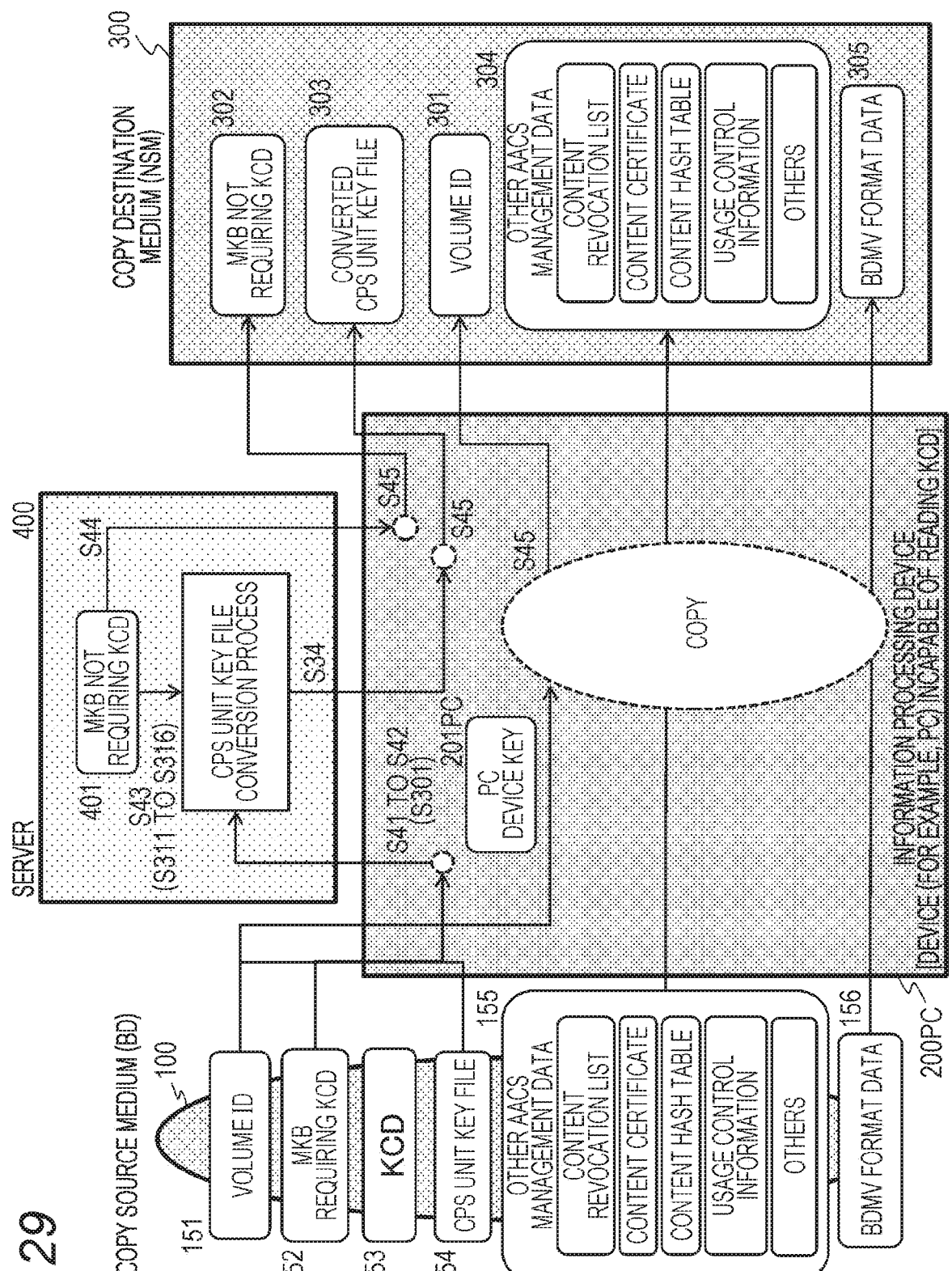
FIG. 29 is a diagram illustrating an example of the data copy process sequence according to the present disclosure.

The following two process examples will be sequentially described:

(1) A copy process sequence by the device (for example, a CE device) capable of reading KCD (FIGS. 24 to 26); and (2) A copy process sequence by the device (for example, a PC) incapable of reading KCD (FIGS. 27 to 29).

[8-1. Copy Process Sequence by Device (for Example, CE Device) Capable of Reading KCD]

First, the copy process sequence by the device (for example, a CE device) capable of reading KCD will be described with reference to FIGS. 24 to 26.

First, a data transmission sequence between the following components in this embodiment will be described with reference to FIG. 24:

(a) A copy source medium;
(b) An information processing device [a device capable of reading KCD (for example, a CE device)];
(c) A server; and
(d) A copy destination medium.

The information processing device is in a state in which the information processing device has the copy source medium and the copy destination medium inserted thereinto and can communicate with the server.

Next, processes in each step illustrated in FIG. 24 will be described.

(Step S31)

First, in step S31, the information processing device reads a volume ID, an MKB requiring KCD, and a CPS unit key file from the copy source medium.

(Step S32)

Then, in step S32, the information processing device transmits the data read from the copy source medium, that is, the volume ID, the MKB requiring KCD, and the CPS unit key file to the server.

(Step S33)

Then, in step S33, the server converts the CPS unit key file, using the received data and an MKB not requiring KCD stored in the server.

This process is similar to, for example, the process from step S111 to step S117 performed in the information processing device 200CE which has been described with reference to FIG. 20.

(Step S34)

Then, in step S34, the server transmits the MKB not requiring KCD stored in the server and the converted CPS unit key file generated by the server in step S33 to the information processing device.

In addition, the MKB not requiring KCD enables the device to directly calculate the media key (Km) without applying the KCD. Alternatively, the MKB not requiring KCD is set such that the media key (Km) can be directly calculated by MKB processing applying the device key of the information processing device that reproduces data indicating at least the copy result.

(Step S35)

Then, in step S35, the information processing device performs a process which records the data (the MKB not requiring KCD and the converted CPS unit key file) received from the server and the data read from the copy source medium on the copy destination medium.

As a result of the processes, the following data which are the same data recorded as the data recorded on the copy destination medium 300 which have been described with reference to FIG. 21 are recorded on the copy destination medium:

A volume ID;
An MKB not requiring KCD;
A converted CPS unit key file;
Other AACS management data; and
BDMV format data.

Figure 24:
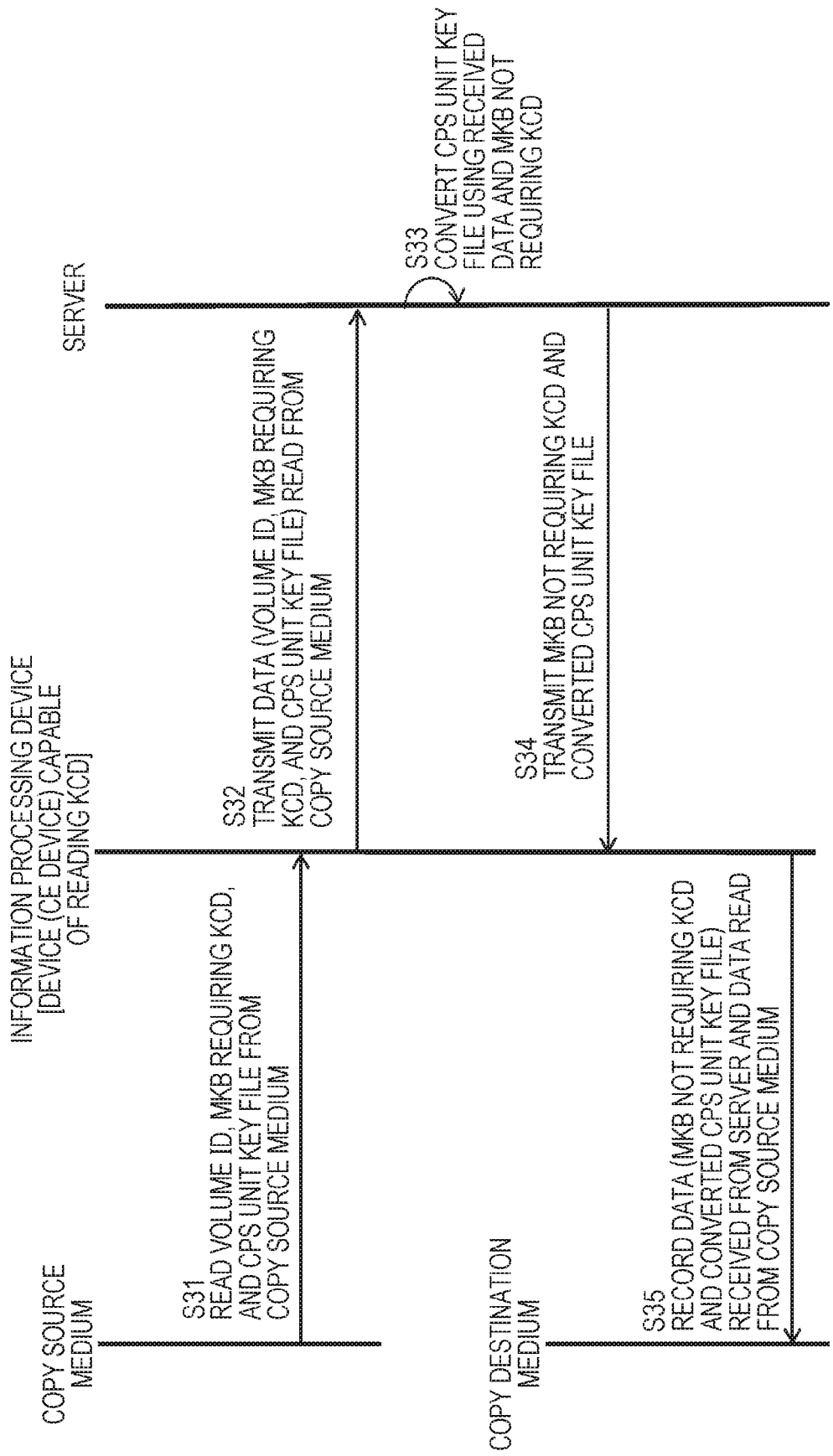
FIG. 24 is a diagram illustrating an example of the data copy process sequence according to the present disclosure.

In addition, in the sequence diagram illustrated in FIG. 24, in steps S31 and S32, the information processing device reads the volume ID, the MKB requiring KCD, and the CPS unit key file from the copy source medium and transmits the read data to the server. However, in a case where the server has stored some or all of the data, a process of reading and transmitting the data stored in the server may be omitted.

Next, the process performed by the server will be described in detail with reference to FIG. 25.

Figure 25:
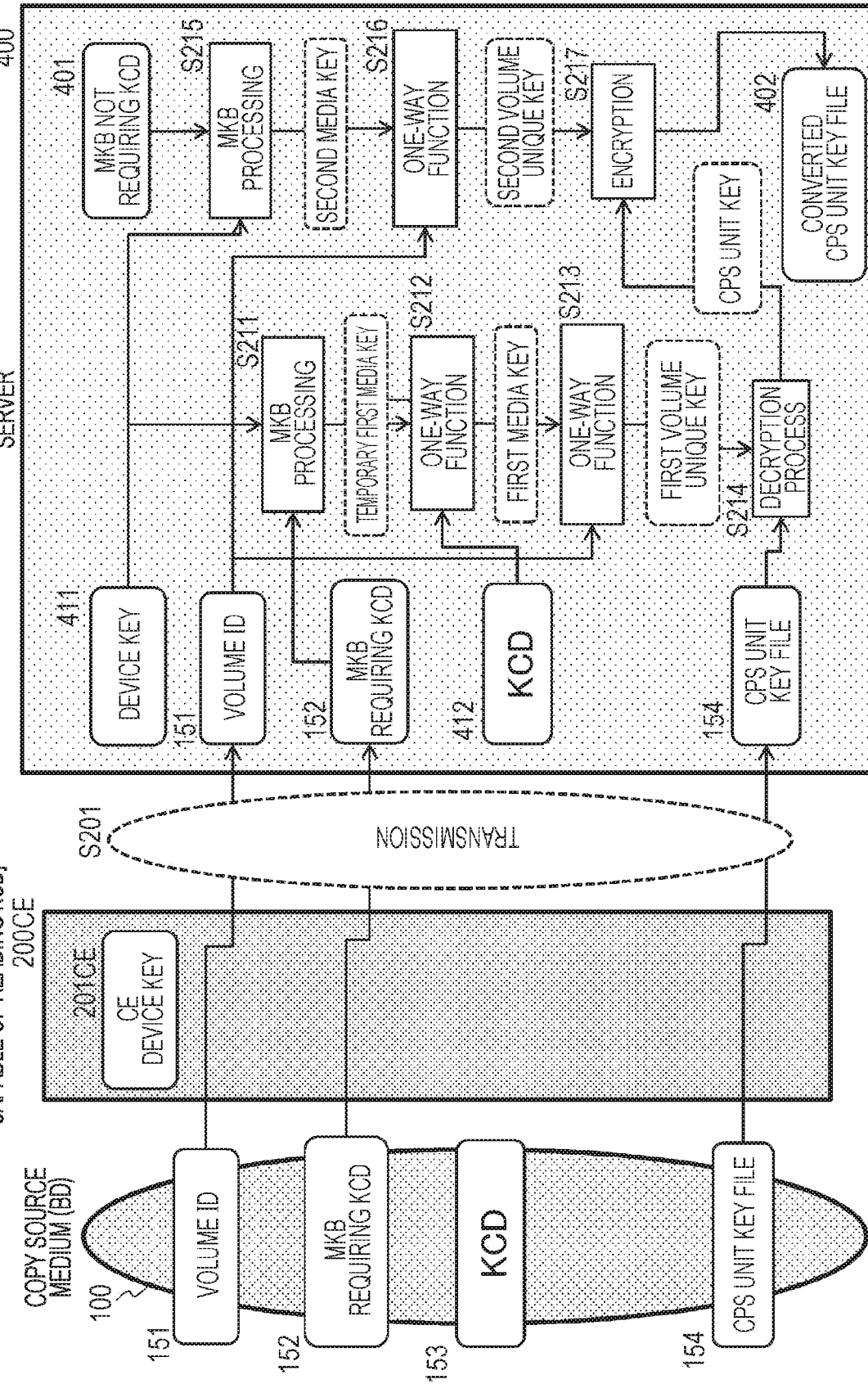
FIG. 25 is a diagram illustrating an example of the data copy process sequence according to the present disclosure.

FIG. 25 illustrates the following data recorded on the copy source medium 100:

(a) A volume ID 151;
(b) An MKB 152 requiring KCD;
(c) KCD 153; and
(d) A CPS unit key file 154.

First, the information processing device 200CE which is a device (for example, a CE device) capable of reading KCD reads the following data:

(a) The volume ID 151;
(b) The MKB 152 requiring KCD; and
(d) The CPS unit key file 154.

The KCD 153 is high-confidentiality data and is not read.

The information processing device 200CE transmits the read data to the server 400.

The server 400 converts the CPS unit key file, using the received data and the MKB 401 not requiring KCD stored in the server, and generates a converted CPS unit key file to be recorded on the copy destination medium.

In addition, the server has stored device keys 411 and KCD 412 and performs a process applying these data.

The device keys 411 stored in the server 400 are a set of all of the device keys distributed and stored in various devices. The server selects device keys necessary for each process from the device keys 411 and performs the processes.

Next, processes in each step illustrated in FIG. 25 will be sequentially described.

(Step S201)

In step S201, the information processing device 200CE reads the following data from the copy source medium 100:

(a) The volume ID 151;
(b) The MKB 152 requiring KCD; and
(c) The CPS unit key file 154.

Then, the information processing device 200CE transmits the read data to the server 400.

In addition, in a case where the server has stored some or all of the data, a process of reading and transmitting the stored data is not necessary.

(Step S211)

A process from step S211 to step S217 is a CPS unit key file conversion process in the server 400.

The process converts the CPS unit key file stored in the copy source medium 100 and generates the converted CPS unit key file 303 to be recorded on the copy destination medium 300.

This process generates the "converted CPS unit key file 303" capable of calculating the title key (Kt), which is a decryption key for encrypted content, using the media key (Km) obtained from the MKB not requiring KCD stored in the server 400.

First, in step S211, the server 400 performs MKB processing. That is, the server 400 performs MKB processing for the MKB 152 requiring KCD which has been read from the copy source medium 100 and then transmitted to the server 400 by the information processing device 200CE, applying the device key 411 stored in the server 400.

The MKB processing in step S211 is performed as a process of acquiring a "temporary first medium key" from the MKB applying the device key 411.

(Step S212)

Then, in step S212, the server 400 performs an encryption process (AES-G) for the "temporary first medium key" calculated from the MKB in step S211, applying the KCD 412 stored in the server 400, to acquire a "first medium key".

(Step S213)

Then, in step S213, the server 400 performs a one-way function (AES-G) for the "first medium key" calculated in step S212, applying the volume ID 151 which has been read from the copy source medium 100 and then transmitted to the server 400 by the information processing device 200CE, to generate a "first volume unique key".

(Step S214)

Then, in step S214, the server 400 performs a decryption process for the CPS unit key file 154 which has been read from the copy source medium 100 and then transmitted to the server 400 by the information processing device 200CE, applying the "first volume unique key" calculated in step S213, to generate a "CPS unit key (=a title key)".

(Step S215)

Then, in step S215, the server 400 performs MKB processing for the MKB not requiring KCD stored in the server 400, applying the device key 411.

The MKB processing in step S215 is performed as a process of acquiring a "second medium key" from the MKB not requiring KCD applying the device key 411.

As described above with reference to FIGS. 18 and 19, the MKB not requiring KCD enables all of the devices corresponding to the leaves to directly acquire the media key from the MKB.

(Step S216)

Then, in step S216, the server 400 performs a one-way function (AES-G) for the "second medium key" calculated from the MKB not requiring KCD in step S215, applying the volume ID 151 which has been read from the copy source medium 100 and then transmitted to the server 400 by the information processing device 200CE, to generate a "second volume unique key".

(Step S217)

Then, in step S217, the server 400 performs an encryption process for the "CPS unit key (=a title key)" calculated by the decryption process for the CPS unit key file 154 in step S214.

A "converted CPS unit key file 402" capable of calculating the "CPS unit key (=a title key)" with the decryption process applying the "second volume unique key" is generated by the encryption process.

The server 400 transmits the generated "converted CPS unit key file 402" and the "MKB not requiring KCD" to the information processing device 200CE.

The information processing device 200CE performs a process which records the received data on the copy destination medium and records other data read from the copy source medium on the copy destination medium.

FIG. 26 is a diagram illustrating the summary of the processes of the server 400 and the information processing device 200CE in this embodiment.

First, the step numbers (steps S31 to S35) of the processes in the sequence diagram described above with reference to FIG. 24 and the step numbers (steps S201 and S211 to S217) of the processes described with reference to FIG. 24 are illustrated in FIG. 26.

The processes will be sequentially described according to the step numbers (S31 to S35) illustrated in FIG. 26.

(Steps S31 and S32 (including the process in S201 illustrated in FIG. 25))

First, in step S31, the information processing device 200CE reads the volume ID 151, the MKB 152 requiring KCD, and the CPS unit key file 154 from the copy source medium 100.

Then, in step S32, the information processing device 200CE transmits the data read from the copy source medium 100 to the server 400.

(Step S33 (S211 to S217 in FIG. 25))

Then, in step S33, the server 400 converts the CPS unit key file, using the data received from the information processing device 200CE and the MKB 401 not requiring KCD stored in the server 400.

This process is the process from step S211 to step S217 performed by the server 400 which has been described with reference to FIG. 25.

(Step S34)

Then, in step S34, the server 400 transmits the MKB 401 not requiring KCD stored in the server 400 and the converted CPS unit key file generated by the server 400 in step S33 to the information processing device.

(Step S35)

Then, in step S35, the information processing device 200CE performs a process which records the data (the MKB not requiring KCD and the converted CPS unit key file) received from the server 400 and the data read from the copy source medium 100 on the copy destination medium 300.

As a result of the processes, the following data are recorded on the copy destination medium 300 as illustrated in FIG. 26:

A volume ID 301;
An MKB 302 not requiring KCD;
A converted CPS unit key file 303;
Other AACS management data 304; and
BDMV format data 305.

The above-mentioned other AACS management data 155 include, for example, a content revocation list, a content certificate, a content hash table, usage control information, and others. The above-mentioned other AACS management data 155 include data forming the directory which has been described with reference to FIG. 5.

In addition, the BDMV format data 156 is data forming the directory which has been described with reference to FIG. 4 and includes, for example, encrypted content, a clip information file, and a playlist file.

It is possible to perform the processes described with reference to FIGS. 24 to 26, without applying a large load to the information processing device 200CE, since the server 400 performs the CPS unit key file conversion process.

As a result of the process, the following data are recorded on the copy destination medium 300 as illustrated in FIG. 26:

(A) Data copied from the copy source medium 100 without any change, which includes:

(a1) The volume ID 301;

(a2) The above-mentioned other AACS management data 304; and (a3) The BDMV format data 305; and (B) Data acquired from the server 400, which includes:

(b1) The MKB 302 not requiring KCD; and (b2) The converted CPS unit key file 303. These data are recorded on the copy destination medium 300.

The MKB 302 not requiring KCD recorded on the copy destination medium 300 is capable of directly calculating the media key (Km) applying the device key stored in, for example, a PC.

That is, it is possible to calculate the second medium key illustrated in FIG. 25.

In addition, the converted CPS unit key file 303 recorded on the copy destination medium 300 can be decrypted applying the media key (Km) acquired from the MKB 302 not requiring KCD and the volume unique key (=the second volume unique key illustrated in FIG. 25) calculated using the volume ID 301. The CPS unit key (title key) for decrypting the encrypted content included in the BDMV format data 305 can be acquired by the decryption process.

That is, for example, the PC storing the device key based on the AACS regulation can perform a decryption and reproduction process for the encrypted content stored in the copy destination medium 300 using only data stored in the copy destination medium 300.

The content decryption and reproduction sequence is similar to the content decryption and reproduction sequence in the device that does not need to use the key conversion data (KCD) which has been described with reference to FIG. 13, for example, a PC.

That is, it is possible to direct the device that does not need to use the key conversion data (KCD) to perform the process based on content usage control according to the AACS regulation.

[8-2. Copy Process Sequence by Device (for Example, PC) Incapable of Reading KCD]

Next, the copy process sequence by the device (for example, a PC) incapable of reading KCD will be described with reference to FIGS. 27 to 29.

First, a data transmission sequence between the following components in this embodiment will be described with reference to FIG. 27:

(a) A copy source medium;

(b) An information processing device [a device incapable of reading KCD (for example, a PC)];

(c) A server; and (d) A copy destination medium.

The information processing device is in a state in which the information processing device has the copy source medium and the copy destination medium inserted thereinto and can communicate with the server.

Next, processes in each step illustrated in FIG. 27 will be described.

(Step S41)

First, in step S41, the information processing device reads a volume ID, an MKB requiring KCD, and a CPS unit key file from the copy source medium.

In this embodiment, the information processing device is an information processing device (for example, a PC) that is not capable of reading KCD.

(Step S42)

Then, in step S42, the information processing device transmits the data read from the copy source medium, that is, the volume ID, the MKB requiring KCD, and the CPS unit key file to the server.

(Step S43)

Then, in step S43, the server converts the CPS unit key file, using the received data and an MKB not requiring KCD stored in the server.

This process is similar to, for example, the process from step S131 to step S136 performed in the information processing device 200PC which has been described with reference to FIG. 22.

(Step S44)

Then, in step S44, the server transmits the MKB not requiring KCD stored in the server and the converted CPS unit key file generated by the server in step S43 to the information processing device.

(Step S45)

Then, in step S45, the information processing device performs a process which records the data (the MKB not requiring KCD and the converted CPS unit key file) received from the server and the data read from the copy source medium on the copy destination medium.

As a result of the processes, the following data which are the same data as the data recorded on the copy destination medium 300 which have been described with reference to FIG. 23 are recorded on the copy destination medium:

A volume ID;

An MKB not requiring KCD;

A converted CPS unit key file;

Other AACS management data; and

BDMV format data.

In addition, in the sequence diagram illustrated in FIG. 27, in steps S41 and S42, the information processing device reads the volume ID, the MKB requiring KCD, and the CPS unit key file from the copy source medium and transmits the read data to the server. However, in a case where the server has stored some or all of the data, a process of reading and transmitting the data stored in the server may be omitted.

Next, the process performed by the server will be described in detail with reference to FIG. 28.

FIG. 28 illustrates the following data recorded on the copy source medium 100:

(a) A volume ID 151;

(b) An MKB 152 requiring KCD; and (c) A CPS unit key file 154.

The information processing device 200PC which is a device (for example, a PC) incapable of reading KCD reads the above-mentioned data.

The information processing device 200PC according to this embodiment is a device incapable of reading KCD.

The information processing device 200PC transmits the read data to the server 400.

The server 400 converts the CPS unit key file, using the received data and the MKB 401 not requiring KCD stored in the server, and generates a converted CPS unit key file to be recorded on the copy destination medium.

In addition, the server has stored device keys 411 and performs a process applying the stored data.

The device keys 411 stored in the server 400 are a set of all of the device keys distributed and stored in various devices. The server selects device keys necessary for each process from the device keys 411 and performs the processes.

Next, processes in each step illustrated in FIG. 28 will be sequentially described.

(Step S301)

In step S301, the information processing device 200PC reads the following data from the copy source medium 100:

(a) The volume ID 151;
(b) The MKB 152 requiring KCD; and
(c) The CPS unit key file 154.

Then, the information processing device 200PC transmits the read data to the server 400.

In addition, in a case where the server has stored some or all of the data, a process of reading and transmitting the stored data is not necessary.

(Step S311)

A process from step S311 to step S316 is a CPS unit key file conversion process in the server 400.

The process converts the CPS unit key file stored in the copy source medium 100 and generates the converted CPS unit key file 303 to be recorded on the copy destination medium 300.

This process generates the "converted CPS unit key file 303" capable of calculating the title key (Kt), which is a decryption key for encrypted content, using the media key (Km) obtained from the MKB not requiring KCD stored in the server 400.

First, in step S311, the server 400 performs MKB processing. That is, the server 400 performs MKB processing for the MKB 152 requiring KCD which has been read from the copy source medium 100 and then transmitted to the server 400 by the information processing device 200PC, applying the device key 411 stored in the server 400.

The MKB processing in step S311 is performed as a process of acquiring a "first medium key" from the MKB applying the device key 411.

(Step S312)

Then, in step S312, the server 400 performs a one-way function (AES-G) for the "first medium key" calculated from the MKB in step S311, applying the volume ID 151 which has been read from the copy source medium 100 and then transmitted to the server 400 by the information processing device 200PC, to generate a "first volume unique key".

(Step S313)

Then, in step S313, the server 400 performs a decryption process for the CPS unit key file 154 which has been read from the copy source medium 100 and then transmitted to the server 400 by the information processing device 200PC, applying the "first volume unique key" calculated in step S312, to generate a "CPS unit key (=a title key)".

(Step S314)

Then, in step S314, the server 400 performs MKB processing for the MKB not requiring KCD stored in the server 400, applying the device key 411 stored in the server.

The MKB processing in step S314 is performed as a process of acquiring a "second medium key" from the MKB not requiring KCD applying the device key 411.

As described above with reference to FIGS. 18 and 19, the MKB not requiring KCD enables all of the devices corresponding to the leaves to directly acquire the media key from the MKB.

(Step S315)

Then, in step S315, the server 400 performs a one-way function (AES-G) for the "second medium key" calculated from the MKB not requiring KCD in step S314, applying the volume ID 151 which has been read from the copy source medium 100 and then transmitted to the server 400 by the information processing device 200PC, to generate a "second volume unique key".

(Step S316)

Then, in step S316, the server 400 performs an encryption process for the "CPS unit key (=a title key)" calculated by the decryption process for the CPS unit key file 154 in step S313.

A "converted CPS unit key file 402" capable of calculating the "CPS unit key (=a title key)" with the decryption process applying the "second volume unique key" is generated by the encryption process.

The server 400 transmits the generated "converted CPS unit key file 402" and the "MKB not requiring KCD" to the information processing device 200PC.

The information processing device 200PC performs a process which records the received data on the copy destination medium and records other data read from the copy source medium on the copy destination medium.

FIG. 29 is a diagram illustrating the summary of the processes of the server 400 and the information processing device 200PC in this embodiment.

First, the step numbers (steps S41 to S45) of the processes in the sequence diagram described above with reference to FIG. 27 and the step numbers (steps S301 and S311 to S317) of the processes described with reference to FIG. 27 are illustrated in FIG. 29.

The processes will be sequentially described according to the step numbers (S41 to S45) illustrated in FIG. 29.

(Steps S41 and S42 (Including the Process in S301 Illustrated in FIG. 28))

First, in step S41, the information processing device 200PC reads the volume ID 151, the MKB 152 requiring KCD, and the CPS unit key file 154 from the copy source medium 100.

Then, in step S42, the information processing device 200PC transmits the data read from the copy source medium 100 to the server 400.

(Step S43 (S311 to S316 in FIG. 28))

Then, in step S43, the server 400 converts the CPS unit key file, using the data received from the information processing device 200PC and the MKB 401 not requiring KCD stored in the server 400.

This process is the process from step S311 to step S316 performed by the server 400 which has been described with reference to FIG. 28.

(Step S44)

Then, in step S44, the server 400 transmits the MKB 401 not requiring KCD stored in the server 400 and the converted CPS unit key file generated by the server 400 in step S43 to the information processing device.

(Step S45)

Then, in step S45, the information processing device 200PC performs a process which records the data (the MKB not requiring KCD and the converted CPS unit key file) received from the server 400 and the data read from the copy source medium 100 on the copy destination medium 300.

As a result of the processes, the following data are recorded on the copy destination medium 300 as illustrated in FIG. 29:

A volume ID 301;
An MKB 302 not requiring KCD;

A converted CPS unit key file 303;
Other AACS management data 304; and
BDMV format data 305.

The above-mentioned other AACS management data 155 include, for example, a content revocation list, a content certificate, a content hash table, usage control information, and others. The above-mentioned other AACS management data 155 include data forming the directory which has been described with reference to FIG. 5.

In addition, the BDMV format data 156 is data forming the directory which has been described with reference to FIG. 4 and includes, for example, encrypted content, a clip information file, and a playlist file.

It is possible to perform the processes described with reference to FIGS. 27 to 29, without applying a large load to the information processing device 200PC, since the server 400 performs the CPS unit key file conversion process.

As a result of the process, the following data are recorded on the copy destination medium 300 as illustrated in FIG. 29:

(A) Data copied from the copy source medium 100 without any change, which includes:
  (a1) The volume ID 301;
  (a2) The above-mentioned other AACS management data 304; and
  (a3) The BDMV format data 305; and
(B) Data acquired from the server 400, which includes:
  (b1) The MKB 302 not requiring KCD; and
  (b2) The converted CPS unit key file 303.

These data are recorded on the copy destination medium 300.

The MKB 302 not requiring KCD recorded on the copy destination medium 300 is capable of directly calculating the media key (Km) applying the PC device key 201PC stored in the information processing device 200PC.

That is, it is possible to calculate the second medium key illustrated in FIG. 28.

In addition, the converted CPS unit key file 303 recorded on the copy destination medium 300 can be decrypted applying the media key (Km) acquired from the MKB 302 not requiring KCD and the volume unique key (=the second volume unique key illustrated in FIG. 28) calculated using the volume ID 301. The CPS unit key (title key) for decrypting the encrypted content included in the BDMV format data 305 can be acquired by the decryption process.

That is, for example, the information processing device 200PC can perform a decryption and reproduction process for the encrypted content stored in the copy destination medium 300 using only data stored in the copy destination medium 300.

The content decryption and reproduction sequence is similar to the content decryption and reproduction sequence in the device that does not need to use the key conversion data (KCD) which has been described with reference to FIG. 13, for example, a PC.

That is, it is possible to direct the device that does not need to use the key conversion data (KCD) to perform the process based on content usage control according to the AACS regulation.

[9. For Example of Hardware Configuration of Each Device]

Finally, an example of the hardware configuration of each device performing the above-mentioned processes will be described with reference to FIG. 30.

Figure 30:
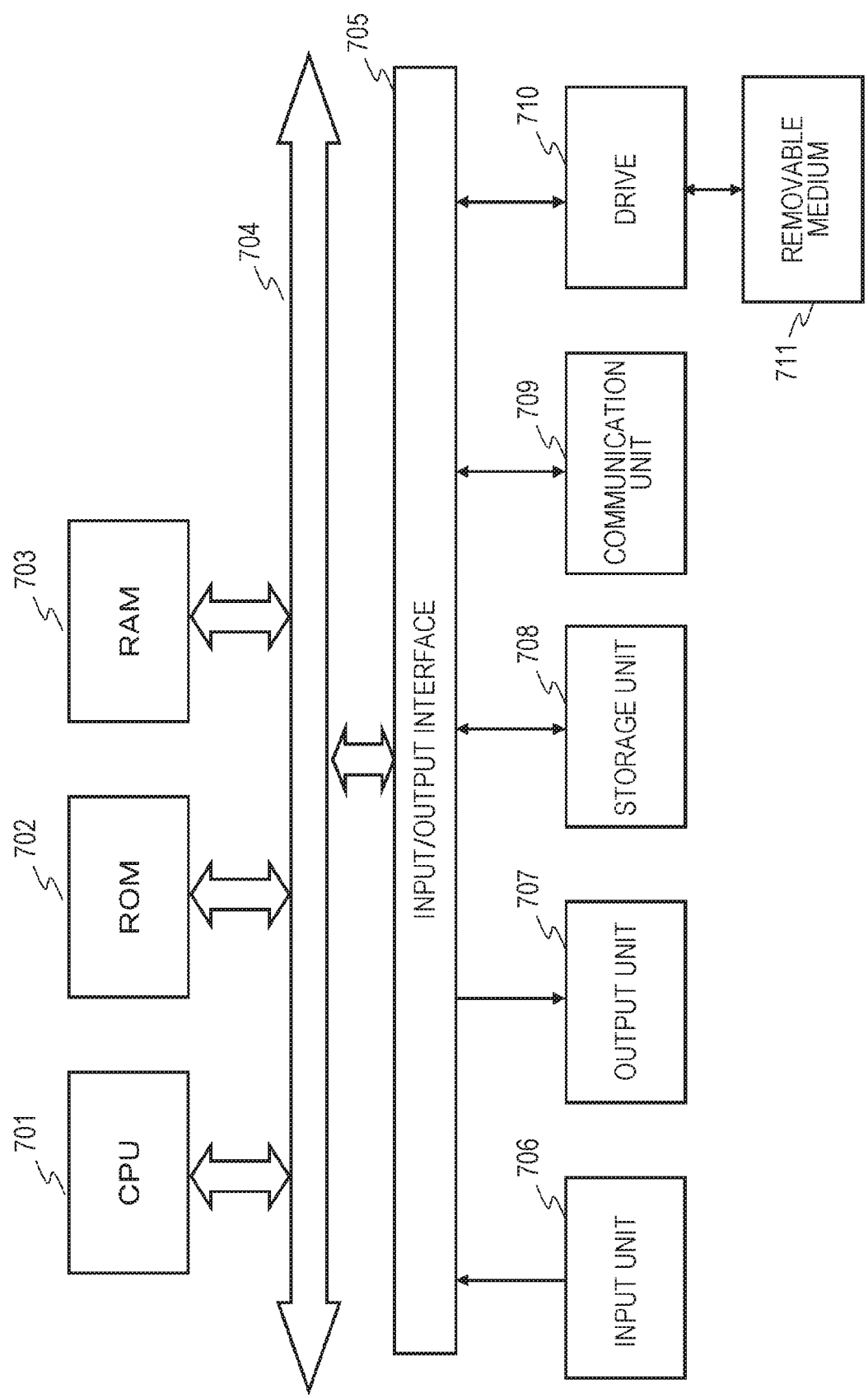
FIG. 30 is a diagram illustrating an example of the hardware configuration of a server or an information storage device that performs, for example, a data copy process.

FIG. 30 illustrates an example of the hardware configuration of the server or the information processing device performing the data copy process.

A central processing unit (CPU) 701 functions as a data processing unit that performs various processes according to a program stored in a read only memory (ROM) 702 or a storage unit 708. For example, the CPU 701 performs the data copy process. A random access memory (RAM) 703 stores, for example, the programs or data executed by the CPU 701. The CPU 701, the ROM 702, and the RAM 703 are connected to each other by a bus 704.

The CPU 701 is connected to an input/output interface 705 through the bus 704. An input unit 706 including, for example, various switches, a keyboard, a mouse, and a microphone and an output unit 707 including, for example, a display and a speaker are connected to the input/output interface 705. The CPU 701 performs various processes in response to commands input from the input unit 706 and outputs the results of the processes to, for example, the output unit 707.

The storage unit 708 connected to the input/output interface 705 is, for example, a hard disk and stores the programs or various kinds of data executed by the CPU 701. A communication unit 709 communicates with external devices through a network, such as the Internet or a local area network.

A drive 710 connected to the input/output interface 705 drives a removable medium 711 which is, for example, a magnetic disk, an optical disc, a magneto-optical disc, or a semiconductor memory, such as a memory card, and acquires various kinds of data, such as recorded content and key information. For example, the drive 710 performs a content decryption and reproduction process using the acquired content or key data, according to a reproduction program executed by the CPU.

[10. Summary of Configuration of Present Disclosure]

The embodiments of the present disclosure have been described above in detail with reference to specific embodiments. However, it will be apparent to those skilled in the art that various modifications and substitutions of the embodiments can be made without departing from the scope and spirit of the present disclosure. That is, the embodiments of the present invention are illustrative and the invention should not be constructed as being limited to the embodiments. The claims need to be considered in order to determine the gist of the present disclosure.

In addition, the technique disclosed in the specification can have the following configurations.

(1) An information processing device including:
a data processing unit that performs a copy process of recording data recorded on a first medium on a second medium,
in which the data processing unit records encrypted content included in the data recorded on the first medium on the second medium as encrypted data, without decrypting the encrypted content,
the data processing unit converts a CPS unit key file recorded on the first medium as a file storing a decryption key for the encrypted content, and
the data processing unit generates a converted CPS unit key file that is capable of acquiring the decryption key, without applying key conversion data (KCD) recorded on the first medium, and records the converted CPS unit key file on the second medium.

(2) The information processing device according to (1),
in which the data processing unit acquires a media key block (MKB) not requiring KCD, which is required to acquire the decryption key for the encrypted content from the converted CPS unit key file, from a server and records the MKB not requiring KCD on the second medium.

(3) The information processing device according to (2), in which the media key block (MKB) not requiring KCD is an MKB that is capable of directly calculating a media key with a process applying a device key stored in the information processing device, and the converted CPS unit key file is decrypted applying a volume unique key which is obtained by a process using the media key calculated from the MKB not requiring KCD to acquire the decryption key for the encrypted content.

(4) The information processing device according to (3), in which the data processing unit reads a volume ID applied to calculate the volume unique key from the first medium and records the volume ID on the second medium.

(5) The information processing device according to any of (1) to (4), in which the data processing unit records advanced access content system (AACS) management data other than the CPS unit key file read from the first medium on the second medium.

(6) The information processing device according to (5), in which the AACS management data includes a content revocation list, a content certificate, a content hash table, and usage control information.

(7) The information processing device according to any of (1) to (6), in which the data processing unit records a reproduction control information file corresponding to the encrypted content read from the first medium on the second medium.

(8) The information processing device according to (7), in which the encrypted content read from the first medium and the reproduction control information file are Blu-ray (registered trademark) disc movie (BDMV) format data.

(9) An information processing device including:

a data processing unit that performs a copy process of recording data recorded on a first medium on a second medium, in which the data processing unit records encrypted content included in the data recorded on the first medium on the second medium as encrypted data, without decrypting the encrypted content, the data processing unit transmits a CPS unit key file recorded on the first medium as a file storing a decryption key for the encrypted content to a sever, and the data processing unit acquires a converted CPS unit key file that is capable of acquiring the decryption key, without applying key conversion data (KCD) recorded on the first medium, from the server and records the converted CPS unit key file on the second medium.

(10) The information processing device according to (9), in which the data processing unit reads data required to generate the converted CPS unit key file from the first medium and transmits the data to the server.

(11) The information processing device according to (9) or (10), in which the data processing unit acquires a media key block (MKB) not requiring KCD, which is required to acquire the decryption key for the encrypted content from the converted CPS unit key file, from the server and records the MKB not requiring KCD on the second medium.

(12) The information processing device according to (11), in which the media key block (MKB) not requiring KCD is an MKB that is capable of directly calculating a media key with a process applying a device key stored in the information processing device, and the converted CPS unit key file is decrypted applying a volume unique key which is obtained by a process using the media key calculated from the MKB not requiring KCD to acquire the decryption key for the encrypted content.

(13) The information processing device according to (12), in which the data processing unit reads a volume ID applied to calculate the volume unique key from the first medium and records the volume ID on the second medium.

(14) The information processing device according to any of (9) to (13), in which the data processing unit records advanced access content system (AACS) management data other than the CPS unit key file read from the first medium on the second medium.

(15) The information processing device according to any of (9) to (14), in which the data processing unit records a reproduction control information file corresponding to the encrypted content read from the first medium on the second medium.

(16) An information processing device functioning as a server, including:

a communication unit that receives data from a copy execution device which performs a copy process of recording data recorded on a first medium on a second medium; and a data processing unit that performs data processing using the data received from the copy execution device, in which the communication unit receives a CPS unit key file recorded on the first medium as a file storing a decryption key for encrypted content recorded on the first medium, and the data processing unit generates a converted CPS unit key file that is capable of acquiring the decryption key, without applying key conversion data (KCD) recorded on the first medium, and transmits the converted CPS unit key file as data to be recorded on the second medium to the copy execution device.

(17) An information processing method performed in an information processing device, in which the information processing device includes a data processing unit that performs a copy process of recording data recorded on a first medium on a second medium, the data processing unit records encrypted content included in the data recorded on the first medium on the second medium as encrypted data, without decrypting the encrypted content, the data processing unit converts a CPS unit key file recorded on the first medium as a file storing a decryption key for the encrypted content, and the data processing unit generates a converted CPS unit key file that is capable of acquiring the decryption key, without applying key conversion data (KCD) recorded on the first medium, and records the converted CPS unit key file on the second medium.

(18) An information processing method performed in an information processing device, in which the information processing device includes a data processing unit that performs a copy process of recording data recorded on a first medium on a second medium, the data processing unit records encrypted content included in the data recorded on the first medium on the second medium as encrypted data, without decrypting the encrypted content, the data processing unit transmits a CPS unit key file recorded on the first medium as a file storing a decryption key for the encrypted content to a sever, and the data processing unit acquires a converted CPS unit key file that is capable of acquiring the decryption key, without applying key conversion data (KCD) recorded on the first medium, from the server and records the converted CPS unit key file on the second medium.

(19) A program that causes an information processing device to process information, in which the information processing device includes a data processing unit that performs a copy process of recording data recorded on a first medium on a second medium, and the program causes the data processing unit to perform:

a process of recording encrypted content included in the data recorded on the first medium on the second medium as encrypted data, without decrypting the encrypted content;

a process of converting a CPS unit key file recorded on the first medium as a file storing a decryption key for the encrypted content; and a process of generating a converted CPS unit key file that is capable of acquiring the decryption key, without applying key conversion data (KCD) recorded on the first medium, and recording the converted CPS unit key file on the second medium.

(20) A program that causes an information processing device to process information, in which the information processing device includes a data processing unit that performs a copy process of recording data recorded on a first medium on a second medium, and the program causes the data processing unit to perform:

a process of recording encrypted content included in the data recorded on the first medium on the second medium as encrypted data, without decrypting the encrypted content;

a process of transmitting a CPS unit key file recorded on the first medium as a file storing a decryption key for the encrypted content to a sever; and a process of acquiring a converted CPS unit key file that is capable of acquiring the decryption key, without applying key conversion data (KCD) recorded on the first medium, from the server and recording the converted CPS unit key file on the second medium.

In addition, a series of processes described in the specification can be implemented by hardware, software, or a combination thereof. In a case where the processes are implemented by software, a program in which a process sequence is recorded can be installed in a memory of a computer that is incorporated in dedicated hardware and then executed. Alternatively, the program can be installed in a general-purpose computer that can perform various processes and then executed. For example, the program can be recorded on a recording medium in advance. In addition to installing the program from the recording medium to the computer, the program can be received through a network, such as a local area network (LAN) or the Internet, and can be installed in a recording medium such as a hard disk provided in the computer.

In addition, various processes described in the specification may not only be performed in time series as described above, but also performed in parallel or individually according to the processing capability of the device performing the processes or if necessary. Furthermore, in the specification, the system is a logical set of a plurality of devices and is not limited to a structure in which the devices with each configuration are accommodated in the same housing.

INDUSTRIAL APPLICABILITY

As described above, according to one embodiment of the present disclosure, it is possible to implement a configuration in which usage control that is substantially similar to content usage control in a copy source medium can be performed in a content copy destination.

Specifically, a data processing unit that performs a copy process of recording data recorded on a first medium on a second medium records encrypted content in the first medium on the second medium, without decrypting the encrypted content. In addition, the data processing unit converts a CPS unit key file recorded on the first medium to generate a converted CPS unit key file and records the converted CPS unit key file on the second medium. Furthermore, the data processing unit acquires an MKB not requiring KCD which is capable of directly calculating a media key using only a device key, without using key conversion data (KCD) recorded on the first medium, from a server and records the MKB not requiring KCD on the second medium.

A configuration in which usage control that is substantially similar to content usage control in a copy source medium can be performed in a content copy destination is implemented by the above-mentioned configuration.

REFERENCE SIGNS LIST

10 First medium
11 Volume ID
12 Key conversion data (KCD)
13 AACS management data
14 BDMV format data
20 Information processing device
30 Second medium
50 Management server
51 Management information setting portion
52 Data portion
71 MKB
72 KCD
73 Volume ID
74 CPS unit key file
75 Usage control information
76 Encrypted content
81 Device key
100 Copy source medium
111 BDMV format data
112 AACS management data
113 Data readable by dedicated protocol
114 KCD
151 Volume ID
152 MKB requiring KCD
153 KCD
154 CPS unit key file
300 Copy destination medium
301 Volume ID
302 MKB not requiring KCD
303 Converted CPS unit key file
304 Other AACS management data
305 BDMV format data
400 Server
401 MKB not requiring KCD
402 Converted CPS unit key file
701 CPU
702 ROM
703 RAM
704 Bus
705 Input/output interface
706 Input unit
707 Output unit 708 Storage unit
709 Communication unit
710 Drive
711 Removable medium

The invention claimed is:

1. An information processing device, comprising:
a central processing unit (CPU) configured to:
execute a copy process of recording data from a first memory to a second memory, wherein the first memory records the recording data, and the recording data includes encrypted content;
record the encrypted content on the second memory as encrypted data, without decryption of the encrypted content;
acquire a media key block (MKB) from a server;
record the acquired MKB on the second memory;
read a CPS unit key(unit key) file recorded on the first memory, wherein the unit key file stores a decryption key for the encrypted content;
convert the read unit key file based on the recorded MKB;
generate the converted unit key file for acquisition of the decryption key, wherein the acquisition of the decryption key is performed without application of key conversion data (KCD) recorded on the first memory; and
record the generated unit key file on the second memory.

2. The information processing device according to claim 1, wherein the acquisition of the decryption key from the converted unit key file is based on the recorded MKB.

3. The information processing device according to claim 2, wherein calculation of a media key is based on the recorded MKB and a device key stored in the information processing device, decryption of the converted unit key file is based on application of a volume unique key, the volume unique key is based on the calculated media key, and
the acquisition of the decryption key for the encrypted content is based on the decryption of the converted unit key file.

4. The information processing device according to claim 3, wherein the CPU is further configured to:
read a volume ID from the first memory, wherein calculation of the volume unique key is based on the read volume ID; and
record the volume ID on the second memory.

5. The information processing device according to claim 1, wherein
the CPU is further configured to record advanced access content system (AACS) management data on the second memory, and the recorded AACS management data is different from the read unit key file.

6. The information processing device according to claim 5, wherein the recorded AACS management data includes a content revocation list, a content certificate, a content hash table, and usage control information.

7. The information processing device according to claim 1, wherein
the CPU is further configured to record a reproduction control information file on the second memory, and
the recorded reproduction control information file corresponds to the encrypted content.

8. The information processing device according to claim 7, wherein
the encrypted content read from the first memory and the reproduction control information file are Blu-ray (registered trademark) disc movie (BDMV) format data.

9. An information processing device, comprising:
a central processing unit (CPU) configured to:
execute a copy process of recording data from a first memory to a second memory, wherein the first memory records the recording data, and
the recording data includes encrypted content;
record the encrypted content on the second memory as encrypted data, without decryption of the encrypted content;
read a CPS unit key (unit key) file recorded on the first memory, wherein the unit key file stores a decryption key for the encrypted content;
transmit the read unit key file to a server, wherein the server converts the transmitted unit key file based on a media key block (MKB) stored in the server;
acquire the converted unit key file and the MKB from the server, wherein the acquired unit key file is for acquisition of the decryption key without application of key conversion data (KCD) recorded on the first memory; and
record the acquired unit key file and the acquired MKB on the second memory.

10. The information processing device according to claim 9, wherein
the CPU is further configured to:
read data from the first memory; and
transmit the read data to the server, and the server generates the converted unit key file based on the transmitted data.

11. The information processing device according to claim 9, wherein the acquisition of the decryption key from the converted unit key file is based on the recorded MKB.

12. The information processing device according to claim 11, wherein
calculation of a media key is based on the recorded MKB and a device key stored in the information processing device,
decryption of the converted unit key file is based on application of a volume unique key,
the volume unique key is based on the calculated media key, and
the acquisition of the decryption key for the encrypted content is based on the decryption of the converted unit key tile.

13. The information processing device according to claim 12, wherein the CPU is further configured to:
read a volume ID from the first memory, wherein calculation of the volume unique key is based on the read volume ID; and
record the volume ID on the second memory.

14. The information processing device according to claim 9, wherein
the CPU is further configured to record advanced access content system (AACS) management data on the second memory, and
the recorded AACS management data is different from the read unit key file.

15. The information processing device according to claim 9, wherein
the CPU is further configured to record a reproduction control information file on the second memory, and
the recorded reproduction control information file corresponds to the encrypted content.

16. An information processing device, comprising:
a central processing unit (CPU) configured to:
receive data from a copy execution device which executes a copy process of recording data from a first memory to a second memory, wherein the first memory records the recording data, and
the recording data includes encrypted content;
execute a data processing based on the data received from the copy execution device;
receive a CPS unit key (unit key) file recorded on the first memory, wherein the unit key file stores a decryption key for the encrypted content;
convert the received unit key file based on a media key block (MKB) stored in the information processing device;
generate the converted unit key file for acquisition of the decryption key, wherein the acquisition of the decryption key is performed without application of key conversion data (KCD) recorded on the first memory; and
transmit the generated unit key file and the MKB to the copy execution device, wherein the copy execution device records the transmitted unit key file and the MKB on the second memory.

17. An information processing method, comprising:
in an information processing device:
executing a copy process of recording data from a first memory to a second memory, wherein
the first memory records the recording data, and
the recording data includes encrypted content;
recording the encrypted content on the second memory as encrypted data, without decrypting the encrypted content; acquiring a media key block (MKB) from a server;
recording the acquired MKB on the second memory;
reading a CPS unit key (unit key) file recorded on the first memory,
wherein the unit key file stores a decryption key for the encrypted content;
converting the read unit key file based on the recorded MKB; generating the converted unit key file for acquisition of the decryption key, wherein the acquisition of the decryption key is performed without application of key conversion data (KCD) recorded on the first memory; and
recording the generated unit key file on the second memory.

18. An information processing method, comprising:
in an information processing device:
executing a copy process of recording data from a first memory to a second memory, wherein
the first memory records the recording data, and
the recording data includes encrypted content;
recording the encrypted content on the second memory as encrypted data, without decryption of the encrypted content;
reading a CPS unit key (unit key) file recorded on the first memory, wherein the unit key file stores a decryption key for the encrypted content;
transmitting the read unit key file to a server, wherein the server converts the transmitted unit key file based on a media key block (MKB) stored in the server;
acquiring the converted unit key file and the MKB from the server, wherein the acquired unit key file is for acquisition of the decryption key without application of key conversion data (KCD) recorded on the first memory; and
recording the acquired unit key file and the acquired MKB on the second memory.

19. A non-transitory computer-readable medium having stored thereon computer-executable instructions that, when executed by a processor of an information
processing device, cause the processor to execute operations, the operations comprising:
executing a copy process of recording data from a first memory to a second memory, wherein the first memory records the recording data, and the recording data includes encrypted content;
recording the encrypted content on the second memory as encrypted data, without decrypting the encrypted content; acquiring a media key block (MKB) from a server;
recording the acquired MKB on the second memory;
reading a CPS unit key (unit key) file recorded on the first memory, wherein the unit key file stores a decryption key for the encrypted content;
converting the read unit key file based on the recorded MKB;
generating the converted unit key file for acquisition of the decryption key, wherein the acquisition of the decryption key is performed without application of key conversion data (KCD) recorded on the first memory; and recording the generated unit key file on the second memory.

20. A non-transitory computer-readable medium having stored thereon computer-executable instructions that, when executed by a processor of an information
processing device, cause the processor to execute operations, the operations comprising:
executing a copy process of recording data from a first memory to a second memory, wherein the first memory records the recording data, and
the recording data includes encrypted content;
recording the encrypted content on the second memory; as encrypted data, without decrypting the encrypted content;
reading a CPS unit key (unit key) file recorded on the first memory, wherein the unit key file stores a decryption key for the encrypted content;
transmitting the read unit key file to a server, wherein the server converts the transmitted unit key file based on a media key block (MKB) stored in the server;
acquiring the converted unit key file and the MKB from the server, wherein the acquired unit key file is for acquisition of the decryption key without application of key conversion data (KCD) recorded on the first memory; and
recording the acquired unit key file and the acquired MKB on the second memory.

* * * * *